United States Patent

Schwartz et al.

[11] B 3,999,045
[45] Dec. 21, 1976

[54] METHOD OF PIGMENTATION CONTROL FOR THERMOPLASTIC FILM

[75] Inventors: Robert I. Schwartz, Brighton; Harry R. Sheets, Shortsville, both of N.Y.

[73] Assignee: Mobil Oil Corporation, New York, N.Y.

[22] Filed: Dec. 23, 1974

[21] Appl. No.: 535,268

[44] Published under the second Trial Voluntary Protest Program on March 30, 1976 as document No. B 535,268.

Related U.S. Application Data

[63] Continuation-in-part of Ser. No. 444,444, Feb. 21, 1974, abandoned.

[52] U.S. Cl. .................... 235/151.1; 235/151.35; 425/141
[51] Int. Cl.² .................. G01D 21/00; G06F 15/46
[58] Field of Search ....... 235/151.1, 151.3, 151.35, 235/151.33, 151.13; 425/140, 141; 177/60; 250/277; 118/7–9; 156/64; 28/72.6, 76

[56] References Cited
UNITED STATES PATENTS

| | | | |
|---|---|---|---|
| 2,726,922 | 12/1955 | Merrill et al. | 425/140 |
| 2,988,641 | 6/1961 | Gough | 425/140 X |
| 3,122,783 | 3/1964 | Jolliffe et al. | 425/141 |
| 3,212,127 | 10/1965 | Flook, Jr. et al. | 425/141 |
| 3,286,302 | 11/1966 | Doering | 18/2 |
| 3,378,676 | 4/1968 | Clement | 235/151.3 |
| 3,510,374 | 5/1970 | Walker | 425/141 X |
| 3,596,071 | 7/1971 | Doering | 235/151.3 X |
| 3,737,265 | 6/1973 | Schafer et al. | 425/140 |
| 3,841,147 | 10/1974 | Coil et al. | 235/151.3 X |

*Primary Examiner*—Edward J. Wise
*Attorney, Agent, or Firm*—Charles A. Huggett; Malcolm Keen

[57] ABSTRACT

A nucleonic thickness gauge measures the total electron density of a pigmented thermoplastic film from which a product density and thickness may be derived. The amount of pigment admixed with the thermoplastic film resin in an extruder is controlled in response to a comparison between the thickness measured with the nucleonic gauge and the thickness determined from the actual product weight.

12 Claims, 5 Drawing Figures

METHOD OF PIGMENTATION CONTROL FOR THERMOPLASTIC FILM

CROSS-REFERENCE TO RELATED APPLICATIONS

This application is a continuation-in-part of application Ser. No. 444,444, filed Feb. 21, 1974 now abandoned.

BACKGROUND OF THE INVENTION

1. Field of the Invention

This invention deals with a method of controlling the pigmentation of thermoplastic film. More specifically, the method involves measuring the apparent thickness of the pigmented film with a nucleonic thickness gauge and controlling pigment addition in response to a comparison between the thickness measured with the nucleonic gauge and the thickness determined from the weight of the film.

2. Description of the Prior Art

Thermoplastic film may be produced by feeding a thermoplastic resin, often in the form of solid pellets, to an extruder which mechanically works and heats the resin, transforming it into a plastic state. The molten resin is then extruded through an extrusion die to form a thin, thermoplastic film.

Pigment may be added to the extruder so that it is mixed with the thermoplastic material in order to vary the color of the extruded film. Such pigments generally represent less than 10%, and typically about 1%, of the total pigmented film weight.

As the pigment is quite expensive, normally costing several times as much as thermoplastic material, close control of the amount of pigment in each portion of the film is essential for economy of operation. Previously, the amount of pigment added was determined by visually observing the color of the product, thus allowing for a rather wide margin of error.

Another way of determining the amount of pigment in the pigmented plastic film is to weigh the film in order to ascertain if the film weight equals the total of the required amounts of film and pigment. However, this method is also inaccurate because it assumes that the thickness of the film is constant. This is not necessarily so and a very slight decrease or increase in film thickness, as might be caused by extrusion die wear or film buildup at the die exit, for example, will produce substantial variations in the amount of thermoplastic film extruded. A change in die setting of about 10 microns will alter the thickness of 500 micron film by 2.5%. As the entire amount of added pigment typically represents about 1% of the total weight of the pigmented film, a simple weighing of the pigmented film would not allow one to distinguish a decrease in pigment from a decrease in film thickness. Indeed, an excess of pigment and a deficiency of film could well cancel each other out, producing a total weight equalling that for the correct amounts of pigment and film but with an incorrectly pigmented film.

The thickness of the pigmented film could be measured mechanically, in conjunction with a measurement of the weight, in order to determine the variations in film thickness. A problem associated with the mechanical measurement of film thickness is that the thickness varies across the surface of the film sheet. This is obviously true of film produced from a rotating die which relocates the variations in film thickness produced by any irregularities in the die opening across the entire film as the die rotates. Thus, a large number of thickness readings would be required. Again, the errors produced by an excess of pigment and a deficiency of thermoplastic film could well cancel each other out resulting in a thickness which would appear to indicate a proper proportion.

The measurement of thickness by nucleonic or radiation gauges is known. U.S. Pat. No. 2,988,641 to Gough, for example, discloses a backscatter radiation gauge for measuring the thickness of calendered sheet material. The variations in the measured thickness can be monitored and used to control the setting of the calender rolls by a feedback loop. The thickness gauge makes a comparison with a set point controller which itself comprises a radiation gauge set to monitor changes in the composition of the sheet material. This patent does not, however, deal with the problem of regulating the amount of pigment in the material.

Continuous weight monitors for sheet materials are also known. For example, U.S. Pat. No. 2,726,922 to Merrill et al. discloses a continuous weighing scale which can be set to monitor variations from a predetermined thickness.

SUMMARY OF THE INVENTION

We have now devised a method for controlling the pigmentation of an extruded thermoplastic resin film. The method involves measuring the thickness of the film with a nucleonic or radiation thickness gauge and making a comparison of this thickness with the thickness determined by measuring the weight of the pigmented film. The amount of pigment added to the resin to make the film is then adjusted, if necessary, in response to the comparison.

The method is well adapted to the continuous production of thermoplastic film and it is capable of making rapid corrections in response to deviations from the desired ratio of pigment to resin.

DESCRIPTION OF SPECIFIC EMBODIMENTS

Figure 1:
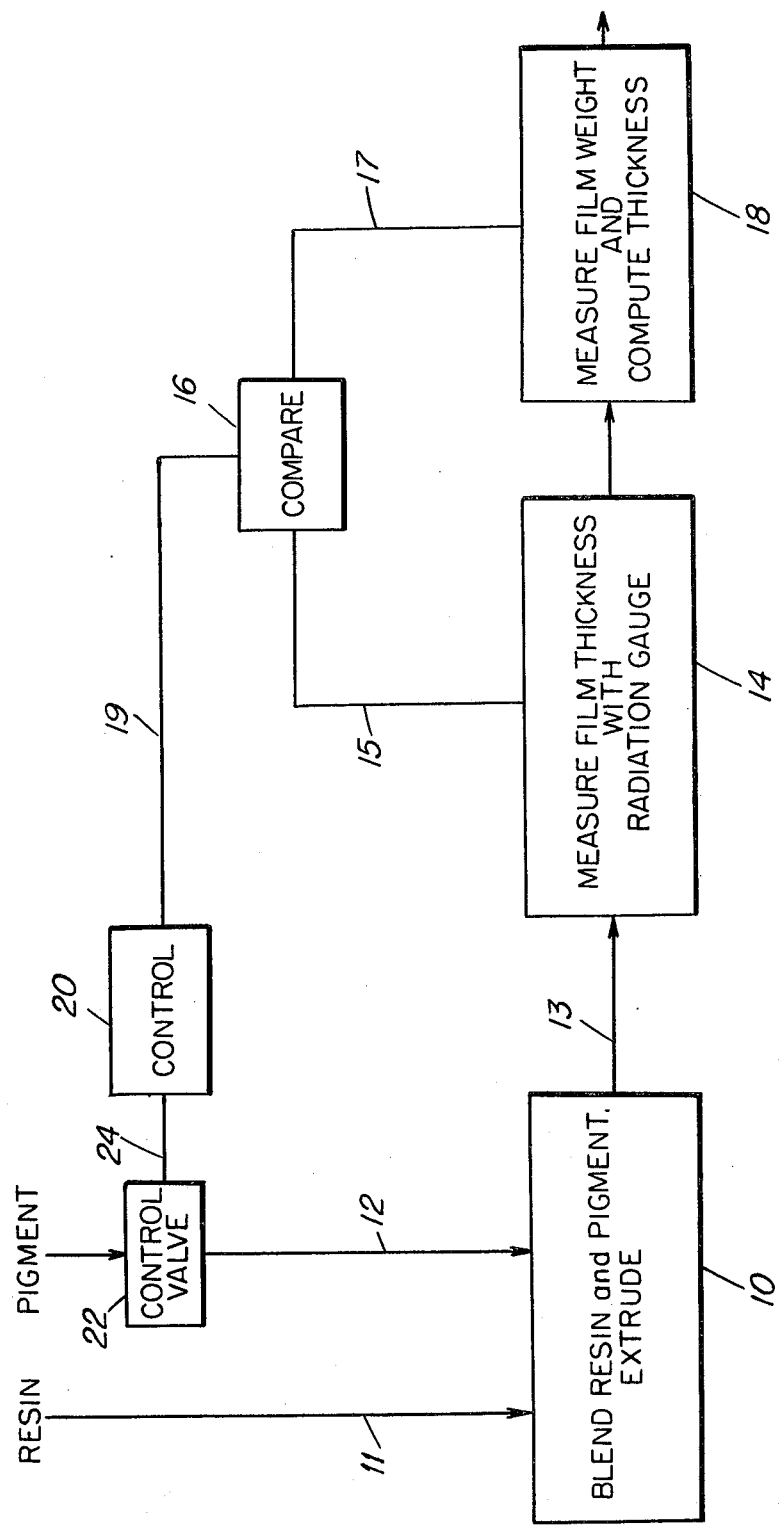
FIG. 1 is a flow sheet illustrating the steps used in the control of film pigmentation.

The thermoplastic film will normally be a polyolefin, polyvinyl chloride, a polyester or a polyamide, of which the polyolefins are the most common. The most common materials are polyethylene, polypropylene, polystyrene, polyvinyl chloride or copolymers thereof such as ethylene-vinyl chloride, ethylene-vinyl acetate or ethylene-propylene. Blends of different polymers may also be used. Typical types of pigments include the following: Calcium carbonate, $CaCO_3$; Calcium sulfate, $CaSO_4$; Barium sulfate, $BaSO_4$; Silicon dioxide (silica), $SiO_2$; Calcium silicate, $CaSiO_3$; Aluminum hydrate, $Al(OH)_3$; Aluminum oxide, $Al_2O_3$; Chromium oxide, $Cr_2O_3$; Lead sulfate, $PbSO_4$; Lead carbonate, $PbCO_3$; Lead chromate, $PbCr_2O_3$; Lead oxide, $PbO$; Lead sulfide, $PbS$; Lead acetate, $Pb(C_2H_3O_2)_2$; Zinc oxide, ZnO; Zinc sulfide, ZnS; Clay, $Al_2O_3.2SiO_2$; Mica, $K_2O.3Al_2O_3.6SiO_2$; Zinc yellow, $4ZnO.4Cr_2O_3.K_2O$, $ZnCrO.4Zn(OH)2$; Manganese dioxide $MnO_2$; potassium, sodium or ammonium ferri ferrocyanide, cobalt aluminate and, more typically, titanium dioxide, $TiO_2$; Iron oxides $Fe_2O_3$; $Fe_3O_4$; $Fe_2O_3.H_2O$; Iron sulfates, $Fe_2(SO_4)_3.7H_2O$; Iron chromate $Fe_2(Cr_2O_3)_3$.

The preferred type of nucleonic or radiation thickness gauge is the "backscatter" radiation gauge. These operate by detecting the backscatter of ionizing radiation from the film in an ionization chamber. The ionizing radiation is normally alpha, beta or gamma radiation, most commonly beta radiation as this poses fewer health hazards than the use of the more energetic gamma radiation. The radiation is normally supplied from a radioactive source such as a Ra-266 for alpha rays; Sr-90, C-14, Th-204, Kr-85 or Pm-147 for beta rays or Co-60 for gamma rays.

The backscatter thickness gauges direct the radiation onto the material from a radiation source and most of the rays pass through the material as it is normally quite thin and fairly transparent to ionizing radiation. A portion of the rays are, however, scattered back in the direction from which they came by elastic collisions within the atomic structure of the material. These backscattered electrons are detected, together with electrons reflected from the metal supports below the film, in an ionization chamber which gives an output proportional to the thickness of the material. From this the thickness of the material can be determined after suitable calibration of the gauge has been made.

As an alternative to a backscatter thickness gauge, a transmission gauge may be used. Gauges of this type rely upon the absorption of the radiation within the material and therefore the type and energy of the radiation require to be matched to the absorption characteristics of the material. Typical types of radiation used in transmission gauges are alpha, beta, gamma, X-ray and infra-red. The detectors used in these gauges provide an output proportional to the thickness of the material and, after calibration, give a direct reading of the thickness.

While radiation gauges, especially the backscatter gauges, are quite satisfactory for determining the thickness of homogeneous materials, they are somewhat inaccurate when used to measure the thickness of heterogeneous materials, that is, materials made up of more than one type of molecule. The reason for this is that the scattering or absorption of radiation is an atomic phenomenon and therefore depends upon the atoms and, consequently, the molecules in the material. With a backscatter thickness gauge, the scattering depends on the atomic number of the material through which the radiation passes. For a typical pigment, about 1% increase in the amount of pigment added to a thermoplastic film produces an apparent increase of about 10% in the pigmented film density and thickness when measured by a backscatter gauge calibrated for film alone. This is because the pigment has a higher electron weight density ratio than the thermoplastic film.

This phenomenon is used to control the pigmentation of the film. By comparing the film density or thickness as measured with the radiation thickness gauge (preferably a beta backscatter gauge) with the thickness as determined by weighing the film, the amount of pigment in the film can be determined to very close tolerances. To take an example using a beta ray backscatter gauge, an increase in beta ray reading without an increase in weight of similar magnitude indicates that the amount of pigment has increased. Taking the example previously described, if the beta reading increased 10% while the weight increased 1%, it would be clear that there had been approximately a 1% increase in the pigment added. If the beta ray reading decreased 10% and the weight also decreased 10%, such a comparison would indicate that the amount of film decreased approximately 9%. As a final illustration, if the beta ray reading increased 20% while the weight increased 11%, the pigment addition would have been increased by about 1% and the film by about 10%. Thus, the comparison gives a measure of the amount of pigment in the film. The amount of pigment added to the film can then be controlled in order to correct any deviations from the desired amount.

The relationship between the thickness as determined by the radiation gauge and the thickness computed from the weight measurement can readily be determined by calibration of the instruments using known standards. The relationship will, of course, vary according to the materials (resin, pigment) used and the type of radiation gauge.

The continuous weight measurement can be made by a roller scale. Scales of this type can be used for continuously monitoring the weights of films and other sheet materials. They comprise a pair of rollers over which the film passes, the rollers being attached to a device for determining the weight of the film resting on the rollers, e.g., a balance beam or a sensitive spring. The scale may be equipped with an electrical sensing device to monitor the weight electrically and produce an output signal proportional to the weight of the film. Calibration will enable this signal to be used to give a direct reading of film weight. Also, since the rollers are not the only members which support the film (other rollers for advancing the film also support it), calibration is necessary if a direct reading of absolute film weight is desired. However, the present method does not require an absolute indication of the film weight (actually, weight per unit area) but rather requires only a relative indication. Thus, the scale can be adjusted to a set point and deviations from the set point monitored. Continuous scales of this type are described, for example, in U.S. Pat. No. 2,726,922 to Merrill et al., the disclosure of which is incorporated herein by reference.

As an alternative to the continuous monitoring scale, a semi-continuous scale can be used. This comprises a scale which measures the weight of a particular amount of film after it has been cut off the continuous web advancing from the extruder. This type of scale does not give the close, continuous control of the continuous scale (and is, therefore, less preferred from a theoretical point of view) but if the line speeds are high enough and the sequential weighings performed sufficiently quickly, satisfactory control is, in fact, obtained. The weighings may be performed on one or more cut-off lengths of the film, either for purposes of practical convenience or to gather a sufficient weight of film material to prevent inaccuracies in weighing. This type of weighing is particularly useful when articles comprising a cut-off length of film are being produced, for example, bags from a continuous tubular film. The bags can be weighed singly after being cut off the tube or, for example, in batches of five. This gives sufficiently close control of the pigmentation.

While the comparison of density and thickness produced through weighing and a radiation gauge could be performed manually, such a process would be extremely slow, as would the changes in pigment addition in response to the thickness comparison. As a correction to the pigment addition is desired as soon as a difference is noted between the radiation gauge reading and the weight reading, the performance of the comparison by a computer is advantageous due to the computer's speed and accuracy. The application of a computer to the method of this invention greatly increases its utility. Either a special purpose analog computer or an appropriately programmed general purpose digital computer can be used to effect the control responses. The invention will be described below with reference to the use of a general purpose digital computer but it should be understood that analog control may also be used.

In FIG. 1 of the accompanying drawings, the steps of the method are shown. The resin is fed into an extruder 10 through resin inlet 11 and pigment is fed in through pigment inlet 12. In the extruder the resin is heated, melted and intimately blended with the pigment and the pigmented blend extruded through the extruder die in the normal way. The pigmented extruded film 13 then passes to a radiation thickness gauge 14, preferably a beta ray backscatter gauge, which produces an output signal partly representative of the thickness of the film. However, as mentioned previously, this determination is also dependent upon the amount of pigment in the film. The output signal from gauge 14 is fed through line 15 to a comparator 16 which also receives an output signal through line 17 from scale 18.

The comparator 16 makes a comparison between the thickness as determined by the radiation gauge and the thickness as determined by the weight measurement. From this comparison an indication of the amount of pigment in the film can be obtained. This indication can be fed by line 19 to control mechanism 20 which determines whether there is a deviation from the desired pigment content and, if there is, develops an appropriate control response. The control response, in the form of an output signal is fed through line 21 to pigment control valve 22 which regulates the amount of pigment admitted to the extruder 10 through inlet 12.

The schematic shown in FIG. 1 is, of course, in the simplest form for purposes of illustration. Normally, the control mechanism will have inputs indicating the rate of resin feed, extruder output and so on, in order to maintain full control over the process. If the comparator and control mechanism are digital devices, analog-to-digital converters will be incorporated in lines 15 and 17 and a digital-to-analog converter in line 21 to control valve 22. Such measures are, of course, well known in the art.

Figure 2:
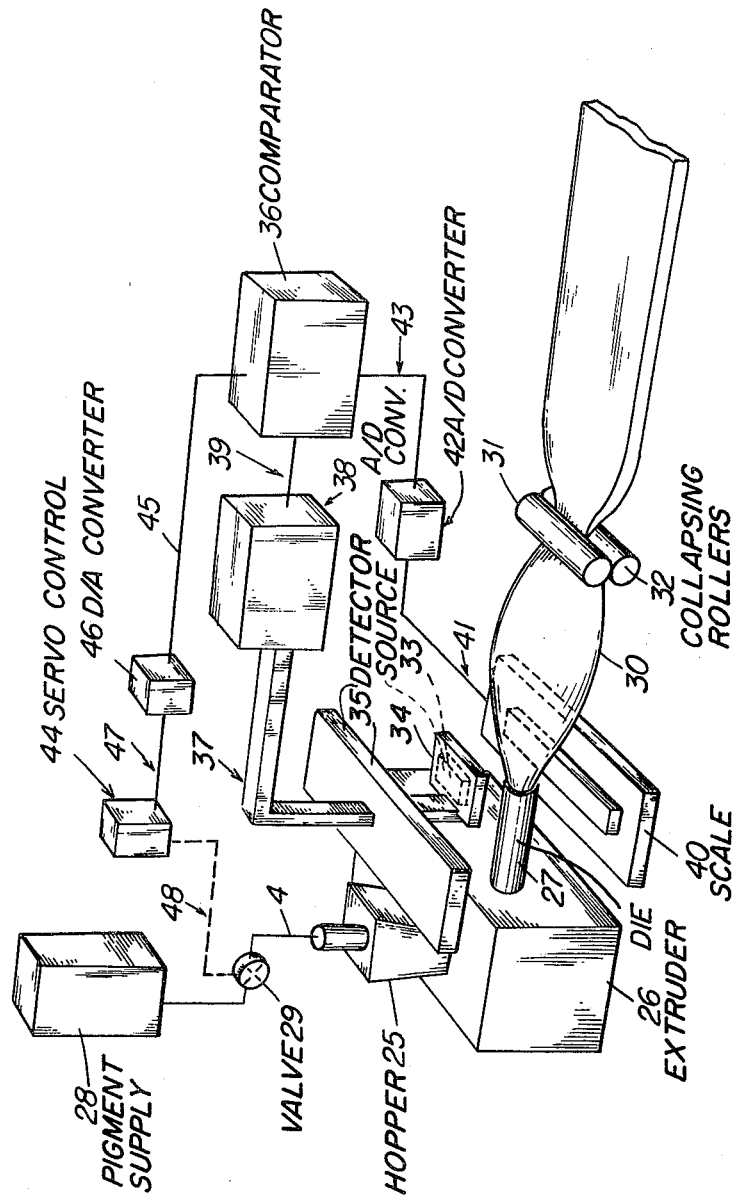
FIG. 2 is a schematic representation of one form of apparatus used to control film pigmentation.

Referring now to FIG. 2, pigment and thermoplastic film resin are mixed in a hopper 25 which feeds an extruder 26 with a die head 27. The pigment admitted to the hopper 25 from a pigment supply 28 is controlled by a pigment control valve 29. The pigmented film emerges from the die head 27 in the form of a bubble 30 which is collapsed by rollers 31 and 32 to form a flattened tube. The extruded film passes under a beta ray backscatter thickness gauge having a source 33 which discharges the beta rays, source 33 being surrounded by a radioactive shield 34. The backscatter detector 35 which measures the amount of beta rays reflected, is above the source 33 and shielded from it by shield 34. The detector transmits a corresponding digital and or analog signal to a comparator 36 by means of line 37, an analog/digital converter 38 and line 39.

The extruded film is weighed by a continuous scale or weight sensor 40 here illustrated schematically. This scale is preferably of the roller type as will be discussed further below. The scale produces an output signal which is fed to comparator 36 by means of line 41, analog to digital converter 42 and line 43.

The comparator 36 compares the output signal from the radiation thickness gauge with the output signal from the scale and, according to a predetermined schedule, determines whether there are any deviations from the desired pigment content. If there are, it sends a control response to servo control 44 through line 45, digital-to-analog converter 46 and line 47. The servo control operates pigment control valve 29 through connection 48, so as to make the appropriate control response.

Figure 3:
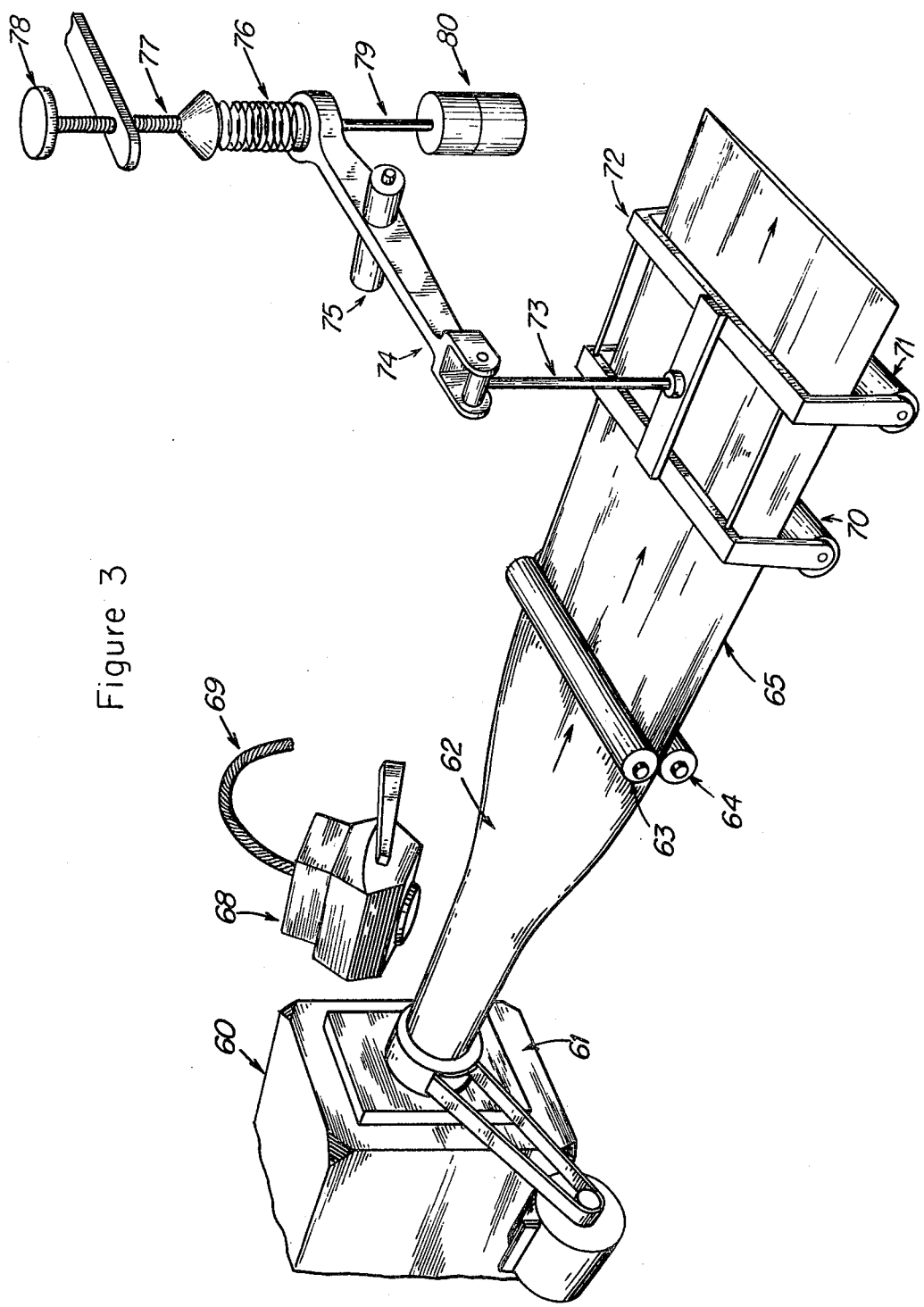
FIG. 3 is a schematic representation of another form of apparatus used to control film pigmentation.

FIG. 3 shows, again in schematic form, the extruder, thickness gauge and continuous scale for controlling the pigment addition via a suitable control circuit. The extruder 60 melts the resin and blends it with the added pigment. The molten resin blend is extruded through a rotating annular die 61 to form a tubular film 62. The film may be oriented by pressurizing the interior of the tube, as is well known in the art. Pinch rollers 63 and 64 trap the air in the blown up tube and squash the tube flat to form a flattened tube 65 which advances in the direction shown by the arrows.

A beta ray backscatter thickness gauge 68 is supported over the film as it emerges from the die. The gauges 68 obtains thickness readings around the whole periphery of the blown film as the die rotates. The output from the gauge is taken to the processing circuits by cable 69.

This type of thickness gauge obtains an average or integrated representation of the film thickness. Thus, any minor local deviations of pigment concentration which may arise do not cause a control response to be taken unnecessarily. Similarly, a time delay response may be built into the control mechanism so that short-lived deviations do not cause an unnecessary correction. Thus, area and time integration can be used to prevent unnecessary control responses which could, in fact, disturb the overall standard of pigmentation.

The film is weighed by means of a continuous scale or weight sensor comprising a pair of rollers 70 and 71 in a supporting frame 72 arranged so that the flattened film passes over the rollers and rests on them. The supporting frame 72 is suspended by a rod 73 from a balance beam 74 pivoted about axis 75 by a suitable beam suspension. At the end of beam 74 remote from rod 73 is a spring 76 whose loading can be adjusted by means of screw 77 fitted with graduated knob 78. A rod 79 is also attached to this end of beam 74 and it extends down into balancing or differential transformer 80 in which it supports an iron core which, at the null point, rests evenly between the two transformer windings. Changes in the weight of the film will cause the core to move in the transformer and this will change the electrical balance which can then be detected as an output analog signal. The null position can be set by control knob 78 to allow for different film weights.

This type of weight sensor gives only a relative indication but this is sufficient for the present purposes as it can be set to the desired weight and if an indication of absolute weight is required it can be calibrated.

Figure 4:
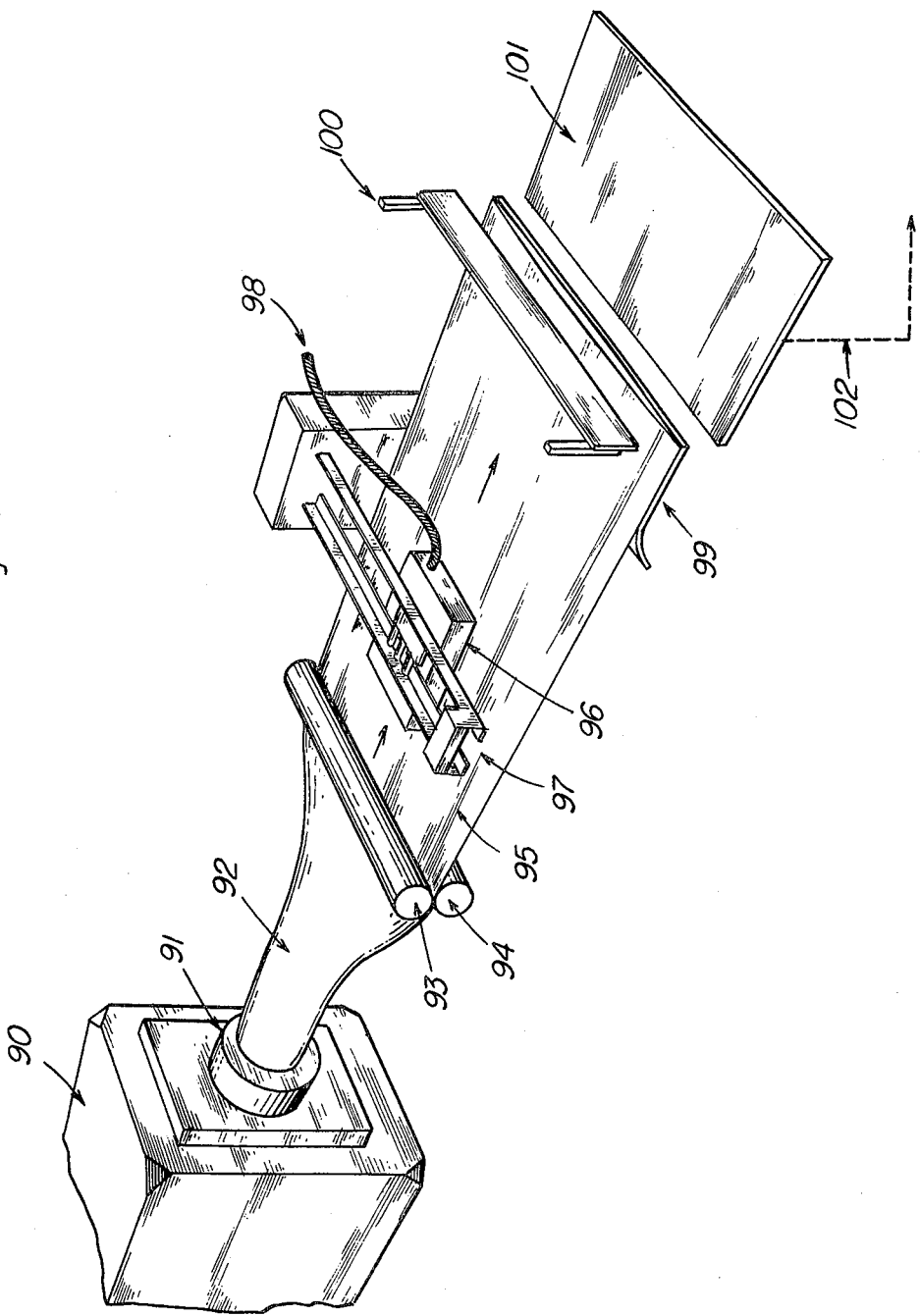
FIG. 4 is a schematic representation of another form of apparatus used to control film pigmentation.

FIG. 4 shows, again schematically, another radiation thickness gauge and weight scale. The extruder 90 extrudes the pigmented resin blend through die 91 to form a tubular film 92 which is collapsed by pinch rollers 93 and 94 to form a flattened tubular film 95 which moves in the direction shown by the arrows. An integrating or averaging beta ray backscatter thickness gauge with travelling head 96 on twin transverse rails 97 is positioned over the film. Head 96 which contains the beta ray source and the ionization chamber detector can be traversed along the rails by means such as a threaded rod or a piston and cylinder (not shown) so that a particular portion of the film can be examined or it can be continuously traversed back-and-forth to give a reading averaged over the whole width of the film. The output signal from the detector is passed to the comparator and control mechanism by cable 98.

The flattened film then passes over guillotine bed 99 and it can then be cut off by guillotine blade 100. The portions of the film which have been cut off fall onto scale pan 101 which has suitable weight sensors underneath it (not shown). The output signal from the sensors can be fed out by cable illustrated diagramatically by dashed line 102. The cut portions of the film can be removed either manually or by suitable automatic devices after one or more portions have accumulated on the scale pan. The control mechanism can be calibrated to allow for different numbers of cut off portions on the pan as desired.

Figure 5:
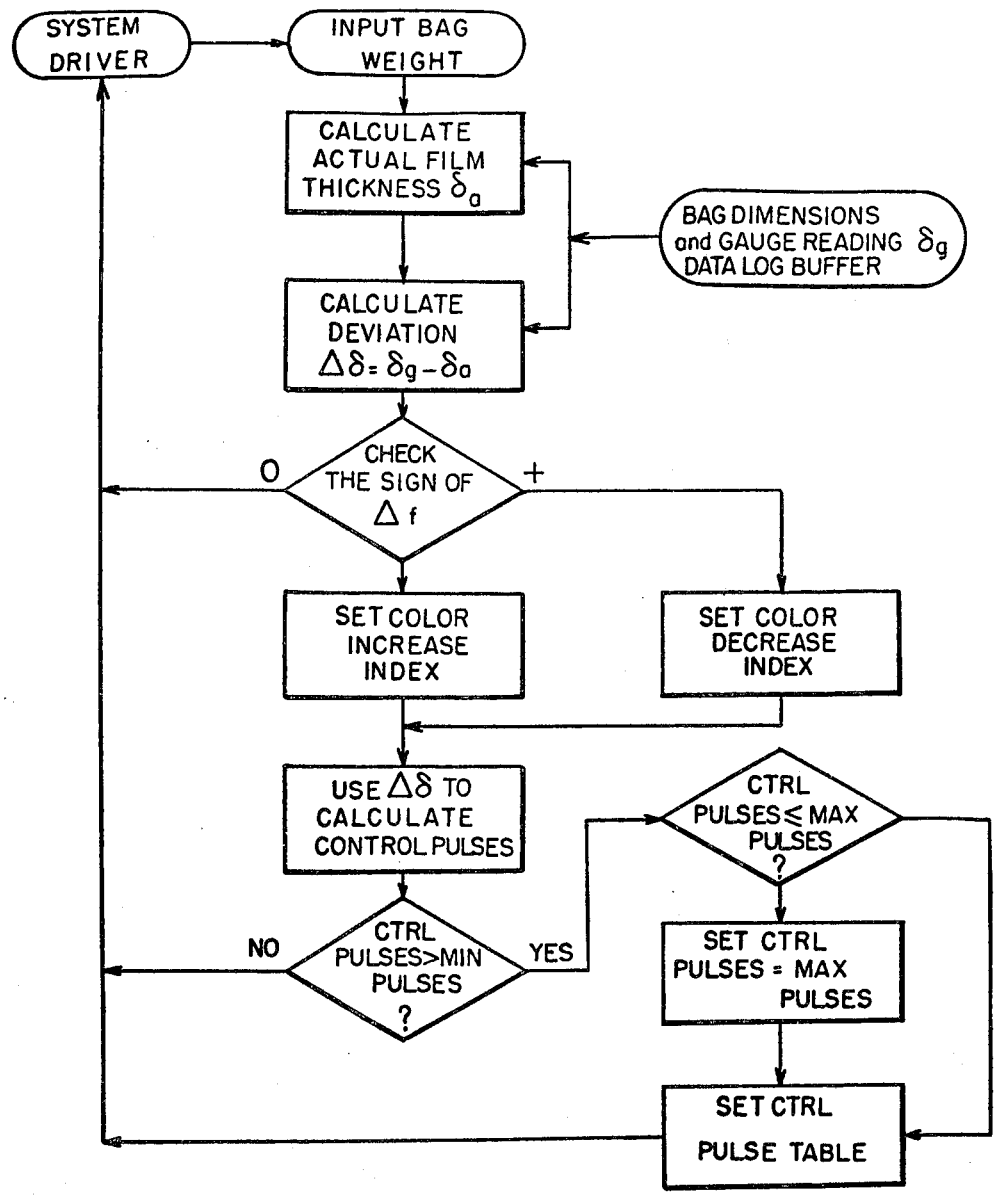
FIG. 5 is a flow diagram of a digital computer subroutine used to control film pigmentation.

As previously mentioned, the comparison between the weights as determined by the radiation gauge and the film weight can be determined either by a special purpose analog computer or, with suitable digitisation of the input data, by a general purpose digital computer suitable programmed. A typical subroutine for a general purpose digital computer (Honeywell 316) is illustrated in schematic form in FIG. 5 and described briefly below, as follows:

```
Color control pulses/mil Deviation      IDUM (1)
Bag weight Grams × 10                   IDUM (3)
Bag width                               IDUM (5)
MIN Pulses for Color Ctrl               IDUM (6)
MAX Pulses for Color Ctrl               IDUM (7)
LENGTH of two bags                      ASUM (3)
AVG Backscatter gauge reading           GSUM (10)
Film Density                            DENS LINE NO
  1      C   Color Control (CTRL 1)
  2          W = IDUM(3)
  3          W = W/4535.9
  4          F = IDUM (5)
  5          F = F/1200
  6      C   Calculate the Div from Avg. Backscatter
             Gauge Reading
  7          G = W/(.5 × ASUM (3) × Dens × F) −
             GSUM (10)
  8      C   Check +/− Div
  9          IF(G) 1,7,2
 10      1   I = 1
 11          Go to 3
 12      2   I = 2
 13      C   Calculate Color Ctrl Pulses
 14      3   F = IDUM (1)
 15          ICTRL = ABS(G)*F
 16      C   Check Min and Mac Ctrl Pulse
 17          IF (ICTRL − IDUM (6))7, 7, 4
 18      4   IF (ICTRL − IDUM (7))6, 6, 5
 19      5   ICTRL = IDUM (7)
 20      C   Set Control Table
 21      6   NCTRL (I) = ICTRL
 22      7   RETURN
 23          END
```

(1) Line 1 is a comment titling the color control subroutine.
(2) Line 2 equates W with the bag weight in Decagrams.
(3) Line 3 converts W into pounds.
(4) Line 4 equates F with the bag width.
(5) Line 5 converts F into feet.
(6) Line 6 is a comment titling the subcategory of calculating the difference in beta ray backscatter gauge and weight thickness reading.
(7) In line 7 G is set equal to the bag weight W, divided by the bag length (0.5 times the length of two bags) times the film density times the bag width (thus determining the bag thickness as determined by bag weight) minus the average beta ray gauge reading.
(8) Line 8 is a comment stating that the value of G will be evaluated to ascertain if it is negative, zero or positive.
(9) Line 9 states that if the difference in thickness of the pigmented film G (as determined by weight less the thickness determined by beta ray gauge) is negative, the computer is directed to statement 1 (line 10) if G is zero, the computer is directed to statement 7 (line 22) which in turn directs the computer to return to the main program, no color control correction being necessary; if G is positive, the computer is directed to statement 2 (line 12);
(10) Line 10 equates I with 1.
(11) Line 11 directs the computer to Statement 3.
(12) Line 12 equates I to 2.
(13) Line 13 is a comment titling the subcategory of the subroutine as "calculate control pulses".
(14) Line 14 equates F with the color control pulses/mil deviation.
(15) Line 15 equates ICTRL with the absolute value of G (difference between weight thickness and beta ray thickness in mils) times the color control pulses/mil deviation.
(16) Line 16 is a comment titling a subcategory of the subroutine as a check for minimum and maximum control pulses.
(17) Line 17 subtracts the minimum control pulses from ICTRL. If the result is negative or zero the computer is directed to return to the main purpose via statement 7; if the result if positive, the computer is directed to statement 4 (line 18).
(18) Line 18 subtracts the maximum pulses for color control from ICTRL. If the result is negative or zero the computer is directed to statement 6 (line 21); if the result is positive, the computer is directed to statement 5 (line 19).

A suitable program for executing this color control subroutine adapted for use with Honeywell 316 digital computer is attached as Appendix 1 . It should be understood that this program is purely illustrative and given only by way of example.

APPENDIX 1

```
00001   C     ... INPUT OFF LINE PROGRAM
00002         COMMON Y(82),A(32),B(32),ALAR1(31),ALAR2(31)
00003         COMMON AMAX(31),ASUM(31),AMIN(31),GMAX(11),GSUM(11)
00004         COMMON GMIN(11),DENS,BCHP,FTPLS,CC,CB
00005         COMMON NDUM(738)
00006         COMMON IDUM(100)
00007         READ(1,1000) CT1,CT2,CP1,CP2,CA1,CA2
00008        1,CV1,CV2,CWR1,CWR2,CWL1,CWL2,AMAX(1),AMIN(1),CF1
00009        2,DENS,BCHP,FTPLS,CC,CB,(ALAR1(I),ALAR2(I),I=1,31)
00010        3,(Y(K),Y(K+41),K=1,41),B(32),ASUM(1)
00011   1000  FORMAT(2G11.4)
00012         WRITE(1,1000)CT1,CT2,CP1,CP2,CA1, A2
00013        1,CV1,CV2,CWR1,CWR2,CWL1,CWL2,AMAX(1),AMIN(1),CF1
00014        2,DENS,BCHP,FTPLS,CC,CB,(ALAR1(I),ALAR2(I),I=1,31)
00015        3,(Y(K),Y(K+41),K=1,41),B(32),ASUM(1)
00016         A(1)=CF1
00017         A(2)=CWR1
00018         A(3)=CWL1
```

```
00019              A(4)=CA1
00020              A(5)=CV1
00021              B(2)=CWR2
00022              B(3)=CWL2
00023              B(4)=CA2
00024              B(5)=CV2
00025              DO 73 I=6,9
00026              A(I)=CP1
00027        73    B(I)=CP2
00028              DO 74 I=10,31
00029              A(I)=CT1
00030        74    B(I)=CT2
00031              CALL STUP
00032              END
00033     $0
00001     $0
00002              FUNCTION WIDTH (X1,X2)
00003              COMMON Y(82),A(32),B(32)
00004        C     ... B(32)=DX
00005              K=0
00006              WIDTH=A(32)
00007              X1=X1*A(2)+B(2)
00008              X2=X2*A(3)+B(3)
00009        1     I1=X1/B(32)
00010              X1I=FLOAT(I1)*B(32)
00011              I1=I1+K+1
00012              WIDTH=WIDTH+Y(I1)+(X1-X1I)/B(32)*(Y(I1+1)-Y(I1))
00013              X1=X2
00014              K=41
00015              IF(I1-42)1,2,2
00016        2     RETURN
00017              END
00018     $0
00001              SUBROUTINE CTRL1
00002              COMMON Y(82),A(32),B(32),ALAR1(31),ALAR2(31)
00003              COMMON AMAX(31),ASUM(31),AMIN(31),GMAX(11),GSUM(11)
00004              COMMON GMIN(11),DENS,BCHP,FTPLS,CC,CB
00005              COMMON M1(180),M2(180),M3(180),M4(180)
00006              COMMON N1,N2,N3,N4,N5,N6
00007              COMMON MRJ,MH,MM,MS,NST,NDIA
00008              COMMON NCTRL(6),IDUM(100)
00009        C     ... COLOR CONTROL(CTRL1)
00010              W=IDUM(3)
00011              IF(W)8,7,8
00012        8     IDUM(3)=0
00013              W=W/11339.8
00014              F=IDUM(5)
00015              F=F/1200.
00016              G=GSUM(10)-W/(ASUM(3)*DENS*F)
00017        C     ...CHECK +/- DIV
00018              IF(G)1,7,2
00019        1     I=1
00020              GO TO 3
00021        2     I=2
00022        C     ...CALCULATE COLOR CTRL PULSES
00023        3     F=IDUM(1)
00024              ICTRL=ABS(G)*F
00025        C     ...CHECK MIN & MAX CTRL PULSES
00026              IF(ICTRL-IDUM(6))7,7,4
00027        4     IF(ICTRL-IDUM(7))6,6,5
00028         5    ICTRL=IDUM(7)
00029         C    ...SET CONTROL TABLE
00030        6     NCTRL(I)=-ICTRL
00031        7     RETURN
00032              END
00001              SUBROUTINE CTRL2
00002              COMMON Y(82),A(32),B(32),ALAR1(31),ALAR2(31)
00003              COMMON AMAX(31),ASUM(31),AMIN(31),GMAX(11),GSUM(11)
00004              COMMON GMIN(11),DENS,BCHP,FTPLS,CC,CB
00005              COMMON M1(180),M2(180),M3(180),M4(180)
00006              COMMON N1,N2,N3,N4,N5,N6
00007              COMMON MRJ,MH,MM,MS,NST,NDIA
00008              COMMON NCTRL(6),IDUM(100)
00009        C     ...LOW POINT CONTROL(CTRL2)
00010        C     ...CALCULATE THE DIV FROM MIN FAB GAUGE READING
00011              IG=GMIN(10)*1000.
```

```
00012              GL=IG-IDUM(4)
00013      C       ...CALCULATE THE DIV FROM ACCEPTABLE AVG SETTING
00014              IG=GSUM(10)*1000.
00015              GA=IG-IDUM(11)
00016              IF(GA-GL)20,20,21
00017      20      GL=GA
00018      21      IF(GL)11,17,12
00019      C       ...CHECK +/- DIV
00020      11      I=3
00021              GO TO 13
00022      12      I=4
00023      C       ...CALCULATE LOW POINT CTRL PULSES
00024      13      F=IDUM(2)
00025              ICTRL=ABS(GL)*F/1000.
00026      C       ...CHECK MIN & MAX CTRL PULSES
00027              IF(ICTRL-IDUM(8))17,17,14
00028      14      IF(ICTRL-IDUM(9))16,16,15
00029      C       ...SET ALARM IF LARGE DISCREPANCY BETWEEN FAB GAUGE AND
00030      C          LOW POINT SETTING IS FOUND(CAL PULSE LIMIT REACHED)
00031      15      IF(ICTRL-IDUM(10))18,19,19
00032      18      ICTRL=IDUM(9)
00033      19      NCTRL(6)=1
0034               GO TO 17
00035      C       ...SET CONTROL TABLE
0036       16      NCTRL(I)=-ICTRL
00037      17      RETURN
00038              END
00039      $0
00001              SUBROUTINE DATLG
00002      C       ... DATA LOG SUBPROGRAM FOR MOBIL WASHINGTON PLANT
00003              DIMENSION LA(31),LG(11)
00004              COMMON Y(82),A(32),B(32),ALAR1(31),ALAR2(31)
00005              COMMON AMAX(31),ASUM(31),AMIN(31),GMAX(11),GSUM(11)
00006              COMMON GMIN(11),DENS,BCHP,FTPLS,CC,CB
00007      C       ... DATA BUFFER FOR INTERFACING EXISTING MOBIL PKG
00008              COMMON M1(180),M2(180),M3(180),M4(180)
00009              COMMON N1,N2,N3,N4,N5,N6
00010              COMMON MRJ,MH,MM,MS,NST,NDIA
00011              COMMON NCTRL(6),IDUM(100)
00012              DATA LA1/1H*/,LA2/1H>/,LA3/1H /,N7/1/
00013              DATA NBAGT/0/,NCHPT/0/, T/0./,M/1/,MSTR/0/
00014              RJT=AMAX(1)*FLOAT(MRJ)+AMIN(1)
00015              A(32)=FLOAT(NDIA)*1.5708
00016              B(1)=FLOAT(NST)*.001
00017              DO 70 I=2,31
00018      70      LA(I)=LA3
00019              DO 71 I=1,11
00020      71      LG(I)=LA3
00021              IF(N6)50,72,50
00022      72      IF(N1)3,11,3
00023      C       ... DOWN MACHINE PROFILES N1>0
00024      3       WRITE(M,2000)MS,N1,N2,N3,N4
00025      C       ...LINEARIZATION OF DM INPUT
00026              DO 10 I=1,180
00027              F=M1(I)
00028              F=F-ASUM(1)
00029              DM1=A(N1)*F    +B(N1)
00030              F=M2(I)
00031              DM2=A(N2)*F +B(N2)
00032              IF(N2-10)5,5,4
00033      4       DM2=DM2+RJT
00034      5       F=M3(I)
00035              IF(N3-2)100,101,100
00036      101     F1=M4(I)
00037              DM3=WIDTH(F,F1)
00038              DM4=0.
00039              GO TO 102
00040      100     DM3=A(N3)*F+B(N3)
00041              IF(N3-10)7,7,6
00042      6       DM3=DM3+RJT
00043      7       F=M4(I)
00044              DM4=A(N4)*F +B(N4)
00045              IF(N4-10)102,102,8
00046      8       DM4=DM4+RJT
00047      102     M1(I)=0
00048              M2(I)=0
```

```
00049              M3(I)=0
00050              M4(I)=0
00051     10       WRITE (M.2001)DM1,DM2,DM3,DM4
00052              MRJ=0
00053     C        ...ZERO DM FLAG
00054              N1=0
00055              N2=0
00056              N3=0
00057              N4=0
00058              RETURN
00059     C        ... SCAN SUMMARY
00060     C        ... START OF SCAN N7=1
00061     11       F2=M2(2)
00062              F3=M2(3)
00063              M2(2)=0
00064              IF(N7)12,14,12
00065     C        ... MAX MIN SUM OF ANALOG INPUT OTHER THAN FAB
00066     C        *...MOBIL WILL SUPPLY WIDTH FORMULA
00067     12       DO 13 1=3,31
00068              AMAX(I)=-1.E10
0069               AMIN(I)= 1.E10
00070     13       ASUM(I)= 0.
00071     C        ... RESET START OF SCAN FLAG N-7=0
00072              N7=0
00073     14       DO 20 I=3,31
00074              IF(I-3)103,104,103
00075     104      F=WIDTH(F2,F3)
00076              GO TO 105
00077     103      F=M2(I)
00078     C         ... LINEARIZATION OF ANALOG INPUT OTHER THAN FAB
00079              F=F*A(I)+B(I)
00080              IF(I-10)105,115,15
00081     115      F=RJT
00082              GO TO 105
00083     15       F=F+RJT
00084     105      IF(AMAX(I)-F)17,18,18
00085     17       AMAX(I)=F
00086     18       IF(AMIN(I)-F)80,80,19
00087     19       AMIN(I)=F
00088     80       ASUM(I)-ASUM(I)+F
00089     20       M2(I)=0
00090              IF(N3)22,21,22
00091     21       RETURN
00092     C        ... END OF SCAN N3=1
00093     C        ... RESET END OF SCAN FLAG N3=0
00094     22       N3=0
00095              MSEC=MM*60+MS
00096              SCANT=MSEC-MSTR
00097              MSTR=MSEC
00098              IF(SCANT)200,200,201
00099     200      SCANT=SCANT+60.
00100     C        ... SET START OF SCAN FLAG N7=1
00101     201      N7=1
00102              DO 30 I=3.31
00103              ASUM(I)=ASUM(I)/180.
00104              IF(N4)27,25,27
00105     C        ... SCREEN CHANGE N4=1
00106     25       IF(ALAR1(I)-ASUM(I)26,26,30
00107     26       LA(I)=LA1
00108     27       IF(ALAR2(I)-ASUM(I))28,28,29
00109     28       LA(I)=LA2
00110     29       N5=1
00111     30       CONTINUE
00112     C        ... FAB GAUGE PROFILE
00113              LN=16
00114     51       I=21
00115              DO 46 N=1,11
00116              IF(N-9)35,31,32
00117     31       I=91
00118              J=180
00119              GO TO 36
00120     32       IF(N-10)36,33,34
00121     33       I=1
00122              J=180
00123              GO TO 36
00124     34       I=1
```

```
00125            J=89
00126            GO TO 36
00127     35     IN=N/2
00128            L=IN+IN-N
00129            I=1+L+23
00130            J=I+21
00131     36     GMAX(N)=-1.E10
00132            GMIN(N)= 1.E10
00133            GSUM(N)= 0.
00134            DO 40 K=I,J
00135            F=M1(K)
00136            IF(GMAX(N)-F)37,38,38
00137     37     GMAX(N)=F
00138     38     IF(GMIN(N)-F)40,40,39
00139     39     GMIN(N)=F
00140     40     GSUM(N)=GSUM(N)+F
00141            GMAX(N)=GMAX(N)*.001+B(1)
00142            GMIN(N)-GMIN(N)*.001+8(1)
00143            GSUM(N)=GSUM(N)/FLOAT(J-I+1)*.001+B(1)
00144     C      ... SCREEN CHANGE DOES NOT APPLY TO HOURLY SUMMARY
00145            IF(N6)41,77,41
00146     C      ...SCREEN CHANGE N4=1
00147     77     IF(N4)43,41,43
00148     41     IF(ALAR1(1)-GSUM(N))42,42,46
00149     42     LG(N)=LA1
00150     43     IF(ALAR2(1)-GSUM(N))44,44,45
00151     44     LG(N)=LA2
00152     45     N5=1
00153     46     CONTINUE
00154            IF(N6)76,75,76
00155     C      ... DIGITAL COUNTS M2(32) -BAGS : M2(33) -CHIPS :
00156     C      ...                 M2(34) -TAKE OFF PL: M2(35) -SCREW R
00157     75     NBAGT=NBAGT+M2(32)
00158            NCHPT=NCAPT+M2(33)
00159            F=M2(35)
00160            RPM=F/SCANT*60.
00161            F=M2(34)
00162            FT=F*FTPLS
00163            WT=WT+FT*ASUM(3)*GSUM(10)*DENS
00164            FT=FT/SCANT*60.
00165            WRITE(M,2002)MH,MM,MS
00166     76     WRITE(M,2003)
00167            WRITE(M,2016)LN,(GMAX(N),N=1,4),GMAX(11)
00168            LN=LN+1
00169            WRITE(M,2017)LN,(LG(N),GSUM(N),N=1,4),LG(11),GSUM(11)
00170            LN=LN+1
00171            WRITE(M,2018)LN,(GMIN(N),N=1,4)GMIN(11)
00172            WRITE(M,2004)
00173            LN=LN+2
00174            WRITE(M,2016)LN,(GMAX(N),N=5,10)
00175            LN=LN+1
00176            WRITE(M,2017)LN,(LG(N),GSUM(N),N=5,10)
00177            LN=LN+1
00178            WRITE(M,2018)LN,(GMIN(N),N=5,10)
00179            IF(N6)47,48,47
00180     48     WRITE(M,2005)
00181            I=11
99182            J=16
00183            LN=24
00184     61     WRITE(M,2006)LN,(AMAX(N),N=I,J)
00185            LN=LN+1
00186            WRITE(M,2007)LN,(LA(N),ASUM(N),N=I,J)
00187            LN=LN+1
00188            WRITE(M,2008)LN,(AMIN(N),N=I,J)
00189            IF(I-11)60,59,60
00190     59     WRITE(M,2009)
00191            I=17
00192            J=23
00193            LN=28
00194            GO TO 61
00195     60     WRITE(M,2010)
00196            LN=32
00197            WRITE(M,2006)LN,(AMAX(I),I=24,26),(AMAX(J),J=6,8)
00198            LN=33
00199            WRITE(M,2007)LN,(LA(I),ASUM(I),I=24,26),
00200           1(LA(J),ASUM(J),J=6,8)
```

```
00201            LN=34
00202            WRITE(M,2008)LN,(AMIN(I),I=24,26),(AMIN(J),J=6,8)
00202            WRITE(M,2012)
00204            LN=40
00205            WRITE(M,2006)LN,AMAX(9),AMAX(3),(AMAX(I),I=28,31)
00206            LN=41
 0207            WRITE(M,2007)LN,LA(9),ASUM(9),LA(3),ASUM(3),
00208           1(LA(I),ASUM(I),I=28,31)
00209            LN=42
00210            WRITE(M,2008)LN,AMIN(9),AMIN(3),(AMIN(I),I=28,31)
00211            WRITE(M,2013)
00212            LN=44
00213            WRITE(M,2006)LN,AMAX(10),AMAX(4),AMAX(5),AMAX(27)
00214            LN=45
00215            WRITE(M,2007)LN,LA(10),ASUM(10),LA(4),ASUM(4),LA(5),
00216           1ASUM(5),LA(27),ASUM(27)
00217            LN=46
00218            WRITE(M,2008)LN,AMIN(10),AMIN(4),AMIN(5),AMIN(27)
00219            WRITE(M,2014)RPM,FT,N4
 0220    C       ... RESET DIGITAL COUNTERS
00221            M2(32)=0
00222            M2(33)=0
00223            M2(34)=0
00224            M2(35)=0
00225    C       ... RESET SCREEN CHANGE FLAG N4=0
00226            N4=0
00227    C       *... CONTROL ALGORITHM TO BE SUPPLIED BY MOBIL
00228            RETURN
00229    C       ... HOURLY SUMMARY N6=1
00230    50      NCATN=NCHPT/IFIX(CC)
00231            IEBTC=FLOAT(NCHPT)*CB*100./FLOAT(NBAGT)+.5
00232            SGO=FLOAT(NCHPT)*BCHP
00233            IESGO=SGO/WT*100.+.5
00234            RCLM=WT-SGO
00235            WRITE(M,2015)MH,MM,MS,NCATN,IEBTC,IESGO,RCLM
00236            NCHPT=0
00237            NBAGT=0
00238            WT=0.
00239            LN=52
00240            N7=1
00241    C       ... INITIATE SCAN INDEX
00242            GO TO 51
00243    C       ... RESET HOURLY FLAG N6=0
00244    47      N6-0
00245            RETURN
00246    2000    FORMAT(/30H 11 DOWN MACHINE PROFILES INT,I4/3H 12.
00247           1I4,1H.,3(I5,1H.))
00248    2001    FORMAT(3H 13,F6.2,3F6.0)
00249    2002    FORMAT(1 6H 14 SCAN SUMMARY,3X,5HTIME ,2(I2,1H.),I2)
00250    2003    FORMAT(10H 15 FILM A.
00251           12X,2HD1,4X,2HD2,5X,2HD3,5X,2HD4,3X,6HSUB TL)
00252    2004    FORMAT(10H 19 FILM B,
00253           12X,2HD5,4X,2HD6,5X,2HD7,5X,2HD8,3X,6HSUB TL,4X,2HTL)
00254    2005    FORMAT(10H 23 BARREL,
00255           12X,2HT1,4X,2HT2,5X,2HT3,5X,2HT4,5X,2HT5,5X,2HT6)
00256    2006    FORMAT(I3,4H HI, 7F7.0)
00257    2007    FORMAT(I3,4H AV, 7(1X,A1,F5.0))
00258    2008    FORMAT(I3,4H LO, 7F7.0)
00259    2009    FORMAT(7H 27 DIE,4X,2HT1,5X,2HT2,5X,2HT3,
00260           15X,2HT4,5X,2HT5,5X,2HT6,5X,2HT7)
00261    2010    FORMAT(8H 31 MELT,
00262           13X,2HT1,5X,2HT2,5X,2HT3,5X,2HP1,5X,2HP2,5X,2HP3)
00263    2012    FORMAT(10H 39 BUBBLE,2X,2HBP,3X,3HWID,4X,3HBST,
00264           14X,3HIBT,4X,3HAT1,4X,3HAT2)
00265    2013    FORMAT(3H 43,8X,2HRT,3X,3HSMA,4X,3HSMV,3X,5HWATER)
00266    2014    FORMAT(9H 47 S RPM,F10.2,11H  TAKE OFF,F10.2,
00267           13X,13HSCREEN CHANGE,I3)
00268    2015    FORMAT(18H 48 HOURLY SUMMARY,3X,5HTIME ,2(I2,1H,),I2//
00269           124H 49 TOTAL NO. OF CARTON ,I7/
00270           224H 50 EFF OF BAG TO CHIPS ,I7/
00271           324H 51 EFF OF STD GOOD PROD,I7,5X,7HRECLAIM,F10.2)
00272    2016    FORMAT(I3,4H HI ,6F7.2)
00273    2017    FORMAT(I3,4H AV ,6(1X,A1,F5.2))
00274    2018    FORMAT(I3,4H LO ,6F7.2)
00275            END
00276    $0
```

```
0001                        *MOBIL OPERATING SYSTEM
0002           014662       CORCO   EQU     '14662
0003                        *SECT ZERO COMMON MOBIL CHEM
0004                                LOAD
0005           013000       MPY     EQU     '13000
0006           013112       DIV     EQU     '13112
0007           014000       DF1     EQU     '14000
0008           014050       DF2     EQU     DF1+40
0009           014120       DF3     EQU     DF2+40
0010           014170       DF4     EQU     DF3+40
0011           014240       DF5     EQU     DF4+40
0012           014310       DF6     EQU     DF5+40
0013           014360       DF7     EQU     DF6+40
0014           014430       DF8     EQU     DF7+40
0015           014500       DF9     EQU     DF8+40
0016           013232       DADD    EQU     '13232
0017                                ORG     '60
0018   00060   0 001616             DAC     PFIR
0019   00061   0 007616             DAC     '7707
0020                                ORG     '63
0021   00063   0 001000             DAC     IHD
0022   00064   0 001300     ASUS    DAC     SUSP    SUSP LINK
0023   00065   0 001314     AUNS    DAC     UNSP    UNSP "
0024   00066   0 001340     ACMX    DAC     LVCX    COM. LEVEL EX. LINK
0025   00067   0 002000     ATOU    DAC     TOUT    ASR OUTPUT
0026   00070   0 013000     AMUL    DAC     MPY     D.P. INT. MULTIPLY-HONEY
0027   00071   0 013112     ADIV    DAC     DIV     D.P. INT. DIVIDE-HONEY
0028   00072   0 001346     ASTR    DAC     STRB    PROG. REQUEST
0029   00073   0 002657     ATIM    DAC     TIME
0030   00074   100000       BT01    OCT     100000  BIT MASK TABL
0031   00075   040000       BT02    OCT     40000
0032   00076   020000       BT03    OCT     20000
0033   00077   010000       BT04    OCT     10000
0034   00100   004000       BT05    OCT     4000
0035   00101   002000       BT06    OCT     2000
0036   00102   001000       BT07    OCT     1000
0037   00103   000400       BT08    OCT     400
0038   00104   000200       BT09    OCT     200
0039   00105   000100       BT10    OCT     100
0040   00106   000040       BT11    OCT     40
0041   00107   000020       BT12    OCT     20
0042   00110   000010       BT13    OCT     10
0043   00111   000004       BT14    OCT     4
0044   00112   000002       BT15    OCT     2
0045   00113   000001       BT16    OCT     1
0046   00114   0 000000     HOUR    DAC     **      TIME OF DAY
0047   00115   0 000000     MINT    DAC     **      TIME OF DAY
0048   00116   0 000000     SECD    DAC     **      TIME OF DAY
0049   00117   0 014000     LDF1    DAC     DF1     PNTRS TO
0050   00120   0 014040     LDF2    DAC     DF2     LINE DATA
0051   00121   0 014120     LDF3    DAC     DF3     FILES
0052   00122   0 014170     LDF4    DAC     DF4
0053   00123   0 014240     LDF5    DAC     DF5
0054   00124   0 014310     LDF6    DAC     DF6
0055   00125   0 014360     LDF7    DAC     DF7
0056   00126   0 014430     LDFS    DAC     DF8
0057   00127   0 014500     LDF9    DAC     DF9
0058   00130   0 014662     ACRQ    DAC     CORQ    CONT. REQ. ROUTINE
0059   00131   0 013232     PDAD    DAC     DADD    D.P. ADD ROUT
0060   00132   0 000000     CSA1    DAC     **      T-ZER CONT. SCAN
0061   00133   0 000000     ADD1    DAC     **      T-ZER A/D SCAN
0062   00134   0 000000     DHD1    DAC     **      T-ZER
0063   00135   0 000000     CRT1    DAC     **      T-ZER
0064   00136   1 000117     ASLD    DAC     LDF1,1  A/D CUR. LDF
0065   00137   0 000001     ASLN    DAC     1       A/D CUR. LINE
0066   00140   0 016000     GSRQ    DAC     '16000  STAND. REQ.
0067   00141   0 000000     ASRQ    DAC     *       AIR SCN.
0068   00142   177777       MYN1    OCT     '177777
0069   00143   000000       PNCO    OCT     '0
0070   00144   000003       PNC3    OCT     3
0071   00145   000005       PNC5    OCT     5
0072   00146   000007       PNC7    OCT     7
0073   00147   000017       PC17    OCT     17
0074   00150   0 002677     AB2S    DAC     B2ST
0075   00151   0 002720     AFSH    DAC     OFSH
```

```
0076    00152   0 002741    ARLC    DAC     RSLC
0077    00153   0 000200    AERM    DAC     ERMS
0078    00154   0 000260    AOIC    DAC     OICV
0079                                ORG     '200
0080                        *ERROR MESSAGE AS RESULT OF MATH ERROR
0081    00200   0 00 00000  ERMS    PZE
0082    00201   000201              IAB
0083    00202   0 04 00250          STA     REGB
0084    00203   000201              IAB
0085    00204   -0 10 00154         JST*    AOIC
0086    00205   0 000241            DAC     REGA
0087    00206   177772              DEC     -6
0088    00207   0 02 00250          LDA     REGB
0089    00210   -0 10 00154         JST*    AOIC
0090    00211   0 000250            DAC     REGB
0091    00212   177772              DEC     -6
0092    00213   0 02 00200          LDA     ERMS
0093    00214   -0 10 00154         JST*    AOIC
0094    00215   0 000232            DAC     REGP
0095    00216   177772              DEC     -6
0096    00217   0 02 00257          LDA     ERMD
0097    00220   -0 10 00067         JST*    ATOU
0098    00221   0 000223            DAC     MTHE
0099    00222   -0 01 00200         JMP*    ERMS
0100    00223   106612      MTHE    VFD     8,'215,8,'212
0101    00224   146701              BCI     6,MATH ERROR
        00225   152310
        00226   120305
        00027   151322
        00230   147722
        00231   120240
0102    00232   000240      REGP    OCT     240,240,240,240,240,240
        00233   000240
        00234   000240
        00235   000240
        00236   000240
        00237   000240
0103    00240   120240              BCI     1,
0104    00241   000240      REGA    OCT     240,240,240,240,240,240
        00242   000240
        00243   000240
        00244   000240
        00245   000240
        00246   000240
0105    00247   120240              BCI     1,
0106    00250   000240      REGB    OCT     240,240,240,240,240,240
        00251   000240
        00252   000240
        00253   000240
        00254   000240
        00255   000240
0107    00256   106612              VFD     8,'215,8,'212
0108    00257   000434      ERMD    VFD     8,1,8,ERMD-MTHE
0109                        *CONVERTS A TO OCTAL CHARACTERS
0110    00260   0 00 00000  OICV    PZE
0111    00261   000201              IAB     PUT VALUE IN B
0112    00262   -0 02 00260         LDA*    OICV            RESULTANT ADD
0113    00263   0 04 00310          STA     OADR
0114    00264   0 12 00260          IRS     OICV
0115    00265   -0 02 00260         LDA*    OICV NUMBER OF CHARS.
0116    00266   0 04 00311          STA     OCNT
0117    00267   0 12 00260          IRS     OICV
0118    00270   0 05 00145          ERA     PNMS FIRST BIT IGNORED
0119    00271   100040              SZE
0120    00272   0 01 00303          JMP     OSIX NO, GET IT
0121    00273   0410 77             LLL     1 YES, GET RID OF IT
0122    00274   0 02 00307  NX10    LDA     026 CONSTRUCT ASCII
0123    00275   0410 75             LLL     3 FROM B
0124    00276   -0 04 00310         STA*    UADR PUT IT AWAY
0125    00277   0 12 00310          IRS     OADR
0126    00300   0 12 00311          IRS     OCNT DONE YET
0127    00301   0 01 00274          JMP     NXTO NO, TRY NEXT
0128    00302   -0 01 00260         JMP*    UICV YES, RETURN
0129    00303   0 02 00306  OSIX    LDA     0130 CONSTRUCT ASCII
```

```
0130   00304   0410 77           LLL    1 FROM B
0131   00305   0 01 00276        JMP    NXTO+2
0132   00306   000130    C130    OCT    130
0133   00307   000026    C26     OCT    26
0134   00310   0 00 00000 OADR   PZE
0135   00311   0 00 00000 OCNT   PZE
0136   00312   0 012600   XB2D   DAC    '12600
0137   00313   0 012647   XD2B   DAC    '12647
0138   00314   000000     PR21   BSZ    11
0139                             *11MERS USED BY REEL CUT
0140                                    ORG    20000
0141   20000              ABP1   BSS    T28 INPUT BUFFERS
0142   20200              ABP2   BSS    128
0143   20400              ABP3   BSS    146
0144   20622              ABP4   BSS    240
0145   21202              ABP5   BSS    164
0146   21446              ABP6   BSS    384
0147   22246              ABP7   BSS    1
0148   22247              ABP8   BSS    1
0149   22250              ABP9   BSS    1
0150   22251              AB21   BSS    128
0151   22451              AB22   BSS    128
0152   22651              AB23   BSS    146
0153   23073              AB24   BSS    240
0154   23453              AB25   BSS    164
0155   23717              AB26   BSS    384
0156   24517              AB27   BSS    1
0157   24520              AB28   BSS    1
0158   24521              AB29   BSS    1
0159   24522              POB1   BSS    128 PROFILE BUFFERS
0160   24722              POB2   BSS    128
0161   25122              POB3   BSS    146
0162   25344              POB4   BSS    240
0163   25724              POB5   BSS    164
0164   26170              POB6   BSS    384
0165   26770              POB7   BSS    1
0166   26771              POB8   BSS    1
0167   26772              POB9   BSS    1
0168                             MOR
0001                             *MOBIL EXEC. AND PRIORTY MANGER
0002                             LOAD
0003                             ORG    '1000
0004                             *INTERRUPT HANDLER
0005   01000   0 000000   IHD    DAC    **
0006   01001   0 10 01003        JST    IHRS
0007   01002   0 01 01367        JMP    IHID
0008   01003   0 000000   IHRS   DAC    **   SAVE RETRN
0009   01004   0 04 01033        STA    AREG SAVE INT. PROG REGS.
0010   01005   000201            IAB
0011   01006   0 04 01034        STA    BREG
0012   01007   0 15 01036        STX    XREG
0013   01010   000043            INK
0014   01011   0 04 01035        STA    KREG
0015   01012   0 02 01000        LDA    IHD
0016   01013   0 04 01037        STA    PREG
0017   01014   -0 01 01003       JMP*   IHRS
0018                             *ENTER HERE TO RESTORE USER OR NEW LEVEL
0019   01015   1 02 01034 IHR    LDA    BREG,1 XREGISTER CONTAINS
0020   01016   000201            IAB           OFFSET IN TO REG.
0021   01017   1 02 01035        LDA    KREG,1 SAVE TABLE
0022   01020   140320            CSA
0023   01021   1 02 01033        LDA    AREG,1
0024   01022   0 04 01032        STA    IPNT
0025   01023   1 02 01037        LDA    PREG, 1
0026   01024   0 04 01000        STA    IHD
0027   01025   1 02 01036        LDA    XREG,1
0028   01026   0 04 00000        STA    0
0029   01027   0 02 01032        LDA    IPNT
0030   01030   000401            ENB
0031   01031   -0 01 01000       JMP*   IHD    RETURN TO PROG.
0032   01032   000000     IPNT   HLT           TEMP STOR.
0033   01033   000000     AREG   HLT           REG. STORE FOR INT. PROG.
0034   01034   000000     BREG   HLT
0035   01035   000000     KREG   HLT
```

| | | | | | |
|---|---|---|---|---|---|
| 0036 | 01036 | 000000 | XREG | HLT | |
| 0037 | 01037 | 000000 | PREG | HLT | |
| 0038 | 01040 | 000000 | LV1S | HLT | LEVEL 1 A REG |
| 0039 | 01041 | 000000 | | HLT | B REG |
| 0040 | 01042 | 000000 | | HLT | K REG |
| 0041 | 01043 | 000000 | | HLT | X REG |
| 0042 | 01044 | 000000 | | HLT | P COUNT |
| 0043 | 01045 | 000000 | LV2S | HLT | LEVL2 |
| 0044 | 01046 | 000000 | | HLT | |
| 0045 | 01047 | 000000 | | HLT | |
| 0046 | 01050 | 000000 | | HLT | |
| 0047 | 01051 | 000000 | | HLT | |
| 0048 | 01052 | 000000 | LV3S | HLT | LDVL3 |
| 0049 | 01053 | 000000 | | HLT | |
| 0050 | 01054 | 000000 | | HLT | |
| 0051 | 01055 | 000000 | | HLT | |
| 0052 | 01056 | 000000 | | HLT | |
| 0053 | 01057 | 000000 | LV4S | HLT | LDVL4 |
| 0054 | 01060 | 000000 | | HLT | |
| 0055 | 01061 | 000000 | | HLT | |
| 0056 | 01062 | 000000 | | HLT | |
| 0057 | 01063 | 000000 | | HLT | |
| 0058 | 01064 | 000000 | LV5S | HLT | |
| 0059 | 01065 | 000000 | | HLT | |
| 0060 | 01066 | 000000 | | HLT | |
| 0061 | 01067 | 000000 | | HLT | |
| 0062 | 01070 | 000000 | | HLT | |
| 0063 | | | | *END OF REG. SAVE TABLE | |
| 0064 | 01071 | 0 001033 | PARG | DAC | AREG |
| 0065 | 01072 | 0 177777 | SYSL | DAC | -1 |
| 0066 | 01073 | 000000 | LVR1 | HLT | REQ. WRD LEVEL 1 -5 |
| 0067 | 01074 | 000000 | LVR2 | HLT | REQ. WRD LEVEL 2 -4 |
| 0068 | 01075 | 000000 | LVR3 | HLT | REQ. WRD LEVEL 3 -3 |
| 0069 | 01076 | 000000 | LVR4 | HLT | REQ. WRD LEVEL 4 -2 |
| 0070 | 01077 | 040000 | | OCT | '40000 REQ. WRD LEVEL BASE ALWA |
| 0071 | 01100 | 0 001100 | LVRB | DAC | *   BASE VALUE |
| 0072 | 01101 | 0 177773 | NLVL | DAC | LVRI-LVRB NUMBER OF LEVELS |
| 0073 | 01102 | 000005 | LOST | DEC | 5 |
| 0074 | 01103 | 000012 | | DEC | 10 |
| 0075 | 01104 | 000017 | | DEC | 15 |
| 0076 | 01105 | 000024 | | DEC | 20 |
| 0077 | 01106 | 000031 | | DEC | 25 |
| 0078 | 01107 | 0 001107 | LOSP | DAC | * |
| 0079 | 01110 | 0 000103 | ANKT | DAC | BTOS |
| 0080 | 01111 | 0 001111 | LVES | DAC | LVE1-1 ADDR OF PROG REQ. TABLE |
| 0081 | 01112 | 000000 | LVE1 | BSZ | '10 |
| 0082 | 01122 | 000000 | LVE2 | BSZ | '10 |
| 0083 | 01132 | 000000 | LVE3 | BSZ | '10 |
| 0084 | 01142 | 000000 | LVE4 | BSZ | '10 |
| 0085 | 01152 | 000000 | LVE5 | BSZ | '10 |
| 0086 | 01162 | 000000 | | HLT | DEVICE UNSUSPEND TABLE |
| 0087 | 01163 | 000000 | | HLT | CONTAINS DEVICE NUMBER FO |
| 0088 | 01164 | 000000 | | HLT | WHICH LEVEL IS SUSPENDED |
| 0089 | 01165 | 000000 | | HLT | |
| 0090 | 01166 | 000000 | | HLT | |
| 0091 | 01167 | 0 001167 | DUST | DAC | *   BASE ADDR |
| 0092 | 01170 | 0 35 01101 | CPRI | LDX | NLVL |
| 0093 | 01171 | 1 02 01100 | | LDA | LVRB, 1 CHEK ACTIVE LEVEL |
| 0094 | 01172 | 100400 | | SPL | SKIP NOT SUSP |
| 0095 | 01173 | 0 01 01201 | | JMP | *+6 LEVEL SUSP GO NEXT |
| 0096 | 01174 | 0414 77 | | LGL | 1   CHK ACTIVE BIT |
| 0097 | 01175 | 100400 | | SPL | SKIP NOT ACT |
| 0098 | 01176 | 0 01 01227 | | JMP | RALV LEVEL ACT NOT SUSP |
| 0099 | 01177 | 100040 | | SZE | SKIP IF NO REQ |
| 0100 | 01200 | 0 01 01234 | | JMP | ANLV LEVEL REQ GO ENTER |
| 0101 | 01201 | 0 12 00000 | | IRS | 0   IF SKIPS PROBLEM |
| 0102 | 01202 | 0 01 01171 | | JMP | CPRI + 1 TRY NEXT LEVEL P |
| 0103 | 01203 | 000000 | | HLT | BASE LEVEL FOUND INTACT. |
| 0104 | 01204 | 0 000000 | LVMV | DAC | **   MOV REGS. |
| 0105 | 01205 | 0 02 00000 | | LDA | 0   ACTIVATE LEVEL |
| 0106 | 01206 | 000201 | | IAB | SAVE INDEX |
| 0107 | 01207 | 0 35 01072 | | LDX | SYSL |
| 0108 | 01210 | 1 02 01107 | | LDA | LOSP, 1 GET LVL OFSET |
| 0109 | 01211 | 0 04 00000 | | STA | 0   SET XREG FOR MOVE |
| 0110 | 01212 | 0 02 01033 | | LDA | AREG MOVE REG OF INT. |

```
0111   01213   1 04 01033         STA    AREG, 1 PROGRAM TO RST
0112   01214   0 02 01034         LDA    BREG
0113   01215   1 04 01034         STA    BREG, 1
0114   01216   0 02 01035         LDA    KREG
0115   01217   1 04 01035         STA    KREG, 1
0116   01220   0 02 01036         LDA    XREG
0117   01221   1 04 01036         STA    XREG, 1
0118   01222   0 02 01037         LDA    PREG
0119   01223   1 04 01037         STA    PREG, 1
0120   01224   000201             IAB
0121   01225   0 04 00000         STA    0
0122   01226   -0 01 01204        JMP*   LVMV
0123                              *ROUT TO REACT UNSUSP PROGRAM
0124   01227   0 10 01204  RALV   JST    LVMV
0125   01230   0 15 01072         STX    SYSL
0126   01231   1 02 01107         LDA    LOSP, 1 GET OFFSET REG
0127   01232   0 04 00000         STA    0  SAVE TABLE
0128   01233   0 01 01015         JMP    IHR
0129   01234   0 13 01204  ANLV   IMA    LVMV   AC=PEQ BIT*2
0130   01235   140040             CRA           ZERO BIT COUNT
0131   01236   0 13 01204         IMA    LVMV
0132   01237   0404 77            LGR    1
0133   01240   141340             ICA           PUT 8 REG BITS IN HIGH
0134   01241   100000             SKP
0135   01242   0414 77            LGL    '1  BIT 3 TO BIT 1
0136   01243   0 12 01204         IRS    LVMV   COUNT BITS
0137   01244   101400             SMI
0138   01245   0 01 01242         JMP    *-3  CHECK NEXT BIT
0139   01246   0 02 01204         LDA    LVMV  FOUND ACT BIT
0140   01247   0 06 01110         ADD    AMKT  ADDR OF MASK TABLE
0141   01250   0 04 01032         STA    I PNT
0142   01251   -0 02 01032        LDA*   I PNT GET MASK
0143   01252   1 05 01100         ERA    LVRB, 1
0144   01253   0 06 00075         ADD    BT02    SET ACT. BIT
0145   01254   1 04 01100         STA    LVRB, 1 CLEAR REQUEST BIT
0146   01255   0 02 00000         LDA    0  GET-LEVEL
0147   01256   0 06 01102         ADD    LOST  ADD 5 TO NEG. LEVEL
0148   01257   0414 75            LGL    3  X NUMBER OF ENTIRES
0149   01260   0 06 01204         ADD    LVMV  PLUS BIT NUMBER
0150   01261   0 06 01111         ADD    LVES  PLUS BASE ADDR
0151   01262   0 04 01204         STA    LVMV
0152   01263   -0 02 01204        LDA*   LVMV  GET NEW ADDR
0153   01264   101040             SNZ           MUST BE NONE ZERO
0154   01265   000000             HLT    IF ZERO HALT SYSTEM BOMB
0155   01266   0 04 01000         STA    IHD
0156   01267   0 10 01204         JST    LVMV
0157   01270   0 15 01072         STX    SYSL   SET NEW SYSTEM LEVEL
0158   01271   140040             CRA           INT REG FOR NEW
0159   01272   000201             IAB           ENTRY
0160   01273   140040             CRA
0161   01274   0 04 00000         STA    0
0162   01275   140320             CSA
0163   01276   000401             ENB
0164   01277   -0 01 01000        JMP*   IHD
0165                              *CALLING SEQ+
0166                              *INH
0167                              *JST ASUS  (SECTOR 0)
0168                              *DEVICE  #
0169   01300   0 000000    SUSP   DAC    **
0170   01301   0 02 01300         LDA    *-1
0171   01302   141206             ADA
0172   01303   0 04 01000         STA    IHD
0173   01304   0 10 01003         JST    IHRS   SAVE CALLERS REG
0174   01305   0 35 01072         LDX    SYSL
0175   01306   1 02 01100         LDA    LVRB, 1 GET PROG REQ. WORD
0176   01307   140500             SSM
0177   01310   1 04 01100         STA    LVRB, 1 PUT BACK PLUS B1=1
0178   01311   -0 02 01300        LDA*   SUSP  GET DEV NUMBER
0179   01312   1 04 01167         STA    DUST, 1 PUT IT IN DEV UNSUSP
0180   01313   0 01 01170         JMP    CPRI  TABLE
0181                              *ROUTINETO UNSUSP A LEVEL(S)
```

```
0182                              *WAITING FOR A DEVICE
0183                              *CALLING SEQ+ INH
0184                              *            JST*  AUNS
0185                                           DEVICE NUMBER
0186    01314   0 000000   UNSP DAC   **
0187    01315   0 15 01336       STX   UXRG
0188    01316   0 35 01101       LDX   NLVL   GET REQ. DEV. NUMBER
0189    01317  -0 02 01314       LDA*  UNSP
0190    01320   1 11 01167  UNS2 CAS   DUST, 1 SEE IF EQUAL
0191    01321   0 01 01331       JMP   UNS1   NOT EQUAL
0192    01322   100000           SKP          DEV NUMBERS EQUAL
0193    01323   0 01 01331       JMP   UNS1
0194    01324   140040           CRA
0195    01325   0 04 01167       STA   DUST
0196    01326   1 13 01100       IMA   LVRB, 1 GET LEVEL WORD
0197    01327   140100           SSP
0198    01330   1 13 01100       IMA   LVRB, 1
0199    01331   0 12 00000  UNS1 IRS   0  SKIP IF ALL LEVELS CHKD.
0200    01332   0 01 01320       JMP   UNS2
0201    01333   0 12 01314       IRS   UNSP
0202    01334   0 35 01336       LDX   UXRG
0203    01335  -0 01 01314       JMP*  UNSP
0204    01336   0 00 00000  UXRG PZE
0205                              *COMMON EXIT
0206    01337   037777      MBK2 OCT   '37777
0207    01340   001001      LVCX INH
0208    01341   0 35 01072       LDX   SYSL
0209    01342   1 02 01100       LDA   LVRB, 1
0210    01343   0 03 01337       ANA   MBK2
0211    01344   1 04 01100       STA   LVRB, 1
0212    01345   0 01 01170       JMP   CPRI
0213                              *LEVEL REQUEST SUB. KILLS A REG.
0214                              *INH
0215                              *JST*  ASTB AC=CALL NUMBER
0216                              *+ 1 RETURN
0217    01346   0 000000    STRB DAC   **
0218    01347   0400 74          LRL   4
0219    01350   101000           NOP
0220    01351   0 06 01365       ADD   ABMT
0221    01352   0 04 01314       STA   UNSP   ADDBIT MASK
0222    01353   140040           CRA
0223    01354   0410 74          LLL   4
0224    01355   0 06 01366       ADD   LPBS
0225    01356   0 04 01300       STA   SUSP
0226    01357  -0 02 01314       LDA*  UNSP   GET BIT MSK
0227    01360   140401           CMA
0228    01361  -0 03 01300       ANA*  SUSP   MSK BIT
0229    01362  -0 06 01314       ADD*  UNSP
0230    01363  -0 04 01300       STA*  SUSP
0231    01364  -0 01 01346       JMP*  STRB
0232    01365   0 000103    ABMT DAC   BTO8
0233    01366   0 001072    LPBS DAC   LVR1-1
0234            000063      IH   EQU   '63
0235                              *INTERRUPT SERVICE AND IDENTIFICATION
0236                                    LOAD
0237    01367   34 0551     IHID SKS   '551
0238    01370   0 01 01565       JMP   SRTC   GO SERVICE RTC
0239    01371   140040           CRA
0240    01372   0 04 00000       STA   0
0241    01373   34 0351          SKS   '351
0242    01374   0 01 01460       JMP   CCD    CCD#4
0243    01375   34 0251          SKS   '251
0244    01376   0 01 01461       JMP   CCD+ 1 CCD#3
0245    01377   34 0151          SKS   '151
0246    01400   0 01 01462       JMP   CCD+ 2 CCD#2
0247    01401   34 0051          SKS   '51
0248    01402   0 01 01463       JMP   CCD+ 3 CCD#1
0249    01403   0 35 00143  TTIR LDX   PNCO
0250    01404   34 0404          SKS   '404   SKIP NOT ASR 1
0251    01405   0 01 01536       JMP   TTIS+ 1
0252    01406   34 0470          SKS   0470   SKIP NOT ASR 2
```

MOBIL OPERATING SYSTEM

REPLACE LINES 303 THRU 312, PAGES 9, 10

```
      01470        141044            CAR
      01471        010636            STA       '636
      01472        140401            CMA
      01473        047503            ANA       CCD3,1
      01474        012636            ERA       '636
      01475        051503            STA       CCD3,1
      01476        045513            LDA       IOAL+4,1
      01477        171377            OTA       '1377
      01500        000000            HLT
      01501        031677            OCP       '1677
      01502        003517            JMP       CCDR
      00636        000000      CCD2  PZE
 0253 01407      0 01 01535            JMP     TTIS
 0254 01410      0 35 00143   CRTT     LDX     PNCO
 0255 01411       34 1040              SKS     1040
 0256 01412      0 01 01446            JMP     CRTS
 0257 01413      0 12 00000            IRS     0
 0258 01414       34 1041              SKS     1041 SKP IF NOT CRT 2
 0259 01415      0 01 01446            JMP     CRTS
 0260 01416      0 12 00000            IRS     0
 0261 01417       34 1042              SKS     1042 SKIP NOT CRT 3
 0262 01420      0 01 01446            JMP     CRTS
 0263 01421      0 12 00000            IRS     0
 0264 01422       34 1043              SKS     '1043 SKIP NOT CRT 4
 0265 01423      0 01 01446            JMP     CRTS
 0266 01424      0 12 00000            IRS     0
 0267 01425       34 1044              SKS     '1044 SKIP NOT CRT 5
 0268 01426      0 01 01446            JMP     CRTS
 0269 01427      0 12 00000            IRS     0
 0270 01430       34 1045              SKS     '1045 SKIP NOT CRT 6
 0271 01431      0 01 01446            JMP     CRTS
 0272 01432      0 12 00000            IRS     0
 0273 01433       100000              SKP             SKIP NOT CRT 7
 0274 01434      0 01 01446            JMP     CRTS
 0275 01435      0 12 00000            IRS     0    SKP SKIP NOT CRT 8
 0276 01436       100000              SKP      SKIP NOT CRT 8
 0277 01437      0 01 01446            JMP     CRTS
 0278 01440      0 12 00000            IRS     0
 0279 01441       100000              SKP             SKP NOT CRT 9
 0280 01442      0 01 01446            JMP     CRTS
 0281 01443       000000              HLT
 0282 01444     -0 01 01445            JMP*    RSTR
U0283 01445      0 007707    RSTR      DAC     RSUP
 0284 01446     -0 10 00065  CRTS      JST*    AUNS
 0285 01447       000002              OCT      2    CRT DEV #
 0286 01450      0 02 01457            LDA     COCP
 0287 01451      0 06 00000            ADD     0    BUILD OCP INSTR.
 0288 01452      0 04 01453            STA     *+1
 0289 01453       14 1040              OCP     '1040 CLR CRT INSTR.
 0290 01454       140040              CRA      CRT CLEAR
 0291 01455      0 04 01723            STA     DCRT
 0292 01456      0 01 01170            JMP     CPRI
 0293 01457       14 1040    COCP      OCP     '1040
 0294                       *CCD PREPROCESSOR PART OF INT HANDLER
```

```
0295  01460  0 12 00000  CCD  IRS   0
0296  01461  0 12 00000       IRS   0
0297  01462  0 12 00000       IRS   0
0298  01463  1 02 01507       LDA   IOAL, 1
0299  01464  74 1377          OTA   '1377 SEL.CIM
0300  01465  000000           HLT
0301  01466  54 1077          INA   '1077 READ STATUS ON
0302  01467  000000           HLT
0303  01470  0 04 01502       STA   CCD2 OR WITH PREV
0304  01471  140401           CMA
0305  01472  1 03 01503       ANA   CCD3, 1
0306  01473  0 05 01502       ERA   CCD2
0307  01474  1 04 01503       STA   CCD3, 1
```

MOBIL OPERATING SYSTEM

INSERT AFTER LINE 342, PAGE 10

```
00364  100400        SPL
00365  103371        JMP*  TTIN
00366  101040        SNZ
00367  103371        JMP*  TTIN
00370  103372        JMP*  BACK
00371  001544  TTIN  DAC   '1544
00372  001541  BACK  DAC   '1541

0308 01475  1 02 01513        LDA   IOAL+ 4,1
0309 01476  74 1377           OTA   '1377
0310 01477  000000            HLT
0311 01500  14 1677           OCP   '1677
0312 01501  0 01 01517        JMP   CCDR
0313 01502  0 000000  CCD2 DAC  **
0314 01503  0 000000  CCD3 DAC  **   CCD1 STATUS
0315 01504  0 000000       DAC  **   CCD2 STATUS
0316 01505  0 000000       DAC  **   CCD3 STATUS
0317 01506  0 000000       DAC  **   CCD4 STATUS
0318 01507  000212    IOAL OCT  '212  FUNCT UW
0319 01510  000216         OCT  '216
0320 01511  000222         OCT  '222
0321 01512  000226         OCT  '226
0322 01513  000014         OCT  '14   FUNCT CODES
0323 01514  000020         OCT  '20
0324 01515  000024         OCT  '24
0325 01516  000030         OCT  '30
0326 01517  0 02 01527 CCDR LDA  MN4
0327 01520  0 04 00000      STA  0
0328 01521  1 02 01507      LDA  CCD3+ 4,1
0329 01522  100040          SZE
0330 01523  0 01 01530      JMP  CDRR
0331 01524  0 12 00000      IRS  0
0332 01525  0 01 01521      JMP  *-4
0333 01526  0 01 01170      JMP  CPRI
0334 01527  177774     MN4  DEC  -4
0335 01530  0 02 01533 CDRR LDA  *+3
0336 01531  -0 10 00072      JST* ASTR
0337 01532  0 01 01170       JMP  CPRI
0338 01533  000101           OCT  101
0339 01534  0 01 01170       JMP  CPRI
0340                    TELETYPE SERVICE [RT OF INT. HANDLER
0341 01535  0 12 00000 TTIS IRS  0
0342 01536  -1 02 01536      LDA* TTBY,1 X = TTY #
0343 01537  101040           SNZ        SKP TTY BUSY
0344 01540  0 01 01544       JMP  TTIN MUST BE INPUT
0345 01541  -0 15 01561      STX* PASR MUST BE OUTPUT COMPLETE
0346 01542  -0 10 01562      JST* ASAR
0347 01543  0 01 01403       JMP  TTIR CHAR OUT
0348 01544  1 02 01544  TTIN LDA  TTIO,1 GET IN CHAR
0349 01545  0 04 01550       STA  *+3  SET
0350 01546  1 02 01556       LDA  TTIO+2,1
0351 01547  0 04 01552       STA  *+3
0352 01550  54 1004          INA  '1004 GET CHAR FROM BUFFER
```

```
0353 01551  101000              NOP
0354 01552  14 0004              OCP    '4      SELECT INPUT AND CLEAR IN
0355 01533 -0 01 01560            JMP*   TTIP
0356 01554  54 1004      TTIO INA        '1004
0357 01555  54 1070           INA        '1070
0358 01556  14 0004           OCP        '4
0359 01557  14 0070           OCP        '70
0360 01560  0 011000      TTIP DAC       '12377  ADDR INPUT SERVICE
0361 01561  0 002252      PASR DAC       ASRN
0362 01562  0 002116      ASAR DAC       SASR    TTY DRIVE
0363 01563  0 002222      TTBY DAC       DCTB    BUSY TTY 1
0364 01564  0 002231           DAC       DCTB+7  BUSY TTY 2
0365                          *ROUT. TO SEVICE RTC
0366 01565  0 02 01615    SRTC LDA       K036
0367 01566  74 1377            OTA       '1377   PICK UP CIM
0368 01567  000000             HLT
0369 01570  14 1677            OCP       '1677
0370 o1571  0 12 01611         IRS       MCX5    FIFTH INT. 25 MS
0371 01572  0 01 01605         JMP       SRT1
0372 01573  0 02 01624         LDA       SR22    CALL A/D SCAN
0373 01574 -0 10 00072         JST*      ASTR
0374 01575  0 02 01612         LDA       MCX5+1
0375 01576  0 04 01611         STA       MCX5    RESET 25 M.S.
0376 01577  0 12 01613         IRS       MCX5+2  BOOMS ELAPSED ?
0377 01600  0 01 01605         JMP       SRT1
0378 01601  0 02 01614         LDA       MCX5+3
0379 01602  0 04 01613         STA       MCX5+2  RESET BOOMS COUNT
0380 01603  0 02 01625         LDA       SR21    REQ. STSTM TIMER
0381 01604 -0 10 00072         JST*      ASTR
0382 01605  0 02 01610    SRT1 LDA       *+3
0383 01606  0 10 01346         JST       STRB
0384 01607  0 01 01170         JMP       CPRI
0385 01610  000121             OCT       121
0386 01611  0 177773      MCX5 DAC       -5       25MS COUNT
0387 01612  0 177773           DAC       -5       RESET
0388 01613  0 177776           DAC       -2
0389 01614  0 177776           DAC       -2
0390 01615  000034        K036 OCT       '34
0391 01616  0 000000      PFIR DAC       0
0392 01617  0 02 01623         LDA       PFRS
0393 01620  0 04 00000         STA       0
0394 01621  000000             HLT
0395 01622  0 01 01621         JMP       *-1
0396 01623 -0 01 00061    PFRS JMP*      '61
0397        001371        NCCD EQU       IHID+2
0398 01624  000022        SR22 OCT       '22
0399 01625  000021        SR21 OCT       '21      CALL WORDS
0400                           *SYSTEM TIMER MOBIL
0401                           *SYSTEM TIMER
0402                           *CALL EVERY 50 MS.
0403 01626  0 35 01703    CIOK LDX       CTLG    INDEX FOR TABLE
0404 01627  1 02 01726    OVER LDA       TABM,1  GET NEXT ENTRY
0405 01630  101040             SNZ                SKIP IF TIMER = ZERO
0406 01631  0 01 01642         JMP       OVE1    MOVE TO NEXT
0407 01632  1 12 01726         IRS       TABM,1  BUMP TIMER
0408 01633  0 01 01642         JMP       OVE1
0409 01634  1 02 01747         LDA       TABP,1
0410 01635  001001             INH               AC=PROGRAM CALL WORD
0411 01636 -0 10 00072         JST*      ASTR
0412 01637  000401             ENB
0413 01640  1 01 01770         LDA       TABK,1  GET RESET
0414 01641  1 04 01726         STA       TABM,1
0415 01642  0 12 00000    OVE1 IRS       0       MORE TIMERS
0416 01643  0 01 01627         JMP       OVER
0417 01644  0 12 01701         IRS       C1UP    TIME TO UP DATE
```

MOBIL OPERATING SYSTEM

INSERT AFTER LINE 419, PAGE 12

```
01773  004101  LDA   BT07
01774  123772  CAS*  RLTA
01775  125772  IRS*  RLTA
01776  003651  JMP   1651
01777  003651  JMP   1651
```

```
0418 01645  -0 01 00066        JMP*  ACMX  CLOCK
0419 01646   0 35 01771        LDX   RLTN
0420 01647  -0 12 01772        IRS*  RLTA
0421 01650    101000           NOP
0422 01651   0 12 00000        IRS   0
0423 01652   0 01 01647        JMP   *-7
0424 01653   0 02 01702        LDA   C2UP  USED BY REEL CUT ALLOW
0425 01654   0 04 01701        STA   C1UP  RESET UPDATE TIMER
0426 01655   0 12 00116        IRS   SECD
0427 01656   0 02 00116        LDA   SECD
0428 01657   0 10 01674        JST   C1TS  CHCK SEC
0429 01660   0 04 00116        STA   SECD
0430 01661   0 12 00115        IRS   MINT
0431 01662   0 02 00115        LDA   MINT
0432 01663   0 10 01674        JST   C1TS  CHECK MINT
0433 01664   0 04 00115        STA   MINT
0434 01665   0 12 00114        IRS   HOUR
0435 01666   0 02 00114        LDA   HOUR
0436 01667   0 06 01704        ADD   C124
0437 01670    100400           SPL         SKIP=> 24 HOURS
0438 01671  -0 01 00066        JMP*  ACMX
0439 01672   0 04 00114        STA   HOUR  RESET HOUR
0440 01673  -0 01 00066        JMP*  ACMX
0441 01674   0 000000    C1TS  DAC   **
0442 01675   0 06 01705        ADD   C174
0443 01676    100400           SPL
0444 01677  -0 01 00066        JMP*  ACMX  CRA
0445 01700  -0 01 01674        JMP*  C1TS
0446 01701    177754     C1UP  OCT   -24
0447 01702    177754     C2UP  OCT   -24
0448 01703   0 177760    CTLG  DAC   TABL-TABM
0449 01704    177750     C124  OCT   -30
0450 01705    177704     C174  OCT   -74
0451 01706    177730     TABL  OCT   -50   DISPLAY
0452 01707    177774           OCT   -4    WATCH DOG
0453 01710    177763           OCT   -15   PROFILE
0454 01711    177766           OCT   -12   CONT SCAN
0455 01712    000000           OCT
0456 01713    000000           OCT
0457 01714    000000           OCT
0458 01715    000000           OCT
0459 01716    000000           OCT
0460 01717    000000           OCT
0461 01720    000000           OCT
0462 01721    000000           OCT
0463 01722    000000    DSTD   OCT         STD.REQ,SET BY STD PROG.
0464 01723    000000    DCRT   OCT
0465 01724    000000    DTM1   OCT   0
0466 01725    000000    DTM2   OCT   0
0467 01726   0 001726   TABM   DAC   TARM  PROG REQUEST TABLE
0468 01727    000044           OCT   44
0469 01730    000061           OCT   61
0470 01731    000043           OCT   43
0471 01732    000024           OCT   103
0472 01733    000000           OCT
```

MOBIL OPERATING SYSTEM

Replace Lines 508 to 584 Page 13-15

```
02001    073220              LDX   STAC
02002    050000              STA   0,1
02003    105000              LDA*  TOUT
02004    050001              STA   1,1
02005    005000              LDA   TOUT
02006    141206              AOA
02007    050002              STA   2,1
02010    033221              STX   SAUX
02011    044000              LDA   0,1
02012    040070              LRL   8
02013    010000      TOB3    STA   0
02014    045240              LDA   DTAB,1
02015    010000              STA   0
```

| | | | | |
|---|---|---|---|---|
| 02016 | 044000 | | LDA | 0,1 |
| 02017 | 100400 | | SPL | |
| 02020 | 003107 | | JMP | TOB1 |
| 02021 | 140040 | | CRA | |
| 02022 | 041070 | | LLL | 8 |
| 02023 | 054001 | | ADD | 1,1 |
| 02024 | 101400 | | SMI | |
| 02025 | 10325 | | JMP* | '2250 |
| 02026 | 056001 | | SUB | 1,1 |
| 02027 | 140407 | | TCA | |
| 02030 | 011246 | | STA | ATKL |
| 02031 | 140407 | | TCA | |
| 02032 | 054001 | | ADD | 1,1 |
| 02033 | 050001 | | STA | 1,1 |
| 02034 | 044002 | | LDA | 2,1 |
| 02035 | 033247 | | STX | SXV |
| 02036 | 073221 | | LDX | SAUX |
| 02037 | 050003 | | STA | 3,1 |
| 02040 | 004000 | | LDA | 0 |
| 02041 | 015253 | | ADD | PN66 |
| 02042 | 01220 | | STA | STAC |
| 02043 | 005246 | | LDA | ATK1 |
| 02044 | 050004 | | STA | 4,1 |
| 02045 | 005247 | | LDA | SXV |
| 02046 | 050005 | | STA | 5,1 |
| 02047 | 044000 | | LDA | 0,1 |
| 02050 | 141050 | | CAL | |
| 02051 | 054003 | | ADD | 3,1 |
| 02052 | 073247 | | LDX | SXV |
| 02053 | 062004 | | CAS | 4,1 |
| 02054 | 056005 | | SUB | 5,1 |
| 02055 | 101000 | | NO? | |
| 02056 | 050002 | | STA | 2,1 |
| 02057 | 073221 | | LDX | SAVX |
| 02060 | 000401 | | ENB | |
| 02061 | 144001 | | LDA* | 1,1 |
| 02062 | 150003 | | STA* | 3,1 |
| 02063 | 064001 | | IRS | 1,1 |
| 02064 | 064003 | | IRS | 3,1 |
| 02065 | 064004 | | IRS | 4,1 |
| 02066 | 103114 | | JMP* | '2114 |
| 02067 | 001001 | | INH | |
| 02070 | 044000 | | LDA | 0,1 |
| 02071 | 141140 | | ICL | |
| 02072 | 011252 | | STA | ASRN |
| 02073 | 144005 | | LDA* | 5,1 |
| 02074 | 101040 | | SNZ | |
| 02075 | 0]1116 | | JST | SASR |
| 02076 | 103115 | | JMP* | '2115 |
| 02077 | 150005 | | STA* | 5,1 |
| 02100 | 005220 | | LDA | STAC |
| 02101 | 017253 | | SUB | PN66 |
| 02102 | 011220 | | STA | STAC |
| 020103 | 140040 | TOB2 | CRA | |
| 02104 | 10000 | | SKP | |
| 02105 | 140500 | | SSM | |
| 02106 | 142002 | | JMP* | 2,1 |
| 02107 | 144006 | TOB1 | LDA* | 6,1 |
| 02110 | 100400 | | SPL | |
| 02111 | 003103 | | JMP | TOB2 |
| 02112 | 004113 | | LDA | BT16 |
| 02113 | 003013 | | JMP | TOB3 |
| 02114 | 014755 | | DAC | '14755 |
| 02115 | 014770 | | DAC | '14770 |
| 14755 | 044003 | | LDA | 3,1 |
| 14756 | 173766 | | LDX* | SXV |
| 14757 | 062004 | | CAS | 4,1 |
| 14760 | 056005 | | SUB | 5,1 |
| 14761 | 101000 | | NOP | |
| 14762 | 173767 | | LDX* | SAVX |
| 14763 | 050003 | | STA | 3,1 |
| 14764 | 103765 | | JMP* | BACK |
| 14765 | 002061 | BACK | DAC | '2061 |
| 14766 | 002247 | SXV | DAC | '2247 |

```
14767   002221   SAVX    DAC    '2221
14770   173767           LDX*   SAVX
14771   004113           LDA    BT16
14772   103773           JMP*   BK1
14773   002077   BK1     DAC    '2077

0473   01734   000000            OCT
0474   01735   000000            OCT
0475   01736   000000            OCT
0476   01737   000000            OCT
0477   01740   000000            OCT
0478   01741   000000            OCT
0479   01742   000000            OCT
0480   01743   000042            OCT    64      STD,REQ.
0481   01744   000102            OCT    102     CRT FAIL
0482   01745   000000            OCT    104
0483   01746   000000            OCT    124
0484   01747   0 001747  TABP    DAC    TABP    FREQ TABLE
0485   01750   177730            OCT    -50
0486   01751   177774            OCT    -4
0487   01752   177763            OCT    -36
0488   01753   177766            OCT    -12
0489   01754   000000            OCT
0490   01755   000000            OCT
0491   01756   000000            OCT
0492   01757   000000            OCT
0493   01760   000000            OCT
0494   01761   000000            OCT
0495   01762   000000            OCT
0496   01763   000000            OCT
0497   01764   000000            OCT
0498   01765   000000            OCT
0499   01766   000000            OCT
0500   01767   000000            OCT
0501   01770   0 001770  TABK    DAC    *
0502   01771   177764    RL TN   DEC    -12
0503   01772   1 000330  RL TA   DAC    PR2T+12,1
0504                     *ASR    OUT PUT PACK.
0505                             LOAD
0506                             ORG    '2000
0507   02000   0 00 00000 TOUT   ***
0508   02001   0 04 02247        STA    ATM1    SAVE CALLES CONTROL
0509   02002   000201            IAB            WORD B1-SUSP
0510   02003   0 02 02247        LDA    ATM1    B8=DEV, B9-16 NUMBER
0511   02004   0 03 02251        ANA    BM8     WORDS
0512   02005   0 04 02252        STA    ASRN    SAVE DEV IND
0513   02006   100040            SZE            SKIP IF DEV 1
0514   02007   0 02 02253        LDA    PNC6
0515   02010   0 06 02221        ADD    TPT1    BUILD PNTR TO DCTB
0516   02011   0 04 02247        STA    ATM1
0517   02012   0 02 02655        LDA    NNC6
0518   02013   0 04 02246        STA    ATK1
0519   02014   0 02 02220        LDA    TPT2    @ ADDR WORK TABLE
0520   02015   0 04 02250        STA    ATM2
0521   02016   -0 02 02247       LDA*   ATM1
0522   02017   0 12 02247        IRS    ATM1    MOVE DEV TABLE
0523   02020   -0 04 02250       STA*   ATM2    TO WORK TABLE
0524   0202    0 12 02250        IRS    ATM2
0525   02022   0 12 02246        IRS    ATK1    SKIP IF TABLE MOVED
0526   02023   0 01 02016        JMP    *-5
0527   02024   0 02 02236        LDA    WCTB    /TABLE IN WORKING
0528   02025   100400            SPL            /SKIP IF DEV OK
0529   02026   0 01 02110        JMP    TOB1    /FAILED
0530   02027   000201            IAB
0531   02030   141050            CAL            /GET WORD COUNT
0532   02031   0 06 02237        ADD    WCTB+1
0533   02032   101400            SMI            /NUMBER OF ENTRIES
0534   02033   0 01 02105        JMP    TOB2+2  /NO ROOM
0535   02034   0 07 02237        SUB    WCTB+1
0536   02035   140407            ICA
0537   02036   0 04 02246        STA    ATK1
0538   02037   140407            TCA
0539   02040   0 06 02237        ADD    WCTB+1  UPDATE BUFFER COUNT
```

```
0540  02041   0 04 02237         STA   WCTB+L  TO NEW VALUE
0541  02042  -0 04 02000         LDA*  TOUT
0542  02043   0 04 02250         STA   ATM2
0543  02044  -0 02 02250   TOMR  LDA*  ATM2
0544  02045  -0 04 02240         STA*  WCTB+2 OUTPUT BUFFR
0545  02046   0 12 02250         IRS   ATM2
0546  02047   0 12 02240         IRS   WCTB+2
0547  02050   0 02 02240         LDA   WCTB+2
0548  02051   0 11 02242         CAS   WCTB+4
0549  02052   101000             NOP
0550  02053   100000             SKP
0551  02054   0 01 02057         JMP   *+3   TOP
0552  02055   0 02 02243         LDA   WCTB+5  RESET PNTR TO TOP
0553  02056   0 04 02240         STA   WCTB+2
0554  02057   0 12 02246         IRS   ATKT    SKIP MESSAGE MOVED
0555  02060   0 01 02044         JMP   TOMR    GET REST OF MESS
0556  02061   0 02 02655         LDA   NNC6
0557  02062   0 06 02247         ADD   ATM1
0558  02063   0 04 02247         STA   ATM1   /MOVE PNT BACK
0559  02064   0 02 02220         LDA   TPT2
0560  02065   0 04 02250         STA   ATM2
0561  02066   0 02 02655         LDA   NNC6
0562  02067   0 04 02246         STA   ATK1
0563  02070   0 02 00113         LDA   BT16
0564  02071   100000             SKP
0565  02072  -0 02 02250         LDA*  ATM2   MOVE TABLE FROM WORKING
0566  02073  -0 04 02247         STA*  ATM1   TO PERMANENT
0567  02074   0 12 02250         IRS   ATM2
0568  02075   0 12 02247         IRS   ATM1
0569  02076   0 12 02246         IRS   ATK1   SKIP IF 6 MOVED
0570  02077   0 01 02072         JMP   *-5
0571  02100   0 02 02236         LDA   WCTB
0572  02101   101040             SNZ          SKIP IF ASR INACTIVE
0573  02102   0 10 02116         JST   SASR   START ASR N
0574  02103   140040       TOB2  CRA
0575  02104   100000             SKP
0576  02105   140500             SSM          IND. BUFFER FULL
0577  02106   0 12 02000         IRS   TOUT   RETRN CALLER OK
0578  02107  -0 01 02000         JMP*  TOUT
0579  02110   0 02 02230   TOB1  LDA   DCTB+6
0580  02111   100400             SPL          /SKIP IF BOTH NOT FAILED
0581  02112   0 01 02103         JMP   TOB2   /BOTH FAILEE SIM. COMPLET
0582  02113   000201             IAB

MOBIL OPERATING SYSTEM

Replace Lines 612 to 614, Page 15

02150   057227             SUB         DCTB+5 ,1
      02151   101000             NOP
      02152   003154             JMP         *+2

0583  02114   0 05 02251         ERA   EM8   /CHANGE TO ALT DEV
0584  02115   0 01 02001         JMP   TOUT+1
0585                             *ASR SERV. ROUT
0586  02116   0 000000     SASR  DAC   **
0587  02117   0 02 02252         LDA   ASRN  GET DEV
0588  02120   100040             SZE
0589  02121   0 02 02253         LDA   PNC6
0590  02122   0 04 00000         STA   PNC6
0591  02123   1 02 02224   SAS1  LDA   DCTB+2,1
0592  02124   1 07 02225         SUB   DCTB+3,1
0593  02125   101040             SNZ         /SKIP IF IN = OUT
0594  02126   0 01 02204         JMP   SAS2  /DONE
0595  02127  -1 02 02225         LDA*  DCTB+3,1 /GET CHAR
0596  02130   101040             SNZ         /TEST FOR IGNORE
0597  02131   0 01 02142         JMP   NCSR
0598  02132   100400             SPL         /SKIP IF LEFT IGNORE
0599  02133   141340             ICA
0600  02134  -1 04 02225         STA*  DCTB+3,1 /SAVE SWAPPED CHAR
0601  02135   0 10 02156         JST   ASRO
```

```
0602 02136   -1 02 02225        LDA*   DCTB+3,1
0603 02137      141044          CAR           /CLEAR OUTPUT CHAR
0604 02140   -1 04 02225        STA*   DCTB+3,1
0605 02141   -0 01 02116        JMP*   SASR   RETRN
0606 02142    1 12 02225  NCSR  IRS    DCTB+3,1 MOV NEXT CHAR
0607 02143    0 02 02656        LDA    SAM1
0608 02144    1 06 02223        ADD    DCTB+1,1
0609 02145    1 04 02223        STA    DCTB+1,1
0610 02146    1 02 02225        LDA    DCTB+3,1
0611 02147    1 11 02226        CAS    DCTB+4,1 PNTR AT BOTTOM ?
0612 02150    0 01 02153        JMP    **3    YES
0613 02151      100000          SKP
0614 02152    0 01 02123        JMP    SAS1   NO
0615 02153    1 02 02227        LDA    DCTB+5,1
0616 02154    1 04 02225        STA    DCTB+3,1
0617 02155    0 01 02123        JMP    SAS1   RETRN FOR NEXT
0618 02156    0 000000    ASRO  DAC    **     1TY DRIVE ROUT.
0619 02157      000201          IAB
0620 02160    0 02 02252        LDA    ASRN
0621 02161      100040          SZE
0622 02162    0 01 02173        JMP    SRO2
0623 02163      000201          IAB
0624 02164   14    0004         OCP    '4
0625 02165   14    0104         OCP    '0104
0626 02166   74    0004         OTA    '0004
0627 02167      101000          NOP
0628 02170    0 02 02203        LDA    ASRF           /SHOULD NOT BE BUSY
0629 02171   -0 04 02244        STA*   ARC1
0630 02172   -0 01 02156        JMP*   ASRO
0631 02173      000201    SRO2  IAB
0632 02174   14    0070         OCP    '70
0633 02175   14    0170         OCP    '170
0634 02176   74    0070         OTA    '70
0635 02177      101000          NOP
0636 02200    0 02 02203        LDA    ASRF
0637 02201   -0 04 02245        STA*   ARC2
```

MOBIL OPERATING SYSTEM

REPLACE LINE 640, PAGE 16

```
00356 104363            LDA*   DCTB
00357 101400            SMI
00360 140040            CRA
00361 103362            JMP*   SAS2
00362 002205     SAS2   DAC    '2205
00363 042222     DCTB   DAC    '2222,1
```

MOBIL OPERATING SYSTEM

Replace Line 652 to 670, + 675, Page 16

```
02220   013300    STAC   DAC    '13300
02221   000000    SAVX   DAC    0
02222   000000    DCTB   OCT    0
02223   177401            OCT    177401
02224   002254            DAC    TY1F
02225   002254            DAC    TY1F
02226   002653            DAC    TY1L-1
02227   000400            DEC    256
02230   002231            DAC    DCTB+7
02231   000000            OCT    0
02232   177401            OCT    177401
02233   013400            DAC    TY2F
02234   013400            DAC    TY2F
02235   013777            DAC    TY2L-1
02236   000400            DEC    256
02237   002222            DAC    DCTB
02240   002222    DTAB   DAC    DCTB
02241   002231            DAC    DCTB+7
02250   16426             DAC    16426
16426   173431            LDX*   *+3
16427   103430            JMP*   *+1
16430   002105            DAC    TOB2+2
16431   002221            DAC    SAVX
```

```
0638   02202   -0 01 02156          JMP*   ASRO
0639   02203      177766    ASRF    OCT    -12
0640   02204      140040    SAS2    LDA    DCTB,1    SMI  CNA
0641   02205    1 04 02222          STA    DCTB,1    CLR  BUST FLAG
0642   02206    0 02 02252          LDA    ASRN
0643   02207      100040            SZE              SKP DEV. 2
0644   02210    0 01 02214          JMP    *+4
0645   02211      14 0004           OCP    04        SELECT INPUT MODE #1
0646   02212   -0 04 02244          STA*   ARC1
0647   02213   -0 01 02116          JMP*   SASR      SELECT INPUT MODE #2
0648   02214      14 0070           OCP    70
0649   02215      140040            CRA
0650   02216   -0 04 02245          STA*   ARC2
0651   02217   -0 01 02116          JMP*   SASR
0652   02220    0 002236    TPT2    DAC    WCTB      PNTR WORK DEV TABLE
0653   02221    0 002222    TPT1    DAC    DCTB      PNTR PERM DEV TABLE
0654   02222      000000    DCTB    OCT    '0        BUSY/NOT BUSY/FAIL
0655   02223    0 177400            DAC    TYIF-TYIL BUF. COUNT
0656   02224    0 002254            DAC    TYIF IN PONTR
0657   02225    0 002254            DAC    TYIF OUT PONTR
0658   02226    0 002653            DAC    TYIL+1 BOTTOM  -1
0659   02227    0 002254            DAC    TYIF  TOP
0660   02230      000000            OCT    '0        DEV 2 TABLE
0661   02231    0 177400            DAC    TY2F-TY2L  BUF  COUNT
0662   02232    0 013400            DAC    TY2F  IN PONTR
0663   02233    0 013400            DAC    TY2F  OUT PONTR
0664   02234    0 013777            DAC    TY2L+1 BOTTOM=-1
0665   02235    0 013400            DAC    TY2F  TOP
0666   02236      000000    WCTB    HLT              WORKING TABLE
0667   02237      000000            HLT              PARALLEL DCTB
0668   02240      000000            HLT
0669   02241      000000            HLT
0670   02242      000000            HLT
0671   02243      000000            HLT
0672   02244    0 001724    ARC1    DAC    DTMILADDR FAIL TIMER
0673   02246      000000    ATK1    HLT
0675   02247      000000    ATM1    HLT
0676   02250      000000    ATM2    HLT
0677   02251      000400    BMB     OCT    '400 BIT MASK BIT 8
0678   02252      000000    ASRN    OCT    '0    ACT. DEV #
0679   02253      000006    PNC6    DEC    6
0680   02254      000000    TY1F    BSZ    256
0681   02654    0 000000    TYIL    DAC    **
0682   02655      177772    NNC6    DEC    -6
0683   02656      177777    SAM1    OCT    -1
0684                                ORG    '13400
0685   13400      000000    TY2F    BSZ    256
0686   14000    0 000000    TY2L    DAC    **
0687                                ORG    NNC6+2
0688   02657    0 00 00000  TIME    PZE
0689   02660   -0 02 02657          LDA*             TIME SAVE ADDRESS
0690   02661    0 04 02670          STA              TIME FOR HOURS
0691   02662    0 06 00144          ADD              PNC3 AND THEN
0692   02663    0 04 02674          STA              TIMM FOR MINUTES
0693   02664    0 02 00114          LDA              HOUR CONVERT AND
0694   02665      001001            INH              STORE HOURS
0695   02666    0 10 02677          JST    B2ST
0696   02667      177776            DEC    -2
0697   02670    0 000000    TIMH    DAC    0
0698   02671    0 02 00115          LDA              MINT CONVERT AND
0699   02672    0 10 02677          JST    B2ST     STORE MINUTES
0700   02673      177776            DEC    -2
0701   02674    0 000000    TIMM    DAC    0
0702   02675      000401            ENB
0703   02676   -0 01 02657          JMP*   TIME
0704   02677    0 00 00000  B2ST    PZE              ASSUMES INH
0705   02700    0 15 02724          STX    SAVX     SAVE X
0706   02701   -0 35 02677          LDX*   B2ST     DETERMINE NUMBER
0707   02702    0 15 02725          STX    B2ON     OF DIGITS TO SAVE
0708   02703   -0 10 00312          JST*   XB2D     BINARY TO DECIMAL
0709   02704      0400 74           LRL    4        INTO B
0710   02705    0 12 02725          IRS    B2CN     THIS NUMBER OF TIMES
0711   02706    0 01 02704          JMP    *-2
0712   02707   -0 35 02677          LDX*   B2ST     GET NUMBER AGAIN
```

```
0713  02710   0 15 02725           STX   B2CN
0714  02711   0 12 02677           IRS   B2ST NEXT PARAMENTER
0715  02712  -0 35 02677           LDX*  B2ST GET ADDRES OF LEFT
0716  02713   0 12 02677           IRS   B2ST MUST DIGIT
0717  02714   0 02 02756           LDA   ='13 CONTRUCT ASCII CHARACTER
0718  02715    0410 74             LLL   4
0719  02716   1 04 00000           STA   0,1
0720  02717   0 12 00000           IRS   0 NEXT RESULT INDES
0721  02720   0 12 02725           IRS   B2CN ENOUGH DONE
0722  02721   0 01 02714           JMP   *-5 NO, DO ANOTHER
0723  02722   0 35 02724           LDX   SAVX RESTORE X
0724  02723  -0 01 02677           JMP*  B2ST RETURN
0725  02724   0 00 00000   SAVX   PZE
0726  02725   0 00 00000   B2CN   PZE
0727                       *OFFSHEET ROUTINE TO RESET LCO'S AND DRIVE
0728                       *OFFSHEET.  LDF POINT IN A UPON ENTRANCE
0729  02726   0 00 00000   OFSH   PZE
0730  02727  -0 10 00152           JST*  ARLC
0731  02730   0 13 00000           IMA   0 SAVE POINTER AND X
0732  02731   0 04 02740           STA   OSVX
0733  02732   1 02 00030           LDA   '30,1 GET REV. CONTACT
0734  02733   0 06 00102           ADD   BT07
0735  02734  -0 10 00130           JST*  ACRQ REQUEST CONTACT
0736  02735   0 02 02740           LDA   OSVX RESTORE A AND X
0737  02736   0 13 00000           IMA   0
0738  02737  -0 01 02726           JMP*  OFSM
0739  02740   0 00 00000   OSVX   PZE
0740                       *RESET LCO'S
0741  02741   0 00 00000   RSLC   PZE
0742  02742   0 13 00000           IMA   0 SAVE POINTER AND X
0743  02743   0 04 02755           STA   RSV
0744  02744   1 02 00027           LDA   '27,1 GET CONTACT FORWARD
0745  02745   0 06 00101           ADD   BT06
0746  02746  -0 10 00130           JST*  ACRQ REQUEST CONTACT
0747  02747   1 02 00030           LDA   '30,1 ET CONTACT REVERSE
```

MOBIL OPERATING SYSTEM

INSERT AFTER LINE 753, PAGE 18

```
02757    072143     TFL1   LDX   PNCO
02760    145770            LDA*  DCTB,1
02761    140401            CMA
02762    155770            STA*  DCTB,1
02763    001001            INH
02764    045774            LDA   CNTW,1
02765    120067            JST*  ATOU
02766    002776            DAC   TTSH
02767    102066            JMP*  ACMX
02770    002222     DCTB   DAC   '2222
02771    002230            DAC   '2231
02772    072113     TFL2   LDX   BT16
02773    003760            JMP   2760
02774    000402     CNTW   OCT   402
02775    000002            OCT   2
02776    152306     TTSH   BCI   1,TF
02777    106612            OCT   106612
```

```
0748  02750   0 06 00101           ADD   BT06
0749  02751  -0 10 00130           JST*  ACRQ REQUEST CONTACT
0750  02752   0 02 02655           LDA   RSV RESTORE X
0751  02753   0 13 00000           IMA   0 AND A
0752  02754  -0 01 02741           JMP*  RSLC EXIT
0753  02755   0 00 00000   RSV    PZE
0754  02756      000013           END
```

RSUP        02757

| | | | | | | |
|---|---|---|---|---|---|---|
| AB21 | 022251A | AB22 | 022451A | AB23 | 022651A | AB24 | 023073A |
| AB25 | 023453A | AB26 | 023717A | AB27 | 024517A | AB28 | 024520A |
| AB29 | 024521A | AB2A | 000150A | ABMT | 001365A | ABP1 | 020000A |
| ABP2 | 020200A | ABP3 | 020400A | ABP4 | 020622A | ABP5 | 021202A |
| ABP6 | 021446A | ABP7 | 022246A | ABP8 | 022247A | ABP9 | 022250A |
| ACMX | 000066A | ACRQ | 000130A | ADD1 | 000133A | ADIV | 000071A |
| AERM | 000153A | AFSH | 000151A | AMKT | 001110A | AMUL | 000070A |
| ANLV | 001234A | AO1C | 000154A | ARC1 | 002244A | ARC2 | 002245A |
| AREG | 001033A | ARLC | 000152A | ASAR | 001562A | ASLD | 000136A |
| ASLN | 000137A | ASRF | 002203A | ASRN | 002252A | ASRO | 002156A |
| ASRQ | 000141A | ASTR | 000072A | ASUS | 000064A | ATIM | 000073A |
| ATK1 | 000065A | ATM1 | 002247A | ATM2 | 002250A | ATOU | 000067A |
| AUNS | 002725A | B2ST | 002677A | B2CN | | BM8 | 002251A |
| BREG | 001034A | BT01 | 000074A | BT02 | 000075A | BT03 | 000076A |
| BT04 | 000077A | BT05 | 000100A | BT06 | 000101A | BT07 | 000102A |
| BT08 | 000103A | BT09 | 000104A | BT10 | 000105A | BT11 | 000106A |
| BT12 | 000107A | BT13 | 000110A | BT14 | 000111A | BT15 | 000112A |
| BT16 | 000113A | C124 | 001704A | C130 | 000306A | C174 | 001705A |
| C1TS | 001674A | C1UP | 001701A | C26 | 000307A | C2UP | 001702A |
| CCD | 001460A | CCD2 | 001502A | CCD3 | 001503A | CCDR | 001517A |
| CDRR | 001530A | CIOK | 001626A | COCP | 001457A | CORQ | 014662A |
| CPRI | 001170A | CRT1 | 000135A | CRTS | 001446A | CRTT | 001410A |
| CSA1 | 000132A | CTLG | 001703A | DADD | 013232A | DCRT | 001723A |
| DCTB | 002222A | DF1 | 014000A | DF2 | 014050A | DF3 | 014120A |
| DF4 | 014170A | DF5 | 014240A | DF6 | 014310A | DF7 | 014360A |
| DF8 | 014430A | DF9 | 014500A | DHD1 | 000134A | DIV | 013112A |
| DSTD | 001722A | DTM1 | 001724A | DTM2 | 001725A | DUST | 001167A |
| ERMD | 000257A | ERMS | 000200A | GSRQ | 000140A | HOUR | 000114A |
| IH | 000063A | IHD | 001000A | IHID | 001367A | IHR | 001015A |
| IHRS | 001003A | IOAL | 001507A | IPNT | 001032A | K036 | 001615A |
| KREG | 001035A | LDF1 | 000117A | LDF2 | 000120A | LDF3 | 000121A |
| LDF4 | 000122A | LDF5 | 000123A | LDF6 | 000124A | LDF7 | 000125A |
| LDF8 | 000126A | LDF9 | 000127A | LOSP | 001107A | LOST | 001102A |
| LPBS | 001366A | LV1S | 001040A | LV2S | 001045A | LV3S | 001052A |
| LV4S | 001057A | LV5S | 001064A | LVCK | 001340A | LVE1 | 001112A |
| LVE2 | 001122A | LVE3 | 001132A | LVE4 | 001142A | LVE5 | 001152A |
| LVES | 001111A | LVMV | 001204A | LVR1 | 001073A | LVR2 | 001074A |
| LVR3 | 001075A | LVR4 | 001076A | LVRB | 001100A | MBK2 | 001337A |
| MCX5 | 001611A | MINT | 000115A | MN4 | 001527A | MPY | 013000A |
| MTHE | 000223A | MYN1 | 000142A | NCCD | 001371A | NCSR | 002142A |
| NLVL | 001101A | NNC6 | 002655A | NXTO | 000274A | OADR | 000310A |
| OCNT | 000311A | OFSH | 002726A | OICV | 000260A | OSIX | 000303A |
| OSVX | 002740A | OVE1 | 001642A | OVER | 001627A | PARG | 001071A |
| PASR | 001661A | PC17 | 000147A | PDAD | 000131A | PFIR | 001616A |
| PFRS | 001623A | PNCO | 000143A | PNC3 | 000144A | PNC5 | 000145A |

```
0001                            *INT CONTACT SERVICE MOBIL CHEM.
0002                                    ORG     '3000
0003                                    LOAD
0004                            *CONTACT SERVICE (INTRT. CONTACTS)
0005
0006    03000   001001          CCDS    INH             MORE STATUS TABLE
0007    03001   0 35 03101              LKX     CCM4
0008    03002   -0 02 03071             LDA*    ACD3
0009    03003   1 04 03077              STA     CCDT+1,1
0010    03004   0 12 00000              IRS     '0
0011    03005   0 01 03002              JMP     *-3
0012    03006   0 35 03101              LDX     CCM4
0013    03007   140040                  CRA
0014    03010   -0 04 03071             STA*    ACD3    ZERO OLD STATUS
0015    03011   0 12 00000              IRS     '0
0016    03012   0 01 03010              JMP     *-2
0017    03013   0 04 03102              STA     CC1B    ZERO BASE COUNT
0018    03014   0 000401                ENB             INTERFACE TABLE ALL SERVI
0019    03015   0 02 03101              LDA     CCM4
0020    03016   0 04 03072              STA     CC1T    STORE COUNT
0021    03017   0 02 03100              LDA     CC1P+1
0022    03020   0 04 03077              STA     CC1P    STORE PNTR
0023    03021   0 35 00143              LDX     PNCO
0024    03022   -0 02 03077             LDA*    CC1P
0025    03023   101040          CCDR    SNZ             SKIP IF NEW CHANGE
0026    03024   0 01 03054              JMP     CC1X    SEE IF MORE GROUPS
```

| | | | | | |
|---|---|---|---|---|---|
| 0027 | 03025 | 101400 | | SMI | SKIP IF B1=1 |
| 0028 | 03026 | 1 01 03051 | | JMP | CC1R+2 GO CHK. NXT BIT |
| 0029 | 03027 | 0 04 03106 | | STA | IAS1 SAVE TEST WORD |
| 0030 | 03030 | 0 15 03105 | | STX | IXS1 |
| 0031 | 03031 | 0 02 03102 | | LDA | CC1B BASE PLUS # OF WORDS |
| 0032 | 03032 | 0 06 00000 | | ADD | '0 VALUE OF BIT |
| 0033 | 03033 | 0 04 00000 | | STA | 0 |
| 0034 | 03034 | 1 02 03363 | | LDA | F1CT, 1 GET FUNCT WORD |
| 0035 | 03035 | 0404 74 | | LDR | 4 MOVE BYTES 2+3 TO 3 & 4 |
| 0036 | 03036 | 141050 | | CAL | SAVE BYTE 3+4 |
| 0037 | 03037 | 0 06 03103 | | ADD | F1BS |
| 0038 | 03040 | 0 04 03104 | | STA | F1BS+1 |
| 0039 | 03041 | 1 02 03363 | | LDA | F1CT,1 |
| 0040 | 03042 | 0 04 03114 | | STA | F2CT SAVE FUNCT CODE |
| 0041 | 03043 | 0 03 00147 | | ANA | PC17 |
| 0042 | 03044 | 0 04 03115 | | STA | LDFN SAVE X REG |
| 0043 | 03045 | 0 10 03064 | | JST | S1UP SET UP LDF POINTR |
| 0044 | 03046 | -0 10 03104 | | JST! | F1BS+1 ENTER FUNCTION |
| 0045 | | | *ACC CONTAINS INDEX PNTR TO WORK I LDF | | |
| 0046 | 03047 | 0 35 03105 | CC1R | LDX | IXS1 FUNCTION RETRN |
| 0047 | 03050 | 0 02 03106 | | LDA | IAS1 |
| 0048 | 03051 | 0 12 00000 | | IRS | 0 MOVE BIT COUNT |
| 0049 | 03052 | 0414 77 | | LGL | 1 |
| 0050 | 03053 | 0 01 03023 | | JMP | CCDR |
| 0051 | 03054 | 0 12 03072 | CC1X | IRS | CC1T SKIP IF FOUR DONE |
| 0052 | 03055 | 100000 | | SKP | |
| 0053 | 03056 | -0 01 00066 | | JMP* | ACMX DONE |
| 0054 | 03057 | 0 02 03102 | | LDA | CC1B |
| 0055 | 03060 | 0 06 00110 | | ADD | BT13 MOVE BASE NEXT WORD |
| 0056 | 03061 | 0 04 03102 | | STA | CC1B |
| 0057 | 03062 | 0 12 03077 | | IRS | CC1P GET NXT WORD |
| 0058 | 03063 | 0 01 03021 | | JMP | CCDR-2 |
| 0059 | | | *ROUT,SET UP LINE DATA FILE POINTER | | |
| 0060 | 03064 | 0 000000 | S1UP | DAC | ** |
| 0061 | 03065 | 0 04 00000 | | STA | 0 SET X = LINE * |
| 0062 | 03066 | 1 02 00117 | | LDA | LDF1,1 |
| 0063 | 03067 | 0 06 00075 | | ADD | BT02 |
| 0064 | 03070 | -0 01 03064 | | JMP* | S1UP INDEX BI T |
| 0065 | 03071 | 1 001507 | ACD3 | DAC | CCD3+4,1 STORE OF CONT. STATUS |
| 0066 | 03072 | -0 000000 | CC1T | DAC* | ** TEMP STORAGE |
| 0067 | 03073 | -0 000000 | | DAC* | ** STORE FOR CONTAC |
| 0068 | 03074 | -0 000000 | | DAC* | ** |
| 0069 | 03075 | -0 000000 | | DAC* | ** |
| 0070 | 03076 | -0 000000 | CCDT | DAC* | ** |
| 0071 | 03077 | 0 003073 | CC1P | DAC | CCDT-3 WORK PNTR |
| 0072 | 03100 | 0 003073 | | DAC | CCDT-3 WORK PNTR RESET |
| 0073 | 03101 | 177774 | CCM4 | OCT* | -4 |
| 0074 | 03102 | 000000 | CC1B | OCT | 0 BASE COUNT |
| 0075 | 03103 | -0 003107 | F1BS | DAC* | F1BT |
| 0076 | 03104 | -0 003107 | | DAC* | F1BT |
| 0077 | 03105 | 0 000000 | IXS1 | DAC | ** |
| 0078 | 03106 | -0 000000 | IAS1 | DAC* | ** A REG. SAVE |
| 079 | 03107 | 0 003116 | F1BT | DAC | FSP1 |
| 0080 | 03110 | 0 003150 | | DAC | FSP2 |
| 0081 | 03111 | 0 003205 | | DAC | FSP3 |
| 0082 | 03112 | 0 003255 | | DAC | FSP4 |
| 0083 | 03113 | 0 003321 | | DAC | FSP5 |
| 0084 | 03114 | 0 000000 | F2CT | DAC | 0 CURRENT FUNCTION WORD |
| 0085 | 03115 | 0 000000 | LDFN | DAC | 0 |
| 0086 | | | *CCD FUNCT COPE TABLE 33 WORDS F1BT DAC * | | |
| 0087 | | | *SEGMENT PULSE FUNCTION | | |
| 0088 | 03116 | 0 000000 | FSP1 | DAC | ** |
| 0089 | 03117 | 0 04 03144 | | STA | FILP SAVE POINTR |
| 0090 | 03120 | 0 35 03147 | | LDX | RV28 |
| 0091 | 03121 | -0 02 03144 | | LDA* | FILP GET DIRECTION FLAG |
| 0092 | 03122 | 100040 | | SZE | SKIP IF MOV. FORWARD |
| 0093 | 03123 | 0 01 03140 | | JMP | FSPZ IN REV INGNORE OR STOP |
| 0094 | 03124 | 0 10 03432 | | JST | MANC GO CHR FOR MAN |
| 0095 | 031125 | 0 01 03140 | | JMP | FSPZ IN MAN.IGNORE |
| 0096 | 03126 | 0 02 00113 | | LDA | BT16 |
| 0097 | 03127 | 0 35 03115 | | LDX | LDFN |
| 0098 | 03130 | 1 06 03442 | | ADD | FSSC, 1 GET LINE NUMB |
| 0099 | 03131 | 100400 | | SPL | SKIP IF PO?ZERO |
| 0100 | 03132 | 0 01 03142 | | JMP | FSPZ+2 |

```
0101 03133   0 35 03146              LDX    RV20
0102 03134  -0 02 03144              LDA*   FILP INCR.SEG COUNT
0103 03135   141206                  ADA
0104 03136   140500                  SSM    SET UP DATE BIT
0105 03137  -0 04 03144       STA*   FILP
0106 03140   0 35 03115   FSPZ LDX   LDFN
0107 03141   0 02 03145   LDA  LDA   RVM5
0108 03142   1 04 03442        STA   FSSC,1 RESET SUB
0109 03143  -0 01 03116        JMP*  FSP1
0110                          *SEGMENT PULSE DATA
```

INT CONTACT SERVICE MOBIL

INSERT AFTER LINE 156, PAGE 3

```
00600  105623              LDA*  LDFN
00601  022144              CAS   PNC3
00602  100000              SKP
00603  003610              JMP   SET
00604  022145              CAS   PNC5
00605  100000              SKP
00606  100000              SKP
00607  003616              JMP   RETN
00610  040476       SET    LGR   2
00611  010000              STA   0
00612  105620              LDA*  BKTB
00613  111621              STA*  P2CT
00614  105625              LDA*  FILP
00615  121622              JST*  FSP4
00616  001001              INH
00617  003671              JMP   '671
00620  043421       BKTB   DAC   FSCB-2,1
00621  003114       P2CT   DAC   '3114
00622  003255       FSP4   DAC   '3255
00623  003115       LDFN   DAC   '3115
00624  003221       BACK   DAC   '3221
00625  003144       FILP   DAC   '3144
00671  120073              JST*  ATIM
00672  006354              DAC   '6354
00673  002745              JMP   '745
00674  004145              LDA   PNC5
00675  120067              JST*  ATOU
00676  006354              DAC   '6354
00677  102624              JMP*  BACK
00745  000401              ENB
00746  101000              NOP
00747  001001              INH
00750  002674              JMP   '674

0111 03144   0 000000   FILP DAC  **       PNTR TO CURRENT LPF
0112 03145   0 177773   RVM5 DAC  '-5      RESET FOR SEG SUB COUNT
0113 03146   000023     RV20 DEC  19
0114 03147   000033     RV28 DEC  27
0115                   *REFERENCE PULSE FUNCTION
0116 03150   0 000000   FSP2 DAC  **
0117 03151   0 04 03144      STA  FILP     LDF POINTR/INDEX BIT
0118 03152   0 35 00143      LDX  PNC0
0119 03153  -0 02 03144      LDA* FILP
0120 03154   100400          SPL
0121 03155  -0 01 03150      JMP* FSP2
0122 03156   0 35 03146      LDX  RV20     GET OFFSET
0123 03157   0 02 03235      LDA  RV12     140000 REF & UPDATE
0124 03160  -0 04 03144      STA* FILP     CLEAR SEG COUNT SET
0125 03161   0 35 03203      LDX  RV23+1
0126 03162  -0 02 03144      LDA* FILP
0127 03163   0 06 00101      ADD  BT06
0128 03164   001001          INH
0129 03165  -0 10 00130      JST* ACRQ
0130 03166   0 35 03202      LDX  RV23
0131 03167  -0 02 03144      LDA* FILP
```

```
0132 03170    0 06 00101          ADD    BT06
0133 03171   -0 10 00130          JST*   ACRQ
0134 03172    000401              ENB
0135 03173    0 35 03200          LDX    RV34
0136 03174    0 02 03201          LDA    RM20
0137 03175   -0 04 03144          STA*   FILP
0138 03176   -0 01 03150          JMP*   FSP2
0139 03177    000035      RV30    DEC    29
0140 03200    000034      RV34    OCT    34
0141 03201    177754      RM20    DEC    -20
0142 03202    000027      RV23    DEC    23
0143 03203    000030              DEC    24
0144 03204    000031              DEC    25
0145                              *SHEET BREAK FUNCTION
0146 03205    0 000000    FSP3    DAC    **
0147 03206    0 04 03144          STA    FILP
0148 03207    0 10 03432          JST    MANC
0149 03210   -0 01 03205          JMP*   FSP3    IGNORE IN MAN.
0150 03211    0 10 03255          JST    FSP4
0151 03212    0 02 03115          LDA    LDFN
0152 03213    0 11 00145          CAS    PNC5
0153 03214    100000              SKP
0154 03215    141206              AOA
0155 03216    0 06 03234          ADD    K260
0156 03217    0 04 03244          STA    FP3B    STORE IN MESS.
0157 03220    001001              INH    2600
0158 03221    0 02 03254          LDA    FP3C
0159 03222   -0 10 00067          JST*   ATOU
0160 03223    0 003236            DAC    FP3A
0161 03224    0 35 00113          LDX    PNCO
0162 03225   -0 02 03144          LDA*   FILP
0163 03226    140500              SSM            PUT IN MAN.
0164 03227   -0 04 03144          STA*   FILP
0165 03230    0 35 03115          LDX    LDFN

INT CONTACT SERVICE MOBIL 03232        103233              JMP*    *+1
03233        016467              DAC     '16467
16467        001001              INH
16470        120151              JST*    AFSH
16471        000401              ENB
16472        103473              JMP*    *+1
16473        103205              DAC*    '3205

0166 03231    1 02 0011'          LDA    LDF1,1
0167 03232   -0 10 00151          JST*   AFSH
0168 03233   -0 01 03205          JMP*   FSP3
0169 03234    0 000260    R260    DAC    '260
0170 03235    140000      RV12    OCT    140000
0171 03236    146311      FP3A    BCI    LINE 51
     03237    147305
     03240    120265
     03241    130640
     03242    120240
     03243    120240
0172 03244    0 000000    FP3B    DAC    **
0173 03245    120323              BCI    6, SHEET BREAK
     03246    144305
     03247    142724
     03250    120302
     03251    151305
     03252    140713
0174 03253    105215              VFD    8,'212,8,'215
0175 03254    000016      FP3C    VFD    8,0,8,FP3C-FP3A
0176                              *REEL CUT FUNCTION
0177 03255    0 000000    FSP4    DAC    **
0178 03256    0 04 03144          STA    FILP
0179 03257    0 10 03432          JST    MANC    TEST MAN STATUS
0180 03260   -0 01 03255          JMP*   FSP4    IN MAN IGNORE CUT
0181 03261    0 10 03423          JST    FSCB    TEST FRONT/BACK
```

```
0182 03262   0 06 00000           ADD    '0       TO INDEX
0183 03263   0 04 00000           STA    '0       GO ADD B.S. OFFSET
0184 03264   1 02 00314           LDA    PR2T,1 ROLL TIME
0185 03265   0 06 03453           ADD    RTTR
0186 03266   100400               SPL             SKIP IF GRTER
0187 03267   0 01 03310           JMP    FP4D     GO RESET TIMER
0188 03270  -0 02 03315           LDA*   FP4A     GET CONTACT ADDR
0189 03271   001001               INH
0190 03272  -0 10 00130           JST*   ACRQ     TURN ON RECRDER
0191 03273  -0 02 03314           LDA*   APR1     INDEXED POINTER
0192 03274   100400               SPL             SKIP IF INCATIVE
0193 03275   0 01 03310           JMP    FP4D     GO RESET TIMER
0194 03276   0 02 03313           LDA    MEC1
0195 03277  -0 04 03314           STA*   APR1     INDEX PNTR TO REQ TABLE
0196 03300   1 02 00074           LDA    BT01,1
0197 03301   140401               CMA
0198 03302  -0 03 03316           ANA*   FP4B
0199 03303   1 05 00074           ERA    BT01,1
0200 03304  -0 04 03316           STA*   FP4B
0201 03305   0 02 03146           LDA    RV20     REQUEST LOG
0202 03306   001001               INH
0203 03307  -0 10 00072           JST*   ASTR
0204 03310   140040         FP4D  CRA
0205 03311  -0 04 03317           STA*   FP4C     RSET TIMER
0206 03312  -0 01 03255           JMP*   FSP4
0207 03313   0 177773        MEC1 DAC    '-5
0208 03314   1 003642        APR1 DAC    PRIT,1
0209 03315   1 003750        FP4A DAC    POCR+1,1
0210 03316   0 015000        FP4B DAC    '15000 LOG E REQ WORD
0211 03317   1 000314        FP4C DAC    PR2T,1 ADDR P  TIMER TABLE
0212 03320   000006         FP46 DEC    6
0213                        *FOOTAGE COUNT FUNCTION
0214 03321   0 000000        FSP5 DAC    **
0215 03322   0 04 03144           STA    FILP     SAVE INDEXED PNTR TO
0216 03323   0 10 03432           JST    MANC     LDF
0217 03324   0 01 03331           JMP    FSP5     LINE IN MAN. BOLT
0218 03325   0 35 03115           LDX    LDFN
0219 03326   0 02 03347           LDA    FP5B     PULSE VALUE IN FEET
0220 03327   1 06 03350           ADD    FP5C,1
0221 03330   100000               SKP
0222 03331   140040         FP5A  CRA
0223 03332   1 04 03350           STA    FP5C,1 SET INTEGRL TO NEW VAL
0224 03333   0 10 03423           JST    FSCB     TEST FRONT BACK
0225 03334   101040               SNZ             SKIP IN BACK
0226 03335  -0 01 03321           JMP*   FSP5
0227 03336   0 06 00000           ADD    0
0228 03337   0 04 00000           STA    0
0229 03340   0 10 03432           JST    MANC     TEST MANUAL STATUS
0230 03341   0 01 03345           JMP    *+4 IN MANUAL
0231 03342   1 06 03350           ADD    FP5C,1
0232 03343   100000               SKP
0233 03344   140040               CRA
0234 03345   1 04 03350           STA    FP5C,1
0235 03346  -0 01 03321           JMP*   FSP5     RETURN
0236 03347   0 000001        FP5B DAC    1        VAL ONE PULSE
0237 03350   0 000001        FP5C DAC    '1       L510
0238 03351   0 000001             DAC    '1       L511
0239 03352   0 000001             DAC    1        L512
0240 03353   0 000001             DAC    '1       L513
0241 03354   0 000001             DAC    1
0242 03355   0 000001             DAC    '1       L516
0243 03356   0 000001             DAC    '1       FUTR
0244 03357   0 000001             DAC    '1       FUTR
0245 03360   0 000001             DAC    1        FUTR
0246 03361   0 000001             DAC    1        L513 BACK
0247 03362   0 000001             DAC    1        L516 BACK
0248                        *TABLE IS RELOCATABLE
0249                        *CONTACT (CCD) DATA BASE
0250                        *BTS 1-4=SIDE, BTS 5-12*, BTS 12-16=LINE
0251 03363   000000         FICT VFD    12,0,4,0 SEGMENT PULSE CCDI
0252 03364   000001              VFD    12,0,4,1 SEGMENT PULSE CCDI
0253 03365   000002              VFD    12,0,4,2 SEGMENT PULSE CCDI
0254 03366   000003              VFD    12,0,4,3 SEGMENT PULSE CCDI
0255 03367   000004              VFD    12,0,4,4 SEGMENT PULSE CCDI
```

```
0256  03370  000005           VFD   12,0,4,5 SEGMENT PULSE CCD1
0257  03371  000060           VFD   12,3,4,0 REEL CUT 510
0258  03372  000061           VFD   12,3,4,1 REEL CUT 511
0259  03373  000020           VFD   12,1,4,0 REF. POINT CCD2
0260  03374  000021           VFD   12,1,4,1 REF. POINT CCD2
0261  03375  000022           VFD   12,1,4,2 REF. POINT CCD2
0262  03376  000023           VFD   12,1,4,3 REF. POINT CCD2
0263  03377  000024           VFD   12,1,4,4 REF. POINT CCD2
0264  03400  000025           VFD   12,1,4,5 REF. POINT CCD2
0265  03401  000062           VFD   12,3,4,2 REEL CUT 512
0266  03402  000063           VFD   12,3,4,3 REEL CUT 513
0267  03403  000040           VFD   12,2,4,0 SHT. BRK. CCD3
0268  03404  000041           VFD   12,2,4,1
0269  03405  000042           VFD   12,2,4,2
0270  03406  000043           VFD   12,2,4,3
0271  03407  000044           VFD   12,2,4,4
0272  03410  000045           VFD   12,2,4,5
0273  03411  000064           VFD   12,3,4,4 REEL CUT 514
0274  03412  000065           VFD   12,3,4,5 REEL CUT 516
0275  03413  000100           VFD   12,4,4,0 FOOT COUNT CCD4
0276  03414  000101           VFD   12,4,4,1 FOOT COUNT CCD4
0277  03415  000102           VFD   12,4,4,2 FOOT COUNT CCD4
0278  03416  000103           VFD   4,6,8,3  FOOT COUNT CCD4
0279  03417  000104           VFD   12,4,4,4 FOOT COUNT CCD4
0280  03420  000105           VFD   4,5,8,5  FOOT COUNT CCD4
0281  03421  010063           VFD   4,6,8,3,4,3 REEL CUT 513 BACK
0282  03422  010065           VFD   4,5,8,3,4,5 REEL CUT 516 BACK
0283  03423  0 000000   FSCB  DAC   **
0284  03424  0 35 03115       LDX   LDFN
0285  03425  0 02 03114       LDA   F2CT
0286  03426  0404 64          LGR   '14
0287  03427  100040           NOP
0288  03430  0 02 03320       NOP   FP46
0289  03431  -0 01 03423      JMP*  FSCB
0290                    *TABLE OF FUNCT. CODES
0291  03432  0 000000   MANC  DAC   **
0292  03433  0 35 00143       LDX   PNCO
0293  03434  -0 02 03144      LDA*  FILP
0294  03435  101400           SMI
0295  03436  0 12 03432       IRS   MANC
0296  03437  0 02 03144       LDA   FILP
0297  03440  0 35 03115       LDX   LDFN
0298  03441  -0 01 03432      JMP*  MANC
0299                    *SUB COUNT SEGMENT = 1/10 INCHES
0300  03442  177766     FSSC  DEC   -10
0301  03443  177766           DEC   -10
0302  03444  177766           DEC   -10
0303  03445  177766           DEC   -10
0304  03446  177766           DEC   -10
0305  03447  177766           DEC   -10
0306  03450  177766           DEC   -10
0307  03451  177766           DEC   -10
0308  03452  177766           DEC   -10
0309  03453  176650     RTTR  DEC   -60
0310  03454  000000     POTZ  DEC   0
0311                    *PROFILE OUTPUT DRIVE - PENS
0312  03455  0 01 03602 PODV  JMP   POHK  GO DO ENTRY HOUSE KEEP
0313  03456  1 02 03657       LDA   PORW,1
0314  03457  101040           SNZ         SKIP IF PEN ACT.
0315  03460  0 01 3547        JMP   PONX  CHK FOR PEN EXERCISE
0316  03461  100400           SPL         SKIP IF "OFF" REQ.
0317  03462  0 01 03523       JMP   POON  GO TURN ON
0318  03463  0 06 00142       ADD   MYN1
0319  03464  1 04 03657       STA   PORW,1 REST. -1
0320  03465  1000040          SZE         SKIP IF TURN OFF TIME

INT CONTACT SERVICE MOBIL
              REPLACE LINES 326 to 330, PAGE 7
       03473  004000     LDA   0
       03474  014111     ADD   BT14
       03475  101400     SMI
       03476  002434     JMP   BACK
       03477  004110     LDA   BT13
       00434  004111     LDA   BT14
       00435  103436     JMP*  RET
       00436  003500  RET DAC  '3500
```

INT CONTACT SERVICE MOBIL

INSERT AFTER LINE 367, PAGE 7

| 00424 | 111430 |      | STA* | PORW |
|-------|--------|------|------|------|
| 00425 | 105431 |      | LDA* | POFS |
| 00426 | 121432 |      | JST* | IPOO |
| 00427 | 103433 |      | JMP* | PONX |
| 00430 | 043657 | PORW | DAC  | '3657,1 |
| 00431 | 003640 | POFS | DAC  | '3640 |
| 00432 | 012500 | IPOO | DAC  | '2500 |
| 00433 | 003547 | PONX | DAC  | '3547 |

| 0321 03466 | 0 01 03547 |      | JMP  | PONX   | GO DO NEXT PEN |
| 0322 03467 | 0 02 00102 |      | LDA  | BT07   |  |
| 0323 03470 | 1 06 03765 |      | ADD  | PORO,1 | GET ADDR. RECORDER |
| 0324 03471 | 001001     |      | INH  |        |  |
| 0325 03472 | -0 10 00130|      | JST* | ACRQ   | REC'DR OFF |
| 0326 03473 | -1 02 03522|      | LDA  |        |  |
| 0327 03474 | 0 03 00076 |      | ADD  | BT14   |  |
| 0328 03475 | 100040     |      | SMI  |        |  |
| 0329 03476 | 0 02 00111 |      | JMP  |        |  |
| 0330 03477 | 0 06 00111 |      | LDA  | BT13   |  |
| 0331 03500 | 140401     |      | CMA  |        |  |
| 0332 03501 | -1 03 03522|      | ANA* | POBW,1 |  |
| 0333 03502 |    151522  |      | STA* | POBW,1 |  |
| 0334 03503 | 000401     |      | ENB  |        |  |
| 0335 03504 | 0 01 03577 |      | JMP  | PODS,  | DRIVE PEN TO ZERO |
| 0336 03505 | 0 014000   |      | DAC  | DF1    |  |
| 0337 03506 | 0 014050   |      | DAC  | DF2    |  |
| 0338 03507 | 0 014120   |      | DAC  | DF3    |  |
| 0339 03510 | 0 014170   |      | DAC  | DF4    |  |
| 0340 03511 | 0 014240   |      | DAC  | DF5    |  |
| 0341 03512 | 0 014310   |      | DAC  | DF6    |  |
| 0342 03513 | 000000     |      | BSZ  | 3      |  |
| 0343 03516 | 0 014170   |      | DAC  | DF4    |  |
| 0344 03517 | 0 014310   |      | DAC  | DF6    |  |
| 0345 03520 | 0 000000   |      | DAC  | **     |  |
| 0346 03521 | 0 000000   |      | DAC  | **     |  |
| 0347 03522 | 0 000000   | POBW | DAC  | **     |  |
| 0348 03523 | 141206     | POON | AOA  |        | INCREM. BY ONE |
| 0349 03524 | 101400     |      | SMI  |        | SKIP IF STILL DELAY |
| 0350 03525 | 0 01 03532 |      | JMP  | P1ON   | GO GET LIVE OUTPUT |
| 0351 03526 | 1 04 03657 |      | STA  | PORW,1 | UP DATE REQ. VALUE |
| 0352 03527 | 0 02 03640 |      | LDA  | POFS   |  |
| 0353 03530 | -0 10 03766|      | JST* | IPOO   | PEN FULL SCAL |
| 0354 03531 | 0 01 03547 |      | JMP  | PONX   |  |
| 0355 03532 | -1 02 03675| PION | LDA* | POBB,1 |  |
| 0356 03533 | -0 10 03766|      | JST* | IPOO   |  |
| 0357 03534 | 140040     |      | CRA  |        |  |
| 0358 03535 | -1 04 03675|      | STA* | POBB,1 |  |
| 0359 03536 | 1 12 03675 |      | IRS  | POBB,1 |  |
| 0360 03537 | 1 12 03731 |      | IRS  | POCT,1 | MORE ENTIES IN PROFILE? |
| 0361 03540 | 0 01 03547 |      | JMP  | PONX   | YES |
| 0362 03541 | 1 02 03713 |      | LDA  | POBR,1 | RESET BUFF |
| 0363 03542 | 1 04 03675 |      | STA  | POBB,1 | PNTR |
| 0364 03543 | 1 02 03747 |      | LDA  | POCR,1 | AND COUNT |
| 0365 03544 | 1 04 03731 |      | STA  | POCT,1 |  |
| 0366 03545 | 0 02 03637 |      | LDA  | PODY   | SET DELAY |
| 0367 03546 | 1 04 03657 |      | STA  | PORW,1 |  |
| 0368 03547 | 0 12 00000 | PONX | IRS  | 0      |  |
| 0369 03550 | 0 01 03456 |      | JMP  | PODV+1 |  |
| 0370 03551 | 0 01 03625 |      | JMP  | POEX   |  |
| 0371 |  |  | *EXCERCISES INACT PENS |  |  |
| 0372 03552 | 0 02 03635 | POEC | LDA  | POEK   | COMPARE CUR. ENTRY TO |
| 0373 03553 | 0 11 03634 |      | CAS  | POAK   | PRE DEFINED COUNT |
| 0374 03554 | 0 01 03571 |      | JMP  | POEG+1 |  |
| 0375 03555 | 100000     |      | SKP  |        | EQUAL |
| 0376 03556 | 0 01 03547 |      | JMP  | PONX   | LESS |
| 0377 03557 | 1 02 03765 |      | LDA  | PORO,1 |  |
| 0378 03560 | 101040     |      | SNZ  |        | GET CONT ADDR |
| 0379 03561 | 0 01 03547 |      | JMP  | PONX   |  |
| 0380 03562 | 001001     |      | INH  |        |  |

```
0381 03563  -0 10 00130           JST*  ACRO
0382 03564     000401             ENB
0383 03565   0 02 00111           LDA   BT14
0384 03566   1 04 03657           STA   PORW,1
0385 03567   0 01 03547           JMP   PONX
0386 03570     001001       POEG  INH
0387 03571   1 02 03657           LDA   PORW,1
0388 03572     100040             SZE
0389 03573   0 01 03547           JMP   PONX
0390 03574   0 02 00111           LDA   BT14
0391 03575   1 04 03657           STA   PORW,1 SET PLUS ONE TO TURN
0392 03576     000401             ENB          OFF
0393 03577   0 02 03641     PODS  LDA   PUFS
0394 03600  -0 10 03766           JST*  IPOO   ZERO PEN
0395 03601   0 01 03547           JMP   PONX
0396 03602   0 02 03454     PORK  LDA   POTZ
0397 03603     100040             SZE          CHECK TIME ZERO
0398 03604   0 01 03611           JMP   POTI   GO INIT TIME ZERO
0399 03605   0 12 03635           IRS   POEK
0400 03606     101000             NOP
0401 03607   0 35 03636           LDX   POLC
0402 03610   0 01 03456           JMP   PODV+1
0403 03611   0 35 03636     POTI  LDX   POLC
0404 03612   1 02 03713           LDA   POBR,1
0405 03613   1 04 03675           STA   POBB,1 INIT. BUFFER PNTRS
0406 03614   1 02 03747           LDA   POCR,1
0407 03615   1 04 03731           STA   POCT,1 INIT BUFFER COUNTRS
0408 03616     140040             CRA
0409 03617   1 04 03657           STA   PORW,1
0410 03620   0 12 00000           IRS   0
0411 03621   0 01 03612           JMP   POTI+1
0412 03622   0 04 03635           STA   POEK
0413 03623   0 04 03454           STA   POTZ
0414 03624   0 01 03602           JMP   POHK
0415 03625   0 02 03634     POEX  LDA   POAK   GET LIMIT VALUE
0416 03626   0 11 03635           CAS   POEK
0417 03627  -0 01 00066           JMP*  ACMX
0418 03630  -0 01 00066           JMP*  ACMX
0419 03631     140040             CRA
0420 03632   0 04 03635           STA   POEK   ZERO ENTRY COUNT
0421 03633  -0 01 00066           JMP*  ACMX
0422                              *ROUTINE TO OUTPUT TO D/A (PEN DRIVERS)
0423 03634     001130       POAK  DEC   600
0424 03635     000000       POEK  DEC   0      ENTRY COUNTER
0425 03636     177763       POLC  DEC   -13    NUM TABLE ENTRIES
0426 03637     000010       PODY  DEC   8      OFF DELAY VALVE
0427 03640     000400       POFS  OCT   400    RECORD FULL SCALE
0428 03641     000000       POMS  OCT   0      RECORDER ZERO
0429 03642   0 000000       PRIT  DAC   0      REQ WRD 510
0430 03643   0 000000             DAC   0      ""511
0431 03644   0 000000             DAC   0      ""512
0432 03645   0 000000             DAC   0       513
0433 03646   0 000000             DAC   0       514
0434 03647   0 000000             DAC   0       516
0435 03650   0 000000             DAC   0
0436 03651   0 000000             DAC   0
0437 03652   0 000000             DAC   0
0438 03653   0 000000             DAC   0      REQ WD 513A
0439 03654   0 000000             DAC   0      REQ WD 516A
0440 03655   0 000000             DAC   0
0441 03656   0 000000             DAC   0
0442 03657   0 000000       PORW  DAC   0
0443 03660   0 024522             DAC   POB1
0444 03661   0 024722             DAC   POB2
0445 03662   0 025122             DAC   POB3   L512
0446 03663   0 025344             DAC   POB4
0447 03664   0 025724             DAC   POB5   L514
0448 03665   0 026170             DAC   POB6   L516
0449 03666   0 026770             DAC   POB7
0450 03667   0 026771             DAC   POB8
0451 03670   0 026772             DAC   POB9
0452 03671   0 025534             DAC   POB4+120
0453 03672   0 026400             DAC   POB6+136 BACK 516
0454 03673   0 026770             DAC   POB7
0455 03674   0 026771             DAC   POB8
```

```
0456 03675  0 000000    POBB DAC   **           BUFFER PNTR BASE
0457 03676  0 024522         DAC   POB1         RESET VALUES FOR
0458 03677  0 024722         DAC   POB2
0459 03700  0 025122         DAC   POB3
0460 03701  0 025344         DAC   POB4
0461 03702  0 025724         DAC   POB5
0462 03703  0 026170         DAC   POB6
0463 03704  0 026770         DAC   POB7
0464 03705  0 026771         DAC   POB8
0465 03706  0 026772         DAC   POB9
0466 03707  0 025534         DAC   POB4+120
0467 03710  0 026400         DAC   POB6+136
0468 03711  0 026770         DAC   POB7
0469 03712  0 026771         DAC   POB8
0470 03713  0 000000    POBR DAC   0
0471 03714  177600          DEC   -128          BUFFER COUNT TABLE
0472 03715  177600          DEC   -128          L511
0473 03716  177556          DEC   -146          L512
0474 03717  177610          DEC   -120          L513     FRONT
0475 03720  177534          DEC   -164          L514
0476 03721  177570          DEC   -136          L57
0477 03722  177777          DEC   -1
0478 03723  177777          DEC   -1
0479 03724  177777          DEC   -1
0480 03725  177610          DEC   -120          513 BACK
0481 03726  177570          DEC   -136          516 BACK
0482 03727  177777          DEC   -1
0483 03730  177777          DEC   -1
0484 03731  000000    POCT DEC   0             FUTR
0485 03732  177600          DEC   -128          TABLE OF COUNT RESETS
```

INT CONTACT SERVICE MOBIL

INSERT AFTER LINE 537, PAGE 10

```
12525  103526          JMP*   *+1
12526  006762          DAC    '6762
06762  000401          ENB
06763  101000          NOP
06764  001001          INH
06765  120071          JST*   AOIV
06766  012544          DAC    '12544
06767  120153          JST    AERM
06770  103771          JMP*   *+1
06771  012530          DAC    '12530

0486 03733  177600          DEC    -128
0487 03734  177556          DEC    -146
0488 03735  177610          DEC    -120
0489 03736  177534          DEC    -164
0490 03737  177570          DEC    -136
0491 03740  177777          DEC    -1
0492 03741  177777          DEC    -1
0493 03742  177777          DEC    -1
0494 03743  177610          DEC    -120
0495 03744  177570          DEC    -136
0496 03745  177777          DEC    -1
0497 03746  177777          DEC    -1
0498 03747  000000    POCR DEC    0
0499 03750  001050          OCT    1050  L510
0500 03751  001051          OCT    1051  L511
0501 03752  001052          OCT    1052  L512
0502 03753  001053          OCT    1053  L513
0503 03754  001055          OCT    1055  L514
0504 03755  001056          OCT    1056  L516
0505 03756  001000          OCT    1000  SPARE
0506 03757  001000          OCT    1000  SPARE
0507 03760  001000          OCT    1000  SPARE
0508 03761  001054          OCT    1054  L513A
0509 03762  001057          OCT    1057  L516A
```

```
0510 03763    001000           OCT   1000 SPARE
0511 03764    001000           OCT   1000 SPARE
0512 03765    000000   PORO    OCT   0    SPARE
0513 03766    0 012500 IPOO    DAC   POOT OUTPUT ROUT
0514          012500   POOT    EQU   '12500
0515                           ORG   '12500
0516 12500    0 000000 POOT    DAC   **
0517 12501    001001           INH
0518 12502    0 10 12520       JST   POSL SCAL. OUTPIT 0-256
0519 12503    141050           CAL
0520 12504    0 04 12516       STA   PODC
0521 12505    0 02 12517       LDA   PODC+1
0522 12506    74 1377          OTA   '1377
0523 12507    000000           HLT
0524 12510    1 02 00000       LDA   DATB,1
0525 12511    0 06 12516       ADD   PODC
0526 12512    74 1177          UTA   '1177
0527 12513    000000           HLT
0528 12514    000401           ENB
0529 12515    -0 01 12500      JMP*  POOT
0530 12516    000000   PODC    OCT   0
0531 12517    000001           OCT   1
0532                  *ROUT. TO SCALE OUTPUT 0-256 DEC.
0533 12520    0 000000 POSL    DAC   **
0534 12521    100400           SPL
0535 12522    0 01 12545       JMP   MPOS
0536 12523    -0 10 00070      JST*  AMUL
0537 12524    0 012543         DAC   SFT  NUMERATOR SCAL FACT.
0538 12525    -0 10 00071      JST*  ADIV
0539 12526    0 012544         DAC   SF2  DENOM. SCAL. FACT.
0540 12527    000000           HLT
0541 12530    0 11 12541       CAS   P128
0542 12531    101000           NOP
0543 12532    100000           SKP
0544 12533    0 02 12541       LDA   P128
0545 12534    0 12 12542       IRS   SIND
0546 12535    100000           SKP
0547 12536    140407           TCA
0548 12537    0 06 12541       ADD   P128
0549 12540    -0 01 12520      JMP*  POSL
0550 12541    0 000200 P128    DAC   128
0551 12542    000000   SIND    DEC   0
0552 12543    000400   SF1     DEC   128
0553 12544    006200   SF2     DEC   500
0554 12545    000201   MPOS    IAB
0555 12546    0 02 00142       LDA   MYN1 NEGATIVE IND
0556 12547    0 04 12542       STA   SIND
0557 12550    000201           IAB
0558 12551    140407           TCA
0559 12552    0 01 12523       JMP   POSL+3
0560 12553    000000           OCT   0 L510
0561 12554    010000           OCT   10000 L511
0562 12555    020000           OCT   20000 L512
0563 12556    030000           OCT   30000 L513A
0564 12557    040000           OCT   40000 L514
0565 12560    050000           OCT   50000 L516A
0566 12561    000000           BSZ   3
0567 12564    060000           OCT   60000 L516B
0568 12565    070000           OCT   70000 L516B
0569 12566    000000           OCT   0
0570 12567    000000           OCT   0
0571          000000   DATB    EQU   *
0572                           END
B2ST   12570
IHD    12571
LVCX   12572
OFSH   12573
PFIR   12574
RSLC   12575
STRB   12576
SUSP   12577
TIME   12600
TOUT   12601
UNSP   12602
```

|      |          |      |          |      |          |      |          |
|------|----------|------|----------|------|----------|------|----------|
| ?    | 003502a  | AB21 | 022251A  | AB22 | 022451A  | AB23 | 022651A  |
| AB24 | 023073A  | AB25 | 023453A  | AB26 | 023717A  | AB27 | 024517A  |
| AB28 | 024520A  | AB29 | 024521A  | AB2S | 000150A  | ABP1 | 020000A  |
| ABP2 | 020200A  | ABP3 | 020400A  | ABP4 | 020622A  | ABP5 | 021202A  |
| ABP6 | 021446A  | ABP7 | 022246A  | ABP8 | 022247A  | ABP9 | 022250A  |
| ACD3 | 003071A  | ACMX | 000066A  | ACRQ | 000130A  | ADD1 | 000133A  |
| ADIV | 000071A  | AERM | 000153A  | AFSH | 000151A  | AMUL | 000070A  |
| AOIC | 000154A  | APR1 | 003314A  | ARLC | 000152A  | ASLD | 000136A  |
| ASLN | 000137A  | ASRQ | 000141A  | ASTR | 000072A  | ASUS | 000064A  |
| ATIM | 000073A  | ATOU | 000067A  | AUNS | 000065A  | B2ST | 012570A  |
| BT01 | 000074A  | BT02 | 000075A  | BT03 | 000076A  | BT04 | 000077A  |

```
0001                                    *CONTACT SCAN MOBIL CHEM.
0002                                            LOAD
0003                                              ORG    '4000
0004                                    *PER CONTACT SCAN AND PROCESS
0005 04000   0 02 00132  CSAP  LDA      CAS1   GET TIME ZERO
0006 04001   100040            SZE             SKIP NOT TIME ZERO
0007 04002   0 01 04113        JMP      CSTZ   GO MAKE THEM LOOK CHANGE
0008 04003   0 10 04076        JST      CNRD   READ ALL GROUPS
0009 04004   0 02 04127        LDA      CSTI
0010 04005   0 04 04130        STA      CSTI+1 SET UP POINT TO STATUS
0011 04006   0 06 00144        ADD      PNC3
0012 04007   0 04 04126        STA      CST2
0013 04010   0 02 04162        LDA      CSM4
0014 04011   0 04 04161        STA      CSGC
0015 04012   140040            CRA
0016 04013   0 04 04145        STA      CSBC
0017 04014   140040      CZAP  CRA
0018 04015   0 04 00000        STA      )      ZERO BIT COUNT
0019 04016  -0 02 04130        LDA*     CST1+1 GET OLD STATUS
0020 04017   0 03 04515        ANA      CMAR   MASK OUT ARROW HISTORY
0021 04020  -0 04 04130        STA*     CST1+1
0022 04021  -0 05 04126        ERA*     CST2   ISOLATE CHANGED BITS
0023 04022   101040      C1AP  SNZ             SKIP IF CHANGED
0024 04023   0 01 04061        JMP      CSNX
0025 04024   101400            SM1             SKIP IF NEXT BIT SET
0026 04025   0 01 04051        JMP      CSNB   GO CHK NXT BIT
0027 04026   0 04 04146        STA      CSTP   SAVE CUR. WORD
0028 04027  -0 05 04130        ERA*     CST1+1 GET CURRENT STAT
0029 04030   0 04 04147        STA      CSSB   SAVE STATUS FOR
0030 04031   0 02 0000         LDS      0      FUNCT.
0031 04032   0 06 04145        ADD      CSBC   ADD TOTAL BIT OFFSET
0032 04033   0 04 00000        STA      0
0033 04034  -0 02 04125        LDA*     CSFT   GET FUNCT WORD
0034 04035   000201            1AB
0035 04036   0 02 00000        LDA      0
0036 04037   0 07 04145        SUB      CSBC   RESTORE X
0037 04040   0 04 04150        STA      CSXS   SAVE INDEX
0038 04041   000201            1AB             RESTORFUNCT WORD
0039 04042   140100            SSP             CLEAR BIT 1 TYPE
0040 04043   0400 64           LRL      '14    GET TYPE
0041 04044   0 04 00000        STA      0
0042 04045   0410 64           LLL      '14    RESTOREFUNCT WORD
0043 04046  -1 10 04151        JST*     CSTT,1 GO EXEC. TYPE N
0044 04047   0 35 04150  CSTR  LDX      CSXS   RESTORE X + A
0045 04050   0 02 04146        LDA      CSTP
0046 04051   0414 77     CSNB  LGL      '1
0047 04052   000201            LAB
0048 04053  -0 02 04130        LDA*     CST1+1
0049 04054   0414 77           LGL      '1     MOVE NEW WORD TO
0050 04055  -0 04 04130        STA*     CST1+1 NEXT BIT TO TEST
0051 04056   000201            1AB             RESTORE CHANGES
0052 04057   0 12 00000        IRS      0      BIT COUNT THIS WORD
0053 04060   0 01 04022        JMP      C1AP   GO CUK MORE
0054 04061   0 02 04145  CSNX  LDA      CSBC
0055 04062   0 06 00107        ADD      BT12
0056 04063   0 04 04145        STA      CSBC   ADD 16 TO BASE COUNT
0057 04064   0 12 04126        IRS      CST2   MOVE PNTRS TO
0058 04065   0 12 04130        IRS      CST1+1 NEXT GROUP
0059 04066   0 12 04161        IRS      CSGC
```

```
0060  04067   0 01 04014            JMP    CZAP
0061  04070   0 35 04162            LDX    CSM4    MOVE NEW STATUS TO
0062  04071   1 02 04143            LDA    CCSN,1  OLD STATUS
0063  04072   1 04 04140            STA    CCSN-3,1
0064  04073   0 12 00000            IRS    0
0065  04074   0 01 04071            JMP    *-3
0066  04075  -0 01 00066            JMP*   ACMX    COM. EXIT.
0067  04076   0 000000     CNRD DAC **      SUB TO READ CONT.
0068  04077   0 35 04162            LDX    CSM4    GRP COUNT
0069  04100   1 02 04170            LDA    CSGA,1  CONT GROUP
0070  04101   001001               INH
0071  04102   74 1377              OTA    '1377   CIM
0072  04103   0 01 04102            JMP    *-1
0073  04104   54 1077              INA    '1077   GET INPUT
0074  04105   000000               HLT
0075  04106   000401               ENB
0076  04107   1 04 04143            STA    CCSN,1
0077  04110   0 12 00000            IRS    0       SLIP IF ALL GROUPS READ
0078  04111   0 01 04100            JMP    CNRD+2
0079  04112  -0 01 04076            JMP*   CNRD    RETRN CALL
0080                        *ROUT. TO SET ALL CONTACT HISTORY TO COMP.
0081  04113   140040       CSTZ CRA          FORCE CHANGES
0082  04114   0 04 00132            STA    CSA1
0083  04115   0 10 04076            JST    CNRD
0084  04116   0 35 04162            LDX    CSM4
0085  04117   1 02 04143            LDA    CCSN,1
0086  04120   140401               CMA
0087  04121   1 04 04140            STA    CCSN-3,1
0088  04122   0 12 00000            IRS    0
0089  04123   0 01 04117            JMP    CSTZ+4
0090  04124   0 01 04003            JMP    CSAP+3
0091  04125   1 004545     CSFT DAC C1FT,1  INDEX PNTR TO FUN. TABLE
0092  04126   0 004135     CST2 DAC *+7     WORKING PNTR
0093  04127   0 004135     CST1 DAC *+6
0094  04130   0 004131          DAC *+1     WORKING PNTR
0095  04131   000000            OCT 0       GRP 1 STATUS - OLD
0096  04132   000000            OCT 0       GRP 2 STATUS - OLD
0097  04133   000000            OCT 0       GRP 3 STATUS - OLD
0098  04134   000000            OCT 0       GRP 4 STATUS - OLD
0099  04135   000000            OCT 0       GRP 5 (SPARE - OLD
0100  04136   000000            OCT 0       GRP 6 (SPARE - OLD
0101  04137   000000            OCT 0       GRP1 )SPARE NEW
0102  04140   000000            OCT 0       GRP 2 )SPARE NEW
0103  04141   000000            OCT 0       GRP 3 )SPARE NEW
0104  04142   000000            OCT 0       GRP4 )SPARE NEW
0105  04143   000000       CCSN OCT 0       GRP5 )SPARE)NEW
0106  04144   000000            OCT 0       GRP6 (SPARE)
0107  04145   000000       CSBC OCT 0       TOTAL BFT COUNT
0108  04146   000000       CSTP OCT 0       TEMP WORD STORE
0109  04147   000000       CSSB OCT 0       BIT 1 =CURR. STATUS
0110  04150   000000       CSXS OCT 0       TEMP X SAVE
0111  04151   0 004502     CSTT DAC CFT1    UPDTE   STATUS
0112  04152   0 004504          DAC CFT2    ALARM
0113  04153   0 004172          DAC CFT3    PANEL
0114  04154   0 004506          DAC CFT4    PROG
0115  04155   0 004502          DAC CFT1    SPARE
0116  04156   0 004502          DAC CFT1    "
0117  04157   0 004502          DAC CFT1    "
0118  04160   0 004502          DAC CFT1    "
0119  04161   177774       CSGC OCT '-4
0120  04162   177775       CSM4 OCT -3
0121  04163   000006            OCT 6
0122  04164   000010            OCT 10
0123  04165   000000            OCT 0
0124  04166   000002            OCT 2
0125  04167   000004            OCT 4
0126  04170   000000       CSGA OCT 0
0127  04171   000000            OCT 0       SPARE
0128                        *FUNCT TYPE 3 = CODE EQUALS 2 PANEL REQ
0129  04172   0 000000     CST3 DAC **
0130  04173   0 10 04201            JST    CSSS    SAVE FUNCT + LINE
0131  04174   0 02 04211            LDA    CSFC    FUNCT CODE TO X
0132  04175   0 03 00147            ANA    PC17    GO TO FUNC
0133  04176   0 04 00000            STA    0
0134  04177  -1 10 04213            JST*   CSFV, 1 GO TO FUNCT
```

```
0135  04200  -0 01 04172        JMP*    CST3
0136  04201   0 000000   CSSS   DAC     **
0137  04202   0400 74           LRL     '4       LINE # TO B
0138  04203   141050            CAL              ZERO HIGH BYTE
0139  04204   0 04 04211        STA     CSFC     STORE FUNCT CODE
0140  04205   140040            CRA
0141  04206   0410 74           LLL     '4
0142  04207   0 04 04212        STA     CSLC     STORE LINE #
0143  04210  -0 01 04201        JMP*    CSSS
0144  04211   000000     CSFC   HLT
0145  04212   000000     CSLC   HLT
0146  04213   0 004513   CSFV   DAC     CSFO
0147  04214   0 004233          DAC     CSF1     MAN/SCAN
0148  04215   0 004301          DAC     CSF2     FRONT/BACK
0149  04216   0 004326          DAC     CSF3     SING POINT
0150  04217   0 004373          DAC     CSF4     SEL. PROF 1
0151  04220   0 004513          DAC     CSFO
0152  04221   0 004422          DAC     CSF6     ARR LEFT
0153  04222   0 004437          DAC     CSF7     ARR RIGHT
0154  04223   0 004516          DAC     CSF8 OFFSHEET -ON SHEET
0155  04224   0 004513          DAC     CSFO "
0156  04225   0 004513          DAC     CSFO "
0157  04226   0 004513          DAC     CSFO "
0158  04227   0 004513          DAC     CSFO "
0159  04230   0 004513          DAC     CSFO "
0160  04231   0 004513          DAC     CSFO "
0161  04232   0 004513          DAC     CSFO "
0162                            *MAN/SCAN FUNCTION
0163  04233   0 000000   CSF1   DAC     **
0164  04234   0 10 04475        JST     C1UP     SET UP LDF PNTR
0165  04235   0 04 04300        STA     CLDF     INDEX PNTR TO LDF
```

INT CONTACT SERVICE MOBIL

INSERT AFTER LINE 195, PAGE 4

```
04726  073212              IDX     CSLC
04727  140040              CRA
04730  111745              STA*    FP5C
04731  005212              LDA     CSLC
04732  022144              CAS     PNC3
04733  100000              SKP
04734  015746              ADD     PNC6
04735  022145              CAS     PNC5
04736  100000              SKP
04737  014145              ADD     PNC5
04740  010000              STA     0
04741  140040              CRA
04742  111745              STA*    FP5C
04743  000401              ENB
04744  103233              JMP*    CSF1
04745  043350       FP5C   DAC     '3350,1
04746  000006       PNC6   DEC     6
```

CONTACT SCAN MOBIL

REPLACE LINE 178 PAGE 4

```
04252  003747              JMP     FORC
04747  005212       FORC   LDA     CSLC
04750  022144              CAS     PNC3
04751  022111              CAS     BT14
04752  003762              JMP     BKTO
04753  04007        FRNT   LRL     1
04754  014174              ADD     CCDB
04755  010173              STA     CCDA
04756  140040              CRA
04757  041077              LLL     1
04760  020567              JST     STBT
04761  103233              JMP*    CSF1
```

```
04762    004172    BKTO    LDA     CCD3
04763    010173            STA     CCDA
04764    005212            LDA     CSLC
04765    040476            LGR     2
04766    020567            JST     STBT
04767    005212            LDA     CSLC
04770    3753              JMP     FRNT
00567    OSTBT             PZE     0
00570    010000            STA     0
00571    044102            LDA     BTO7,1
00572    140401            CMA
00573    106173            ANA*    CCDA
00574    052102            ERA     BTO7,1
00575    110173            STA*    CCDA
00576    103567            JMP*    STBT
```

```
0166    04236    0 35 0014.           LDX     PNCO
0167    04237    0 02 04147           LDA     CSSB
0168    04240    101400               SMI             SKIP IF 0 TO 1
0169    04241    0 01 04253           JMP     C1TO    STATUS CHG 1 to 0
0170    04242    001001               INH             MAN. MOD SELCT
0171    04243   -0 02 04300           LDA*    CLDF
0172    04244    140500               SSM
0173    04245   -0 04 04300           STA*    CLDF    SET MAN IND.
0174    04246    0 35 04212           LDX     CSLC
0175    04247    1 02 00117           LDA     LDF1,1
0176    04250   -0 10 00152           JST*    ARLC    RESET LCO'S
0177    04251    000401               ENB
0178    04252   -0 01 04233           JMP*    CSF1
0179    04253    001001       C1TO    INH
0180    04254   -0 02 04300           LDA*    CLDF
0181    04255    0416 74              ALR     4
0182    04256    101400               SMI
0183    04257   -0 01 04233           JMP*    CSF1
0184    04260    0406 74              ARR     4
0185    04261    140100               SSP             CLEAR MAN IND.
0186    04262    0406 71              ARR     '7
0187    04263    140500               SSM             SET INT. IND. CRT
0188    04264    0416 71              ALR     '7
0189    04265   -0 04 04300           STA*    CLDF
0190    04266    0 35 04276           LDX     CV26
0191    04267    140040               CRA
0192    04270    141206               AOA
0193    04271   -0 04 04300           STA*    CLDF    SET A/D INT.
0194    04272    0 35 04277           LDX     CV35
0195    04273   -0 04 04300           STA*    CLDF    SET STAND. REQ.
0196    04274    000401               ENB
0197    04275   -0 01 04233           JMP*    CSF1
0198    04276    000031       CV26    DEC     25
0199    04277    000035       CV35    OCT     35
0200    04300    0 000000      CLDF   DAC     **      COM. LDF PNTR
0201                           *FRONT BACK SELECTOR (SPECIAL LINES)
0202    04301    0 000000      CSF2   DAC     **
0203    04302    0 10 04475           JST     C1UP
0204    04303    0 04 04300           STA     CLDF    INDEXED PNTR TO LDF
0205    04304    0 35 00143           LDX     PNCO
0206    04305    0 02 04147           LDA     CSSB    GET STATUS
0207    04306    001001               INH
0208    04307    101400               SMI             SKIP IF 0=1
0209    04310    0 01 04322           JMP     C1F2    BACK SIDE 1 = 0
0210    04311   -0 02 04300           LDA*    CLDF
0211    04312    0416 76              ALR     2
0212    04313    140500               SSM
0213    04314    0416 71              ALR     '7
0214    04315    140500               SSM
0215    04316    0416 71              ALR     7
0216    04317   -0 04 04300           STA*    CLDF    RESTORE WITH NEW
0217    04320    000401               ENB             SIDE AND INT. BIT.
0218    04321   -0 01 04301           JMP*    CSF2
0219    04322   -0 02 04300   C1F2    LDA*    CLDF
0220    04323    0416 76              ALR     2
```

CONTACT SCAN MOBIL

IN  T AFTER LINE 243, PAGE 5

| | | | | |
|---|---|---|---|---|
| 04352 | 002472 | | JMP | '472 |
| 00472 | 072626 | | LDX | = '33 |
| 00473 | 004074 | | LDA | BT01 |
| 00474 | 111877 | | STA* | CLDF |
| 00475 | 072627 | | LDX | = '30 |
| 00476 | 103477 | | JMP* | *+1 |
| 00477 | 004353 | | DAC | '4353 |
| 00626 | 000033 | | OCT | 33 |
| 00627 | 000030 | | OCT | 30 |
| 00577 | 104300 | CLDF | DAC* | 4300 |

ONTACT SCAN MOBIL

INSERT AFTER LINE 249, PAGE 5

| | | | | |
|---|---|---|---|---|
| 04707 | 000401 | | ENB | |
| 04710 | 073212 | | LDX | CSLC |
| 04711 | 104637 | | LDA | ASLB |
| 04712 | 011725 | | STA | CCNT |
| 04713 | 105723 | | LDA* | POBB |
| 04714 | 011724 | | STA | CBUF |
| 04715 | 140040 | | CRA | |
| 04716 | 111724 | | STA* | CBUF |
| 04717 | 025724 | | IRS | CBUF |
| 04720 | 025725 | | IRS | CCNT |
| 04721 | 003716 | | JMP | * - 3 |
| 04722 | 003703 | | JMP | '4703 |
| 04723 | 050757 | POBB | DAC | BUF2,1 |
| 04724 | 000000 | CBUF | PZE | |
| 04725 | 000000 | CCNT | PZE | |
| 04703 | 110175 | | STA* | AASV |
| 04704 | 110176 | | STA* | AAS1 |
| 04705 | 003771 | | JMP | '4771 |
| 00175 | 105716 | AASV | DAC* | '5716 |
| 00176 | 105717 | AAS1 | DAC* | '5717 |
| 04771 | 044117 | | LDA | LDF,1 |
| 04772 | 010000 | | STA | 0 |
| 04773 | 105706 | | LDA* | '4706 |
| 04774 | 140407 | | TCA | |
| 04775 | 050032 | | STA | 26,1 |
| 04776 | 103777 | | JMP* | '4777 |
| 04777 | 006703 | | DAC | '6703 |
| 04706 | 005756 | | DAC | '5756 |
| 06703 | 173727 | | LDX* | CSLC |
| 06704 | 104637 | | LDA | ASLB |
| 06705 | 011722 | | STA | CCNT |
| 06706 | 105726 | | LDA* | AB2P |
| 06707 | 011723 | | STA | CBUF |
| 06710 | 105725 | | LDA* | AB1P |
| 06711 | 011724 | | STA | CBF1 |
| 06712 | 140040 | | CRA | |
| 06713 | 010000 | | STA | 0 |
| 06714 | 111724 | STA* | CBF1 | |
| 06715 | 111723 | | STA* | CBUF |
| 06716 | 024000 | | IRS | 0 |
| 06717 | 025722 | | IRS | CCNT |
| 06720 | 003714 | | JMP | * - 4 |
| 06721 | 103730 | | JMP* | '4360 |
| 06722 | 000000 | CCNT | PZE | |
| 06723 | 000000 | CBUF | PZE | |
| 06724 | 000000 | CBF1 | PZE | |
| 06725 | 046254 | AB1P | DAC | '6254,1 |
| 06726 | 046266 | AB2P | DAC | '6266,1 |
| 06727 | 004212 | CSLC | DAC | '4212 |
| 06730 | 004360 | | DAC | '4360 |
| 00637 | | | DAC | '46321 |

```
0221 04324    140100             SSP
0222 04325    0 01 04314         JMP    *-9
0223                            *SINGLE POINT FUNCT.
0224 04326    0 000000    CSF3  DAC    **
0225 04327    0 10 04475         JST    C1UP     SET UP LDF PNTR
0226 04330    0 04 04300         STA    CLDF
0227 04331    0 35 00143         LDX    PNCO
0228 04332    0 02 04147         LDA    CSSB
0229 04333    001001             INH
0230 04334    101400             SMI              SKIP 0=1 SINGLE POINT
0231 04335    0 01 04361         JMP    C1T3
0232 04336   -0 02 04300         LDA*   CLDF
0233 04337    0416 75            ALR    '3
0234 04340    140100             SSP
0235 04341    0416 72            ALR    6
0236 04342    140500             SSM
0237 04343    0416 76            ALR    2
0238 04344    140100             SSP
0239 04345    0416 73            ALR    5
0240 04346   -0 04 04300         STA*   CLDF
0241 04347    0416 74            ALR    4
0242 04350    101400             SMI
0243 04351    0 01 04357         JMP    C2T3
0244 04352    0 35 04675         LDX    ='27
0245 04353   -0 02 04300         LDA*   CLDF
0246 04354    0 06 00102         ADD    BT07
0247 04355    001001             INH
0248 04356   -0 10 00130         JST*   ACRO
0249 04357    000401      C2T3  ENB
0250 04360   -0 01 04326         JMP*   CSF3
0251 04361   -0 02 04300  C1T3  LDA*   CLDF
0252 04362    0416 75            ALR    3
0253 04363    140500             SSM
0254 04364    0416 72            ALR    6
0255 04365    140500             SSM
0256 04366    0416 76            ALR    2
0257 04367    140500             SSM
0258 04370    0416 73            ALR    5
0259 04371   -0 04 04300         STA*   CLDF
0260 04372    0 01 04357         JMP    C2T3
0261 04373    0 000000    CSF4  DAC    **
0262 04374    0 10 04475         JST    C1UP
0263 04375    0 04 04300         STA    CLDF
0264 04376    0 35 00143         LDX    PNCO
0265 04377    0 02 04147         LDA    CSSB
0266 04400    001001             INH
0267 04401    101400             SMI
0268 04402    0 01 04407         JMP    CS40
0269 04403   -0 02 04300         LDA*   CLDF
0270 04404    0416 66            ALR    '12
0271 04405    140100             SSP
0272 04406    0 01 04412         JMP    CS41
0273 04407   -0 02 04300  CS40  LDA*   CLDF
0274 04410    0416 66            ALR    '12
0275 04411    140500             SSM
0276 04412    0406 77     CS41  ARR    1
0277 04413    140500             SSM
0278 04414    0406 76            ARR    2
0279 04415    140500             SSM
0280 04416    0406 71            ARR    7
0281 04417   -0 04 04300         STA*   CLDF
0282 04420    000401             ENB
0283 04421   -0 01 04373         JMP*   CSF4
0284                            *ARROW LEFT BUTTON
0285 04422    0 000000    CSF6  DAC    **
0286 04423    0 10 04475         JST    C1UP
0287 04424    0 04 04300         STA    CLDF
0288 04425    0 02 04147         LDA    CSSB
0289 04426    101400             SMI
0290 04427   -0 01 04422         JMP*   CSF6
0291 04430    0 35 04456         LDX    CV11
0292 04431   -0 02 04300         LDA*   CLDF
0293 04432    101040             SNZ              SKIP NOT AT LIMIT
0294 04433   -0 01 04422         JMP*   CSF6
```

```
0295 04434    0 07 00113            SUB    BT16
0296 04435    0 10 04460            JST    CS67    COMMON CST 6 + 7
0297 04436   -0 01 04422            JMP*   CSF6
0298                                *ARROW RIGHT BUTTON
0299 04437    0 000000     CSF7 DAC **
0300 04440    0 01 04475            JST    C1UP
0301 04441    0 04 04300            STA    CLDF
0302 04442    0 02 04147            LDA    CSSB
0303 04443    101400                SMI
0304 04444   -0 01 04437            JMP*   CSF7
0305 04445    0 35 04456            LDX    CV11
0306 04446   -0 02 04300            LDA*   CLDF
0307 04447    0 07 04457            SUB    CV80
0308 04450    101400                SMI            SKIP LESS 80 INCHES
0309 04451   -0 01 04437            JMP*   CSF7
0310 04452   -0 02 04300            LDA*   CLDF
0311 04453    0 06 00113            ADD    BT16
0312 04454    0 10 04460            JST    CS67
0313 04455   -0 01 04437            JMP*   CSF7
0314 04456    000013       CV11 DEC 11
0315 04457    000240 600  CV80 DEC  384
0316                                *COMMON ARROW SERV. BUTTONS
0317 04460    0 000000     CS67 DAC **
0318 04461   -0 04 04300            STA*   CLDF
0319 04462    0 35 00143            LDX    PNCO
0320 04463   -0 02 04300            LDA*   CLDF
0321 04464    0416 71               ALR    7
0322 04465    140500                SSM
0323 04466    0406 71               ARR    7
0324 04467   -0 04 04300            STA*   CLDF
0325 04470    0 02 04146            LDA    CSTP
0326 04471    140100                SSP
0327 04472    0 04 04146            STA    CSTP
0328 04473    000401                ENB
0329 04474   -0 01 04460            JMP*   CS67
0330 04475    0 000000     C1UP DAC **      S.R. CALC. LDF PNTR

CONTACT SCAN MOBIL

INSERT AFTER LINE 367, PAGE 7

04676   005300          LDA    CLDF
04677   007702          ANA    CBT2
04700   120151          JST*   AFSH
04701   003535          JMP    CSON-1
04702   137777  CBT2    OCT    137777

0331 04476    0 35 04212            LDX    CSLC    WITH INDEX
0332 04477    1 02 00117            LDA    LDF1,1
0333 04500    0 06 00075            ADD    BT02    SET INDEX BIT
0334 04501   -0 01 04475            JMP*   C1UP
0335                                *TYPE 1 CODE = 0 UPDATE CONTAC HISTORY
0336 04502    0 000000     CFT1 DAC **
0337 04503   -0 01 04502            JMP*   CFT1
0338                                *TYPE 2 CODE = 1 REPORT CONTACT CHANGE
0339 04504    0 000000     CFT2 DAC **
0340 04505   -0 01 04504            JMP*   CFT2
0341 04506    0 000000     CFT4 DAC **      PROG REQUEST FUNCTION
0342 04507   -0 01 04506            JMP*   CFT4
0343                                *PREV. SR'S ARE DUMMY WHICH MAY BE ADDED
0344                                *IF REQUIRED
0345                                *RELOCAT. FUNCT WORD TABLE FOR PER. CONTAC
0346 04510    000035       CV30 DEC 29
0347 04511    000044       CV44 OCT '44
0348 04512    000016       CV14 DEC 14
0349 04513    0 000000     CSFO DAC **      BAD DATA BASE
0350 04514   -0 01 04513            JMP*   CSFO
0351                                *BAD DATA BASE
0352          004172       CFT3 EQU CST3
0353 04515    131547       CMAR OCT 131547
0354 04516    0 000000     CSF8 DAC **
0355 04517    0 10 04475            JST    C1UP
0356 04520    0 04 04300            STA    CLDF
```

```
0357 04521    0 35 00143         LDX    PNCO
0358 04522    001001             INH
0359 04523    0 02 04147         LDA    CSSB
0360 04524    101400             SMI
0361 04525    0 01 04537         JMP    CSON
0362 04526   -0 02 04300         LDA*   CLDF
0363 04527    0416 74            ALR    4
0364 04530    140100             SSP
0365 04531    0406 74            ARR    4
0366 04532    140500             SSM
0367 04533   -0 04 04300         STA*   CLDF
0368 04534   -0 10 00151         JST*   AFSH
0369 04535    000401             ENB
0370 04536   -0 01 04516         JMP*   CSF8
0371 04537   -0 02 04300  CSON   LDA*   CLDF
0372 04540    0416 74            ALR    4
0373 04541    140500             SSM
0374 04542    0406 74            ARR    4
0375 04543   -0 04 04300         STA*   CLDF
0376 04544    0 01 04535         JMP    CSON-2
0377                         *DATA BASE FORM. OF FOLLOW TABLE
0378                         *BTS 1-4=TYPE, 5-12=FUNCT., 13-16=LINE #
0379 04545    020020      CIFT   VFD    4,2,8,1,4,0
0380 04546    000000             BSZ    1
0381 04547    020060             VFD    4,2,8,3,4,0
0382 04550    020100             VFD    4,2,8,4,4,0
0383 04551    020160             VFD    4,2,8,7,4,0
0384 04552    020140             VFD    4,2,8,6,4,0
0385 04553    020200             VFD    4,2,8,8,4,0
0086 04554    020021             VFD    4,2,8,1,4,1
0387 04555    000000             BSZ    1
0388 04556    020061             VFD    4,2,8,3,4,1
0389 04557    020101             VFD    4,2,8,4,4,1
0390 04560    020141             VFD    4,2,8,6,4,1
0391 04561    020161             VFD    4,2,8,7,4,1
0392 04562    020201             VFD    4,2,8,8,4,1
0393 04563    000000             BSZ    2
0394 04565    020022             VFD    4,2,8,1,4,2
0395 04566    000000             BSZ    1
0396 04567    020062             VFD    4,2,8,3,4,2
0397 04570    020102             VFD    4,2,8,4,4,2
0398 04571    020162             VFD    4,2,8,7,4,2
0399 04572    020142             VFD    4,2,8,6,4,2
0400 04573    020202             VFD    4,2,8,8,4,2
0401 04574    020023             VFD    4,2,8,1,4,3
0402 04575    000000             VFD    16,0
0403 04576    020063             VFD    4,2,8,3,4,3
0404 04577    020103             VFD    4,2,8,4,4,3
0405 04600    020143             VFD    4,2,8,6,4,3
0406 04601    020163             VFD    4,2,8,7,4,3
0407 04602    020203             VFD    4,2,8,8,4,3
0408 04603    020043             VFD    4,2,8,2,4,3
0409 04604    000000             VFD    16,0
0410 04605    020024             VFD    4,2,8,1,4,4
0411 04606    000000             BSZ    1
0412 04607    020064             VFD    4,2,8,3,4,4
0413 04610    020104             VFD    4,2,8,4,4,4
0414 04611    020164             VFD    4,2,8,7,4,4
0415 04612    020144             VFD    4,2,8,6,4,4
0416 04613    020204             VFD    4,2,8,8,4,4
0417 04614    020025             VFD    4,2,8,1,4,5
0418 04615    000000             BSZ    1
0419 04616    020065             VFD    4,2,8,3,4,5
0420 04617    020105             VFD    4,2,8,4,4,5
0421 04620    020145             VFD    4,2,8,6,4,5
0422 04621    020165             VFD    4,2,8,7,4,5
0423 04622    020205             VFD    4,2,8,8,4,5
0424 04623    020045             VFD    4,2,8,2,4,5
0425 04624    000000             BSZ    33
0426                         *KEEP ALIVE WATCH DOG
0427 04665    0 02 04674  WTDG   LDA    FLFL
0428 04666    0 05 04673         ERA    FLIP
0429 04667    0 04 04674         STA    FLFL
0430 04670    001001             INH
```

```
0431 04671    -0 10 00130          JST*  ACRQ
0432 04672    -0 01 00066          JMP*  ACMX
0433 04673     003000        FLIP  OCT   3000
0434 04674     002000        FLFL  OCT   2000
0435 04675     000027              END

RSLC     04676
OFSH     04677
B2ST     04700
TIME     04701
     0001                         ;A/D SCAN AND GUAGE CONTRC
     0002                          ORG   '5000
     0003                          LOAD
     0004 05000  0 04 00137 ASGC  STA   ASLN    ZRO LINE #
     0005 05001  0 10 05606        JST   SETP    SET UP POINTERS
     0006 05002  1 02 00000 ARGC  LDA   0,1     GET CONTROL WORD
     0007 05003   100400           SPL           SKIP NOT MANUAL
     0008 05004  0 01 05436        JMP   ASMN    GO DO MAN. THING
     0009 05005  1 02 00031        LDA   25,1    GET A/D INIT IND
     0010 05006  0 06 00133        ADD   ADD1    T-ZERO INDICATOR
     0011 05007   100040           SZE           SKIP NO INIT
     0012 05010  0 01 05441        JMP   ASIN    GO INIT THIS LINE
     0013 05011  1 02 00000        LDA   0,1     GET CONTROL WORD
     0014 05012   0414 75          LGL   3
     0015 05013   100400           SPL           SKIP NOT D.M.
     0016 05014  0 01 05622        JMP   ASDM
     0017 05015  1 02 00032 AIDM  LDA   26,1    IS SAMPLE COUNT RON OUT
     0018 05016   101400           SMI
     0019 05017  0 01 05533        JMP   ASWY    YES, WHY
     0020 05020  1 12 00032        IRS   26,1    INCREMENT SAMPLE COUNT
     0021 05021   101000           NOP           AND TAKE MORE SAMPLE
     0022 05022   001001           INH
     0023 05023  -0 10 05760       JST*  ASRD    READ A/D POINT
     0024 05024  0 35 00137        LDX   ASLN
     0025 05025  -0 06 05716       ADD*  AASV    DOUBLE WORD
     0026 05026   100001           SRC
     0027 05027  -0 12 05717       IRS*  AAS1    ACCUMULATE
     0028 05030   140100           SSP
     0029 05031  -0 04 05716       STA*  AASV
     0030 06   0 35 00136 AIGD   LDX   ASLD
     0031 05033   001001           INH
     0032 05034  1 02 00023        LDA   19,1    GET SEGMENT COUNT
     0033 05035   101400           SMI           SKIP IF NEW SEGMENT
     0034 05036  0 01 05056        JMP   ASNX              GO DO NEXT GU
     0035 05037   140100           SSP
     0036 05040  1 04 00023        STA   19,1    PUT SEGMENT COUNT BACK
     0037 05041  0 03 05757        ANA   ASM1     SAVE SEG COUNT
     0038 05042  0 04 05705        STA   A1TP
     0039 05043   000401           ENB
     0040 05044  1 11 00005        CAS   5,1     GREATER THAN OFFSET
     0041 05045  0 01 05065        JMP   ASNS    YES, AVERAGE NEW SEG.
     0042 05046   101000           NOP
     0043 05047  0 02 05756 ASIG  LDA   ADKR    GET SAMPLE CONSTANT
     0044 05050   140407           TCA
     0045 05051  1 04 00032        STA   26,1    SET UP NEW SAMPLE COUNT
     0046 05052  0 35 00137        LDK   ASLN
     0047 05053   140040           CRA
     0048 05054  -0 04 05716       STA*  AASV
     0049 05055  -0 04 05717       STA*  AAS1
     0050 05056  0 12 00137 ASNX  IRS   ASLM
     0051 05057  0 10 05606        JST   SETP    SET UP POINTERS
     0052 05060  0 02 05706        LDA   A1BP    SKIP IF ALL DONE
     0053 05061   100040           SZE
     0054 05062  0 01 05002        JMP   ARGC
     0055 05063  0 04 00133        STA   ADD1    RESET T-ZERO
     0056 05064  -0 01 00066       JMP*  ACMX    EXIT
     0057 05065  1 02 00032 ASNS  LDA   26,1    GET SAMPLE COUNT NOT TAKE
     0058 05066  0 06 05756        ADD   ADKR    PLUS NUMBER REQUESTED
     0059 05067  0 04 05755        STA   ASDV
     0060 05070  0 35 00137        LDK   ASLN    GET LINE #
     0061 05071  -0 02 05717       LDA*  AASV
     0062 05072   00201            IAB
     0063 05073  -0 02 05716       LDA*  AASV
     0064 05074   001001           INH
```

```
0065  05075  -0 10 00071        JST*  ADIV   CALC. AV. B.G. VOLTS
0066  05076   0 005755          DAC   ASDV
0067  05077  -0 10 00153        JST*  AERM   ERROR MESSAGE
0068  05100   000201            IAB
0069  05101   0414 76           LGL   2      HALF ADJUST
0070  05102   000201            IAB
0071  05103   141216            ACA
0072  05104  -0 10 05754        JST*  ILNC   LINEAR. A/D READING
0073  05105   0 35 00136        LDX   ASLD
0074  05106   1 07 00001        SUB   1,1    MINUS SETPOINT
0075  05107  -0 10 05753        JST*  ALIM   DO DEV ALARM
0076  05110   000201            IAB
0077  05111   0 04 05752        STA   ATMP   SAVE VALUE
0078  05112   000201            IAB
0079  05113   0 35 00136        LDK   ASLD
0080  05114   1 02 00000        LDA   0,1    GET CONTROL WORD
0081  05115   0405 73           ARS   5
0082  05116   100100            SLZ          SKIP IF SINGLE
0083  05117  -0 10 05751        JST*  ASSM   GO SMOOTH
0084  05120   000201            IAB
0085  05121   0 35 05705        LDK   A1TP   STORE RELATIVE TO SEG. CO
0086  05122  -0 04 05706        STA*  A1BP
0087  05123   0 02 05752        LDA   ATMP
0088  05124  -0 06 05707        ADD*  A2BP
0089  05125  -0 04 05707        STA*  A2BP   STORE IN AVERAGE
0090  05126   0 35 00136        LDX   ASLD
0091  05127   1 02 00004        LDA   4,1    GET WIDTH
0092  05130   141050            CAL
0093  05131   0 04 05752        STA   ATMP
0094  05132   1 02 00004        LDA   4,1
0095  05133   141140            ICL
0096  05134   0 06 05752        ADD   ATMP   CALCULATE TOTAL WIDTH
0097  05135   0 11 05705        CAS   A1TP   AT EDGE YET
0098  05136   0 01 05047        JMP   ASIG   NO
0099  05137   0 01 05047        JMP   ASIG   NO
0100  05140   1 02 00027  ASAR  LDA   23,1
0101  05141   0 06 00101        ADD   BT06   RESET FORWARD CONTACT
0102  05142   001001            INH
0103  05143  -0 10 00130        JST*  ACRQ
0104  05144   000401            ENB
0105  05145   0 02 05750        LDA   MV20
0106  05146   1 04 00034        STA   28,1   SET STOP TIMER
0107  05147   1 02 00000        LDA   0,1    GET CONTROL WORD
0108  05150   0404 74           LGR   4      TEST D.M. STATUS
0109  05151   100100            SLZ          SKIP NOT D.M.
0110  05152   0 01 05056        JMP   ASNX
```

A/D SCAN AND GAUGE CONTROL

INSERT AFTER LINE 123, PAGE 3

```
05771  141206         AOA
05772  010000         STA   0
05773  003171         JMP   '5171

0111  05153   0 02 00014        LDA   BT01   MAX MINUS VALUE
0112  05154   0 04 05747        STA   MAX    TO MAX
0113  05155   140401            CMA          MAX PLUS VALUE
0114  05156   0 04 05746        STA   MIN    TO MIN
0115  05157   140040            CRA
0116  05160   0 04 05705        STA   A1TP
0117  05161   1 13 00023        IMA   19,1   GET # OF SEGMENTS
0118  05162   0 03 05757        ANA   ASM1   REMOVE REF. IND.
0119  05163   1 07 00005        SUB   5,1    MINUS OFFSET
0120  05164   0 04 05740        STA   ASMX   NUMBER OF AVERAGE
0121  05165   140407            TCA
0122  05166   0 04 05745        STA   ACNT   SET COUNT
0123  05167   1 02 00005        LDA   5,1
0124  05170   0 04 00000        STA   0
0125  05171   000401            ENB
0126  05172   140040            CRA
0127  05173   0 04 05744        STA   A1TL
0128  05173  -0 02 05706  AIPL  LDA*  A1BP   CALCULATE AVERAGE
```

```
0129  05175   0401 61            LRS   '17
0130  05176   0 04 05742         STA   ALH
0131  05177   000201             IAB
0132  05200   140100             SSP
0133  05201   0 04 05743         STA   ALLH
0134  05202   0 02 05744         LDA   A1TL
0135  05203   000201             IAB
0136  05204   0 02 05705         LDA   A1TP
0137  05205   001001             INH
0138  05206  -0 10 00131         JST*  PDAD
0139  05207   0 005742           DAC   ALH
0140  05210  -0 10 00153         JST*  AERM    ERROR
0141  05211   000401             ENB
0142  05212   0 04 05705         STA   AT1P
0143  05213   000201             IAB
0144  05214   0 04 05744         STA   ALTL
0145  05215  -0 02 05706         LDA*  A1BP
0146  05216   0 11 05746         CAS   MAX     CHECK FOR MINIMUM
0147  05217   0 01 05433         JMP   STMN
0148  05220   101000             NOP
0149  05221   0 11 05747  ASXM   CAS   MIN     AND MAXIMUM
0150  05222   0 01 05226         JMP   *+4
0151  05223   0 01 05226         JMP   *+3
0152  05224   0 04 05747         STA   MIN     SET NEW MAX VALUE
0153  05225   0 15 05741         STX   MXPS    AND POSITION
0154  05226   0 12 00000         IRS   0
0155  05227   0 12 05745         LRS   ACNT
0156  05230   0 01 05174         JMP   A1PL
0157  05231   0 02 05744         LDA   A1TL
0158  05232   000201             IAB
0159  05233   0 02 05705         LDA   A1TP
0160  05234   001001             INH
0161  05235  -0 10 00071         JST*  ADIV
0162  05236   0 005740           DAC   ASMX
0163  05237  -0 10 00153         JST*  AERM    ERROR
0164  05240   000401             ENB
0165  05241   0 04 05705         STA   A1TP
0166  05242   0 35 00136         LDX   ASLD
0167  05243   1 02 00001         LDA   1,1     GET SET POINT
0168  05244   140100             SSP
0169  05245   0 04 05737         STA   STPT
0170  05246   0 06 05705         ADD   A1TP
0171  05247   140500             SSM
0172  05250   1 04 00006         STA   6,1     UPDATE AVERAGE
0173  05251   0 02 05737         LDA   STPT
0174  05252   0 06 05746         ADD   MIN
0175  05253   140500             SSM
0176  05254   1 04 00007         STA   7,1     UPDATE MINIMUM
0177  05255   0 02 05737         LDA   STPT
0178  05256   0 06 05747         ADD   MAX
0179  05257   140500             SSM
0180  05260   1 04 00010         STA   8,1     UPDATE MAXIMUM
0181  05261   0 02 05736         LDA   MNPS
0182  05262   141240             ICR
0183  05263   0 06 05741         ADD   MXPS
0184  05264   1 04 00011         STA   9,1     UPDATE MAX-MIN POS
0185  05265   0 35 00137         LDX   ASLN    UPDATE OUTPUT
0186  05266  -0 02 05714         LDA*  AASB    BUFFER WHEN
0187  05267   0 04 05740         STA   ASMX    NOT BUSY
0188  05270   0 35 00136         LDX   ASLD
0189  05271   1 02 00000         LDA   0,1     GET CONTROL WORD
0190  05272   0406 75            ARR   3
0191  05273   101100             SLN           SKIP FRONT BUSY
0192  05274   0 01 05314         JMP   ASYY
0193  05275   000201             IAB
0194  05276   1 02 00004         LDA   4,1     GET FRONT LENGTH
0195  05277   141050             CAL
0196  05300   0 04 05705         STA   A1TP
0197  05301   0 06 05740         ADD   ASMX
0198  05302   0 04 05740         STA   ASMX
0199  05303   101400             SMI
0200  05304   0 01 05416         JMP   ASXN    THERE IS NO BACK
0201  05305   0 02 05705         LDA   A1TP
0202  05306   0 06 05712         ADD   A3BP
0203  05307   0 04 05712         STA   A3BP
```

```
0204 05310   0 02 05705        LDA   A1TP
0205 05311   0 06 05707        ADD   A2BP
0206 05312   0 04 05707        STA   A2BP
0207 05313   000201            IAB
0208 05314   101400       ASYY SMI
0209 05315   0 01 05324        JMP   ASXX
0210 05316   1 02 00004        LDA   4,1
0211 05317   141140            ICL
0212 05320   0 06 05740        ADD   ASMX
0213 05321   101400            SMI         SKIP IF TRNSFER DONE
0214 05322   0 01 05416        JMP   ASXN
0215 05323   0 04 05740        STA   ASMX
0216 05324   140040       ASXX CRA
0217 05325   0 04 00000        STA   0     TRANSFER TO FINAL BUFFER,
0218 05326   0 04 05735        STA   OVRF  CHECK OVERFLOW FIRST AND
0219 05327  -0 02 05707        LDA*  A2BP  FORCE LOG IF PRESENT.
0220 05330  -0 06 05712        ADD*  A3BP

A/D SCAN AND GAUGE CONTROL

REPLACE LINES 232 THRU 262 PAGE 5

05344        072143            LDX   PNCO
05345        143340            CRA
05346        111707            STA*  A2BP
05347        024000            IRS   0
05350        025740            IRS   ASMX
05351        003346            JMP   *-3
05352        003422            JMP   A2GC 0221 05331   100001            SRC
0222 05332   0 04 05735        STX   OVRF
0223 05333   0 12 00000        IRS   0
0224 05334   0 12 05740        IRS   ASMX
0225 05335   0 01 05327        JMP   *-6
0226 05336   0 02 00000        LDA   0     RESET
0227 05337   140407            TCA
0228 05340   0 04 05740        STA   ASMX  COUNT
0229 05341   0 02 05735        LDA   OVRF  WAS OVERFLOW PRESENT
0230 05342   101040            SNZ
0231 05343   0 01 05403        JMP   ASUM  NO, PUT IT AWAY
0232 05344   0 35 00136        LDX   ASLD  YES, FORCE LOG
0233 05345   1 02 00000        LDA   0 1
0234 05346   0416 76           ALR   2
0235 05347   100400            SPL
0236 05350   0 01 05356        JMP   NTBK
0237 05351   0 02 05734        LDA   CCD3
0238 05352   0 04 05733        STA   CCDA
0239 05353   0 02 00137        LDA   ASLN
0240 05354   0404 76           LGR   2
0241 05355   0 01 05364        JMP   BKFT
0242 05356   0 02 00137   NTBK LDA   ASLN
0243 05357   0400 77           LRL   1
0244 05360   0 06 05732        ADD   CCDB
0245 05361   0 04 05733        STA   CCDA
0246 05362   140040            CRA
0247 05363   0410 77           LLL   1
0248 05364   0 04 00000   BKFT STA   0
0249 05365   1 02 00102        LDA   BT07,1
0250 05366   140401            CMA
0251 05367   001001            INH
0252 05370  -0 03 05733        ANA*  CCDA
0253 05371   1 05 00102        ERA   BT07,1
0254 05372  -0 04 05733        STA*  CCDA
0255 05373   0 02 05731        LDA   FSTL  GIVE OUT THE NEWS
0256 05374  -0 10 00067        JST*  ATOU
0257 05375   0 005724          DAC   FORS
0258 05376   000401            ENB
0259 05377   0 02 00113        LDA   BT16  SET SCAN RESET NUMBER TO
0260 05400   0 35 00136        LDX   ASLD
0261 05401   1 04 00044        STA   36,1
0262 05402   0 01 05056        JMP
0263 05403   0 35 00143   ASUM LDX   PNCO  CLEAR BUFFER 2
```

```
0264 05404    140040           CRA
0265 05405    -0 13 05707      IMA*    A2BP    AND SUM UP
0266 05406    -0 06 05712      ADD*    A3BP    BUFFER 3
0267 05407    -0 04 05712      STA*    A3BP
0268 05410    0 12 00000       IRS     0
0269 05411    0 12 05740       IRS     ASMX
0270 05412    0 01 05404       JMP     ASUM+1
0271 05413    140040           CRA
0272 05414    0 35 00136       LDX     ASLD    SET SCAN RESET TO 0
0273 05415    1 04 00044       STA     36,1
0274 05416    1 12 00037 ASXN  IRS     31,1    UPDATE NUMBER OF SCANS
0275 05417    101000           NOP

A/D SCAN AND GAUGE CONTROL

REPLACE LINE 285, PAGE 6

05432    003531          JMP      ASWY-2

0276 05420    1 12 00040       IRS     32,1    BACK TOO
0277 05421    101000           NOP
0278 05422    001001     A2GC  INH
0279 05423    1 02 00000       LDA     0,1     GET CONTROL WORD
0280 05424    0406 70          ARR     8       REQUEST
0281 05425    140500           SSM             GRAPH
0282 05426    0406 77          ARR     1       UPDATES
0283 05427    140500           SSM
0284 05430    0406 71          ARR     7
0285 05431    1 04 00000       STA     0,1
0286 05432    0 01 05056       JMP     ASNX
0287 05433    0 04 05746 STMN  STA     MPN
0288 05434    0 15 05736       STX     MNPS
0289 05435    0 01 05221       JMP     ASXM
0290 05436    0 02 00113 ASMN  LDA     BT16
0291 05437    1 04 00031       STA     25,1
0292 05440    0 01 05056       JMP     ASNX
0293 05441    1 02 00031 ASIN  LDA     25,1
0294 05442    100400           SPL             SKIP IF FIRST PASS
0295 05443    0 01 05512       JMP     ASIP    IN PROGRRESS
0296 05444    140407           TCA
0297 05445    1 04 00031       STA     25,1
0298 05446    0 35 00137       LDX     ASLN
0299 05447    -0 02 05714      LDA*    AASB    GET # OF ENTRIES
0300 05450    0 04 05723       STA     INCT
0301 05451    0 35 00143       LDX     PNCO
0302 05452    140040           CRA             CLEAR ALL BUFFERS
0303 05453    -0 04 05706      STA*    A1BP
0304 05454    -0 04 05707      STA*    A2BP
0305 05455    -0 04 05712      STA*    A3BP
0306 05456    0 12 00000       IRS     0
0307 05457    0 12 05723       IRS     INCT
0308 05460    0 01 05453       JMP     *-5
0309 05461    0 35 00136       LDX     ASLD
0310 05462    1 04 00037       STA     31,1    ZERO # OF SCANS
0311 05463    1 04 00040       STA     32,1    BACK TOO
0312 05464    1 02 00027       LDA     23,1    RESET FORWARD
0313 05465    0 06 00101       ADD     BT06
0314 05466    001001           INH
0315 05467    -0 10 00130      JST*    ACRQ
0316 05470    1 02 00030       LDA     24,1    SET REVERSE
0317 05471    0 06 00102       ADD     BT07
0318 05472    -0 10 00130      JST*    ACRQ
0319 05473    000401           ENB
0320 05474    0 02 00114       LDA     HOUR    SET UP START TIME
0321 05475    001001           INH
0322 05476    -0 10 00070      JST*    AMUL
0323 05477    0 005722         DAC     AC74
0324 05500    000401           ENB
0325 05501    000201           IAB
0326 05502    0 06 00115       ADD     MINT
0327 05503    1 04 00016       STA     14,1    FRONT AND
0328 05504    1 04 00017       STA     15,1     BACK
0329 05505    140040           CRA
0330 05506    1 04 00023       STA     19,1    ZERO SEGMENT COUNT
```

```
0331 05507   0 02 00074         LDA    BT01
0332 05510   1 04 00033         STA    27,1     SET DIRECTION REVERSE
0333 05511   0 01 05056         JMP    ASNX
0334 05512   1 02 00023 ASIP    LDA    19,1     HAS IT REACHED
0335 05513   0414 77            LGL    1        REFERENCE YET
0336 05514   101400             SMI
0337 05515   0 01 05056         JMP    ASNX     NO, FORGET IT
0338 05516  -0 02 00140         LDA*   GSRQ     YES, IS STANDARDIZATION
0339 05517   100040             SZE             BUSY
0340 05520   0 01 05056         JMP    ASNX     YES, FORGET IT AGAIN
0341 05521   141206     STME    AOA             NO,
0342 05522   1 04 00035         STA    29,1     REQUEST STD
0343 05523   0 02 00137         LDA    ASLN
0344 05524   141206             AOA
0345 05525  -0 04 00140         STA*   GSRQ
0346 05526   0 02 05721         LDA    AC64     CALL STANDIZATION
0347 05527   001001             INH             PROGRAM
0348 05530  -0 10 00072         JST*   ASTR
0349 05531   000401             ENB
0350 05532   0 01 05056         JMP    ASNX
0351 05533   1 02 00034 ASWY    LDA    28,1     WHY IS IT ZERO
0352 05534   101400             SMI
0353 05535   0 01 05032         JMP    A1GD     STOP TIMER RUN OUT
0354 05536   1 12 00034         IRS    28,1     INCREM TIMER
0355 05537   0 01 05056         JMP    ASNX     STILL NOT RUN OUT
0356 05540   001001             INH
0357 05541   1 02 00033         LDA    27,1     REVERSE DIRECTIONS
0358 05542   140024             CHS
0359 05543   1 04 00033         STA    27,1
0360 05544   101400             SMI
0361 05545   0 01 5551          JMP    ASCR
0362 05546   1 02 00030         LDA    24,1
0363 05547   0 06 00102 AZ2     ADD    BT07
0364 05550  -0 10 00130         JST*   ACRQ
0365 05551   001001     ASCR    INH
0366 05552   1 02 00023         LDA    19,1     AT REFERENCE YET
0367 05553   0414 77            LGL    1
0368 05554   101400             SMI
0369 05555   0 01 05056         JMP    ASNX     NO, GO AWAY
0370 05556   140040             CRA             YES,
0371 05557   1 04 00023         STA    19,1     CLEAR SEGMENT COUNT
0372 05560   1 04 00034         STA    28,1     TIMER
0373 05561   1 02 00035         LDA    29,1     STANDARDIZATION REQUESTED
0374 05562   101040             SNZ
0375 05563   0 01 05573         JMP    ASGY     NO, LET IT GO ON
0376 05564  -0 02 00140         LDA*   GSRQ     YES, IS IT ME
0377 05565   101040             SNZ             WHO'S MAKING BUSY
0378 05566   0 10 05521         JMP    STME     NOT, BUSY
0379 05567   0 07 00113         SUB    BT16
0380 05570   0 11 00137         CAS    ASLN
0381 05571   0 01 05573         JMP    ASGY     NO, KEEP GOING
0382 05572   0 01 05056         JMP    ASNX     THIS IS MY STD, GO AWAY
0383 05573   140040     ASGY    CRA
0384 05574   1 04 00034         STA    28,1     RESET STOP TIMER
0385 05575   1 02 00027         LDA    23,1     SET FORWARD
```

A/D SCAN AND GAUGE CONTROL

INSERT AFTER LINE 405, PAGE 8

```
05620   002751              JMP    '751
00751   010000              STA    0
00752   000401              ENB
00753   103754              JMP*   BACK
00754   005621     BACK     DAC    '5621
```

A/D SCAN AND GAUGE CONTROL

INSERT AFTER LINE 405, PAGE 8

```
06117   100000              SKP    DO NOT ALARM
00500   064045              IRS    37,1
00501   103505              JMP*   BACK
```

```
00502    064047              IRS     39,1
00503    103505              JMP*    BACK
00504    103635              JMP*    RSET
00505    105606      BACK    DAC*    '5606
00635    012711      RSET    DAC     '12711
12711    004177              LDA     '177
12712    050047              STA     39,1
12713    004113              LDA     BT16
12714    050035              STA     '35,1
12715    102505              JMP*    BACK
00177    177776              DEC     -2
05621    002500              JMP     '500
16404    101000              NOP
16412    000012      CIO     OCT     12
```

A/D SCAN AND GAUGE CONTROL

INSERT AFTER LINE 432, PAGE 8

```
05762    072136      LDX     ASLD
05763    056001      SUB     1,1
05764    003654      JMP     A1SP+6
```

A/D SCAN AND GAUGE CONTROL

REPLACE LINES 408 to 416, Page 8

```
00506    001001      A2SP    INH
00507    140040              CRA
00510    050037              STA     '37,1
00511    050040              STA     '40,1
00512    050032              STA     26,1
00513    072137              LDX     ASLN
00514    111522              STA*    AASV
00515    111523              STA*    AASL
00516    072136              LDX     ASLD
00517    000401              ENB
00520    103521              JMP*    BACK
00521    005633      BACK    DAC     '5633
00522    105716      AASV    DAC*    '5716
00523    105717      AASL    DAC*    '5717
05622    044023      ASDM    LDA     19,1
05623    007757              ANA     ASM1
05624    062013              CAS     11,1
05625    003630              JMP     CK1
05626    002506              JMP     '506
05627    003015              JMP     A1DM
05630    016113      CK1     SUB     BT16
05631    062013              CAS     11,1
05632    003015              JMP     A1DM
```

```
0386    05576    0 06 00102              ADD     BT07
0387    05577   -0 10 00130              JST*    ACRQ
0388    05600    0 02 05756              LDA     ADKR      RESET SAMPLE
0389    05601    140407                  TCA
0390    05602    1 04 00032              STA     26,1      COUNT
0391    05603    0 01 05056              JMP     ASNX
0392    05604    1 02 00031      AZ1     LDA     23 1
0393    05605    0 01 05547              JMP     AZ2
0394                             *SET UP NEXT LDF POINTERS
0395    05606    0 00 00000      SETP    PZE
0396    05607    0 35 00137              LDK     ASLN
0397    05610   -0 02 05710              LDA*    AA1P
0398    05611    0 04 05706              STA     A1BP
0399    05612   -0 02 05711              LDA*    AA2P
0400    05613    0 04 05707              STA     A2BP
0401    05614   -0 02 05713              LDA*    AA3P
0402    05615    0 04 05712              STA     A3BP
0403    05616    1 02 00117              LDA     LDF1,1
0404    05617    0 04 00136              STA     ASLD
0405    05620    0 04 00000              STA     0
0406    05621   -0 01 05606              JMP*    SETP      EXIT
```

```
0407                              *SPECIAL HANDLING FOR DOWN MACHINE
0408   05622   1 02 00013   ASDM   LDA    11,1
0409   05623   0 03 05757          ANA    ASM1
0410   05624   1 11 00023          CAS    19,1       AT ARROW POSITION
0411   05625   100000              SKP               NO,
0412   05626   0 01 05633          JMP    A2SP       YES,
0413   05627   1 02 00033          LDA    27,1       NO, IS DIRECTION
0414   05630   101400              SMI               FORWARD OR REVERSE
0415   05631   0 01 05015          JMP    A1DM       FORWARD
0416   05632   0 01 05551          JMP    ASCR       BACKWARD
0417   05633   1 02 00033   A2SP   LDA    27,1       IF DIRECTION IS
0418   05634   001001              LNH
0419   05635   100400              SPL
0420   05636   0 01 05700          JMP    A3SP       BACKWARD, SEND FORWARD
0421   05637   1 02 00027          LDA    23,1       FORWARD, SEND REVERSE
0422   05640   0 06 00101   A5SP   ADD    BTO6
0423   05641   -0 10 00130         JST*   ACRQ
0424   05642   000401              ENB
0425   05643   1 02 00043          LDA    35,1       HAS D.M. SAMPLE COUNT
0426   05644   100400              SPL               RUN OUT
0427   05645   0 01 05702          JMP    A4SP       NO
0428   05646   0 02 05761   A6SP   LDA    RSTV       YES, RESTORE VALUE
0429   05647   001001              INH
0430   05650   1 04 00043          STA    35,1
0431   05651   -0 10 05760         JST*   ASRD
0432   05652   -0 10 05754         JST*   ILNC
0433   05653   1 07 00001          SUB    1,1        MINUS S.P.
0434   05654   000201              IAB
0435   05655   0 03 001 37         LDX    ASLN
0436   05656   -0 02 05715         LDA*   AASD
0437   05657   0 04 00000          STA    0
0438   05660   000201              IAB
0439   05661   -0 04 05712         STA*   A3BP       STORE AWAY
0440   05662   0 35 00137          LDX    ASLN
0441   05663   000201              IAB
0442   05664   141206              AOA
0443   05665   0 11 05720          CAS    K240       IF BUFFER MORE THAN
0444   05660   0 01 05675          JMP    RSET       LIMIT TO 240
0445   05667   101000              NOP
0446   05670   -0 06 05714         ADD*   AASB       IF PAST END OF BUFFER
0447   05671   101400              SMI
0448   05672   0 01 05675          JMP    RSET       RESET TO BEGINNING
0449   05673   -0 12 05715         IRS*   AASD
0450   05674   0 01 05056          JMP    ASNX
0451   05675   140040       RSET   CRA
0452   05676   -0 04 05715         STA*   AASD
0453   05677   0 01 05056          JMP    ASNX
0454   05700   1 02 00030   ASSP   LDA    24,1
0455   05701   0 01 05640          JMP    ASSP
0456   05702   1 12 00043   A4SP   IRS    35,1
0457   05703   0 01 05056          JMP    ASNX
0458   05704   0 01 05646          JMP    A6SP
0459   05705   0 000000     A1TP   DAC    **         SAVE FOR WORKING VALUES
0460   05706   0 00 00000   A1BP   PZE               POINTER TO CURRENT BUFFER
0461                              *PNTRS TO BUFFERS FOR AVG. VALUE
0462   05707   0 00 00000   A2BP   PZE               CURR BUFFER POINTER
0463   05710   1 006254     AA1P   DAC    AB1P,1
0464   05711   1 006266     AA2P   DAC    AB2P,1
0465   05712   0 00 00000   A3BP   PZE
0466   05713   1 006343     AA3P   DAC    AB3P,1
0467   05714   1 006321     AASB   DAC    ASBL,1
0468   05715   1 006332     AASD   DAC    ASDP,1
0469   05716   1 006277     AASV   DAC    ASAV,1
0470   05717   1 006310    *AAS1   DAC    ASV1,1
0471   05720   000360       K240   DEC    234        MAXIMUM DOWN MACHINE LENG
0472   05721   000064       AC64   OCT    64
0473   05722   000074       AC74   OCT    74
0474   05723   0 00 00000   INCT   PZE
0475   05724   106612       FORS   VFD    8,'215,8,'212
0476   05725   143317              BCI    3,FORCED
       05726   151303
       05727   142704
0477   05730   106612              VFD    8,'215,8,'212
0478   05731   000005       FSTL   VFD    8,0,8,FSTL-FORS
0479   05732   0 001503     CCDB   DAC    '1503
```

```
0480 05733  0 00 00000   CCDA    PZE
0481 05734  0 001506     CCD3    DAC     '1506
0482 05735  0 00 00000   OVRF    PZE
0483 05736  0 00 00000   MNPS    PZE
0484 05737  0 00 00000   STPT    PZE
0485 05740  0 00 00000   ASMX    PZE
0486 05741  0 00 00000   MXPS    PZE
0487 05742  0 00 00000   ALH     PZE
0488 05743  0 00 00000   ALLH    PZE
0489 05744  0 00 00000   A1TL    PZE
0490 05745  0 00 00000   ACNT    PZE
0491 05746  0 00 00000   MIN     PZE
0492 05747  0 00 00000   MAX     PZE
0493 05750  177754       MV20    DEC     -20
0494 05751  0 006160     ASSM    DAC     AS1S
0495 05752  0 00 00000   ATMP    PZE
0496 05753  0 006000     ALIM    DAC     ALRM
0497 05754  0 006400     ILNC    DAC     '6400
0498 05755  0 00 00000   ASDV    PZE
0499 05756  000030       ADKR    OCT     30      RESTORE VALUE FOR ADK
0500 05757  037777       ASM1    OCT     37777
0501 05760  0 006205     ASRD    DAC     ADRD    ADDRESS OF A/D READ
0502 05761  177774       RSTV    DEC     -4
0503                     *DEV ALARM ROUT PART OF A/D SCAN
0504                             ORG     6000
0505 06000  0 000000     ALRM    DAC     **
0506 06001  0 04 06153           STA     ALSI    ASSUMES DEVIATION IN A
0507 06002  100400               SPL
0508 06003  140407               TCA
0509 06004  1 07 00002           SUB     2,1     COMPARED TO LIMIT
0510 06005  101400               SMI
0511 06006  0 01 06041           JMP     ALAL    GO SAVE ALARM DATA
0512 06007  000201               IAB
0513 06010  001001               INH
0514 06011  1 02 00000           LDA     0,1
0515 06012  101100               SLN             SKIP IF WAS IN ALARM
0516 06013  0 01 06035           JMP     ALRN    NO ACTION RETURN B=DEV
0517 06014  000201               IAB
0518 06015  140407               TCA
0519 06016  0 11 06157           CAS     ALDB    COMPARE TO DEADBAND
0520 06017  101000               NOP
0521 06020  100000               SKP
0522 06021  0 01 06035           JMP     ALRN    VALUE NOT GOOD ENOUGH
0523 06022  000201               IAB
0524 06023  0404 77              LGR     1
0525 06024  0414 77              LGL     1
0526 06025  1 04 00000           STA     0,1
0527 06026  000401               ENB
0528 06027  -0 10 06060          JST*    ALMN
0529 06030  0 006127             DAC     ALMT*3
0530 06031  1 02 00026           LDA     22,1
0531 06032  0 06 00102           ADD     BT07
0532 06033  001001               INH
0533 06034  -0 10 00130          JST*    ACRQ
0534 06035  0 02 06153   ALRN    LDA     ALSI    RETURN B=DEV
0535 06036  000201               IAB
0536 06037  000401               ENB
0537 06040  -0 01 06000          JMP*    ALRM    EXIT
0538 06041  1 02 00000   ALAL    LDA     0,1
0539 06042  100100               SLZ             SKIP NOT AON ALARM
0540 06043  0 01 06035           JMP     ALRN    ALREADY ALARMED
0541 06044  1 02 00026           LDA     22,1
0542 06045  001001               INH
0543 06046  -0 10 00130          JST*    ACRQ
0544 06047  -0 10 06060          JST*    ALMM
0545 06050  0 006125             DAC     ALMT*1
0546 06051  100040               SZE
0547 06052  0 01 06035           JMP     ALRN
0548 06053  001001               INH
```

A/D SCAN AND GAUGE CONTROL

INSERT AFTER LINE 573, PAGE 11

```
06675  005153       LDA   ALSI
06676  001001       INH
06677  003106       JMP   '6106
```

A/D \[SCA]N AND GAUGE CONTROL

INSERT AFTER LINE 577, PAGE 11

```
06111   003731          JMP     '6731
06731   000401          ENB
06732   044023          LDA     19,1
06733   001001          INH
06734   003112          JMP     '6112
```

A/D SCAN AND GAUGE CONTROL

INSERT AFTER LINE 582

```
06116   003735          JMP     '6735
06735   000401          ENB
06736   005154          LDA     ALCW
06737   001001          INH
06740   003117          JMP     '6117
```

A/D SCAN AND GAUGE CONTROL

INSERT AFTER LINE 586, PAGE 11

```
06700   072136          LDX     ASLD
06701   000401          ENB
06702   103060          JMP*    ALMM
```

A/D SCAN AND GAUGE CONTROL

REPLACE LINES 592 TO 598, PAGE 11

```
06354   000260   ALMA   OCT     260
06355   000260          OCT     260
06356   000272          OCT     272
06357   000260          OCT     260
06360   000260          OCT     260
06361   120314   ALMB   BCI     3,AL510
06362   132661
06363   130240
06364   142305          BCI     2,DEVD
06365   053240
06366   000000          BSZ     4
06367   000000
06370   000000
06371   000000
06372   000255          OCT     255
06373   000000          BSZ     3
06374   000000
06375   000000
06376   106612          VFD     8,'215,8,'212
```

```
0549   06054   1 02 00000           LDA   0,1
0550   06055   0 06 00113           ADD   B116
0551   06056   1 04 00000           STA   0,1       SET HISTORY
0552   06057   0 01 06035           JMP   ALRN
0553   06060   0 000000     ALMM    DAC   **
0554   06061   001001               INH
0555   06062  -0 10 00073           JST   AIIM
0556   06063   000401               ENB
0557   06064   0 02 00137           LDA   ASLN
0558   06065   0 11 00145           CAS   PNCS
0559   06066   100000               SKP
0560   06067   141206               AOA
0561   06070   0 06 06156           ADD   A260
0562   06071   0 13 06137           IMA   ALMB+2
0563   06072   141340               ICA
0564   06073   0 06 06137           ADD   ALMB+2
```

```
0565  06074    141340                 ICA
0566  06075    0 04 06137             STA    ALMB+2
0567  06076   -0 02 06060             LDA*   ALMM
0568  06077    0 04 06124             STA    ALMT
0569  06100   -0 02 06124             LDA*   ALMT
0570  06101    0 04 06140             STA    ALMB+3
0571  06102    0 12 06124             IRS    ALMT
0572  06103   -0 02 06124             LDA*   ALMT
0573  06104    0 04 06141             STA    ALMB+4
0574  06105    001001                 INH
0575  06106   -0 10 00150             JST*   AB2S
0576  06107    177774                 DEC    -4
0577  06110    0 006142               DAC    ALMB+5
0578  06111    1 02 00023             LDA    19,1
0579  06112    0 03 06155             ANA    ALM1
0580  06113   -0 10 00150             JST*   AB2S
0581  06114    177775                 DEC    =3
0582  06115    0 006147               DAC    ALMB+10
0583  06116    0 02 06154             LDA    ALCW
0584  06117   -0 10 00067             JST*   ATOU
0585  06120    0 006131               DAC    ALMA
0586  06121    0 12 06060             IRS    ALMM
0587  06122    000401                 ENB
0588  06123   -0 01 06060             JMP*   ALMM
0589  06124    0 006125      ALMT     DAC    **1
0590  06125    142340                 BCI    2,DEV
      06126    153240
0591  06127    147713                 BCI    2,OK
      06130    120240
0592  06131    000000        ALMA     BSZ    4
0593  06135    120314        ALMB     BCI    3,L510
      06136    132661
      06137    130240
0594  06140    142305                 BCI    2,DEV
      06141    153240
0595  06142    000000                 BSZ    4
0596  06146    000255                 OCT    255
0597  06147    000000                 BSZ    3
0598  06152    106612                 VFD    8,'215,8,'212
0599  06153    0 000000      ALSI     DAC
0600  06154    000022        ALCW     VFD    8,0,8,ALSI-ALMA
0601  06155    037777        ALM1     OCT    37777
0602  06156    000260        A260     OCT    260
0603  06157    000012        ALBD     DEC    10       DEAD BAND FOR ALARMING
0604                         *ROUTINE TO PERMORM 4 SCAN SMOOTH
0605  06160    0 000000      ASIS     DAC    **       3/4Y+1/4YN=YP
0606  06161    0 15 06203             STX    ASIT
0607  06162    0 35 00136             LDX    ASLD
0608  06163    1 02 00037             LDA    31,1     IF ON FIRST SCAN
0609  06164    0 35 06203             LDX    ASIT
0610  06165    101040                 SNZ             DO NOT
0611  06166   -0 01 06160             JMP*   ASIS    SMOOTH
0612  06167    000201                 IAB
0613  06170    0405 76                ARS    2
0614  06171    0 04 06203             STA    ASIT    STORE 1/4YN
0615  06172   -0 02 06204             LDA*   ASIP
0616  06173    001001                 INH
0617  06174   -0 10 00070             JST*   AMUL    MULT X 3
0618  06175    0 000144               DAC    PNC3
0619  06176    000401                 ENB
0620  06177    0411 63                LLS    '15     DIVIDE BY 4
0621  06200    0 06 06203             ADD    ASIT
0622  06201    000201                 IAB
0623  06202   -0 01 06160             JMP*   ASIS
0624  06203    0 00 00000    ASIT     PZE
0625  06204   -0 005706      ASIP     DAC*   A1BP
0626                         *A/D READ SUBROUTINE
0627  06205    0 000000      ADRD     DAC    **
0628  06206    0 02 06246             LDA    ADC1
0629  06207    74 1377                OTA    '1377   SELECT CIM
0630  06210    000000                 HLT
0631  06211    14 1677                OCP    '1677
0632  06212    0 02 06247             LDA    ADC2
0633  06213    74 1377                OTA    '1377
0634  06214    000000                 HLT
```

```
0635  06215  34 0677              SKS   '677
0636  06216  0 01 06206           JMP   *-8
0637  06217  0 02 06250           LDA   ADC6
0638  06220  74 1377              OTA   '1377
0639  06221  000000               HLT
0640  06222  0 02 00137           LDA   ASLN
0641  06223  74 1177              OTA   '1177
0642  06224  000000               HLT
0643  06225  0 02 06251           LDA   ADC3
0644  06226  74 1377              OTA   '1377
0645  06227  000000               HLT
0646  06230  14 1677              OCP   '1677
0647  06231  0 02 06252           LDA   ADC7
0648  06232  74 1377              OTA   '1377
0649  06233  000000               HLT
0650  06234  34 0677              SKS   '677
0651  06235  0 01 06231           JMP   *-4
0652  06236  0 02 06253           LDA   ADCS
0653  06237  74 1377              OTA   '1377
0654  06240  000000               HLT
0655  06241  54 1077              INA   '1077
0656  06242  000000               HLT
0657  06243  0404 74              LGR   4
0658  06244  000401               ENB
0659  06245  -0 01 06205          JMP*  ADRD
0660  06246  000232      ADC1     OCT   232
0661  06247  000233      ADC2     OCT   233
0662  06250  000033      ADC6     OCT   33
0663  06251  000433      ADC3     OCT   433
0664  06252  000632      ADC7     OCT   632
0665  06253  000032      ADC5     OCT   32
0666  06254  1 020000    ABIP     DAC   ABP1,1 510
0667  06255  1 020200             DAC   ABP2,1 511
0668  06256  1 020400             DAC   ABP3,1 512
0669  06257  1 020622             DAC   ABP4,1 513
0670  06260  1 021202             DAC   ABP5,1 514
0671  06261  1 021446             DAC   ABP6,1 516
0672  06262  1 022246             DAC   ABP7,1 FUTR
0673  06263  1 022247             DAC   APB8,1 FUTR
0674  06264  1 022250             DAC   ABP9,1 FUTR
0675  06265  0 000000             DAC   **     REST WORD A1BP
0676  06266  1 022251    AB2P     DAC   AB21,1 510
0677  06267  1 022451             DAC   AB22,1 511
0678  06270  1 022651             DAC   AB23,1 512
0679  06271  1 023073             DAC   AB24,1 513
0680  06272  1 023453             DAC   AB25,1 514
0681  06273  1 023717             DAC   AB26,1 516
0682  06274  1 024517             DAC   AB27,1 FUTR
0683  06275  1 024520             DAC   AB28,1 FUTR
0684  06276  1 024521             DAC   AB29,1 FUTR
0685  06277  0 000000    ASAV     DAC   **     L510 SEG VALUE
0686  06300  0 000000             DAC   **     511
0687  06301  0 000000             DAC   **     512
0688  06302  0 000000             DAC   **     513
0689  06303  0 000000             DAC   **     514
0690  06304  0 000000             DAC   **     516
0691  06305  0 000000             DAC   **     FUTR
0692  06306  0 000000             DAC   **     FUTR
0693  06307  0 000000             DAC   **     FUTR
0694  06310  0 000000    ASVI     DAC   **     L510 OVERFLOW SEG VALUE
0695  06311  0 000000             DAC   **     511
0696  06312  0 000000             DAC   **     512
0697  06313  0 000000             DAC   **     513
0698  06314  0 000000             DAC   **     514
0699  06315  0 000000             DAC   **     156
0700  06316  0 000000             DAC   **     FUTR
0701  06317  0 000000             DAC   **     FUTR
0702  06320  0 000000             DAC   **     FUTR
0703  06321  177600      ASBL     DEC   -128   510
0704  06322  177600               DEC   -128   511
0705  06323  177556               DEC   -146   512
0706  06324  177420               DEC   -240   513
0707  06325  177534               DEC   -164   514
0708  06326  177200               DEC   -384   516
```

```
0709  06327  177777            DEC  -1    FUTR
0710  06330  177777            DEC  -1    FUTR
0711  06331  177777            DEC  -1    FUTR
0712  06332  0 000000   ASDP   DAC  **    510
0713  06333  0 000000          DAC  **    511
0714  06334  0 000000          DAC  **    512
0715  06335  0 000000          DAC  **    513
0716  06336  0 000000          DAC  **    514
0717  06337  0 000000          DAC  **    516
0718  06340  0 000000          DAC  **    FUTR
0719  06341  0 000000          DAC  **    FUTR
0720  06342  0 000000          DAC  **    FUTR
0721  06343  1 024522   AB3P   DAC  POB1,1  510
0722  06344  1 024722          DAC  POB2,1  511
0723  06345  1 025122          DAC  POB3,1  512
0724  06346  1 025344          DAC  POB4,1  513
0725  06347  1 025724          DAC  POB5,1  514
0726  06350  1 025170          DAC  POB6,1  516
0727  06351  1 026770          DAC  POB7,1  FUTR
0728  06352  1 026771          DAC  POB8,1  FUTR
0729  06353  1 026772          DAC  POB9,1  FUTR
0730                           END
RSLC  06354
OFSH  06355
B2ST  06356
TIME  06357
STRB  06358
TOOT  06360
LVCX  06361
UNSP  06362
SUSP  06364
IHD   06365
PFIR  06366
```

| | | | | | | | |
|---|---|---|---|---|---|---|---|
| A1BP | 005706A | A1DM | 005015A | A1GD | 005032A | A1PL | 005174A |
| A1TL | 005744A | A1TP | 005705A | A260 | 006156A | A2BP | 005707A |
| A2GC | 005422A | A2SP | 005633A | A3BP | 005712A | A3SP | 005700A |
| A4SP | 005702A | A5SP | 005640A | A6SP | 005646A | AA1P | 005710A |
| A82P | 005711A | AA3P | 005713A | AAS1 | 005717A | AASB | 005714A |
| A8SD | 005715A | AASV | 005716A | AB1P | 006254A | AB21 | 022251A |
| AB22 | 022451A | AB23 | 022651A | AB24 | 023073A | AB25 | 023453A |
| AB26 | 023717A | AB27 | 024517A | AB28 | 024520A | AB29 | 024521A |
| AB2P | 006266A | AB2S | 000150A | AB3P | 006343A | ABPT | 020000A |
| ABP2 | 020200A | ABP3 | 020400A | ABP4 | 020622A | ABP5 | 021202A |
| ABP6 | 021446A | ABP7 | 022246A | ABP8 | 022247A | ABP9 | 022250A |
| AC64 | 005721A | AC74 | 005722A | ACMX | 000066A | ACNT | 005745A |
| ACRQ | 000130A | ADC1 | 006246A | ADC2 | 006247A | ADC3 | 006251A |
| ADCS | 006253A | ADC6 | 006250A | ADC7 | 006252A | ADDT | 000133A |
| ADIV | 000071A | ADKR | 005756A | ADAD | 006205A | AERM | 000153A |
| AFSH | 000151A | ALAL | 006041A | ALCL | 006154A | ALDB | 006157A |
| ALH  | 005742A | ALIM | 005753A | ALLH | 005743A | ALM1 | 006155A |
| ALMA | 006131A | ALMB | 006135A | ALMM | 006060A | ALMT | 006124A |
| ALRM | 006000A | ALRN | 006035A | ALSI | 006153A | AMUL | 000070A |
| AOIC | 000154A | ARGC | 005002A | ARLC | 000152A | AS1P | 006204A |
| AS1S | 006160A | AS1T | 006203A | ASAR | 005140A | ASAV | 006277A |

What is claimed is:

1. A method of producing pigmented thermoplastic film with a specific predetermined pigment concentration, comprising: measuring the thickness of said pigmented film by means of a radiation thickness gauge; measuring the weight of said pigmented film; calculating the thickness of said pigmented film from said measured weight; and adjusting the amount of said pigment mixed with said thermoplastic film in response to a comparison of said thickness as measured using said radiation gauge with said thickness calculated from the weight of said pigmented thermoplastic film to achieve said predetermined pigment concentration.

2. The method as claimed in claim 1 wherein said radiation gauge thickness reading is converted into an electrical signal, said thickness as calculated from the weight of said pigmented thermoplastic film is converted into an electrical signal, and said comparison of the two thicknesses is performed by a computer.

3. The method as claimed in claim 2 wherein said electrical signals are in digital form.

4. The method as claimed in claim 1 wherein said radiation thickness gauge is a beta ray backscatter thickness gauge.

5. The method as claimed in claim 2 wherein said electrical signals are in analog form.

6. The method as claimed in claim 1 wherein said thermoplastic film which is to be pigmented is selected from the group consisting of polyolefins, polyvinyl chloride and nylon.

7. The method as claimed in claim 6 wherein said pigment is selected from the group consisting of metal oxides and metal chromates.

8. The method as claimed in claim 7 wherein said thermoplastic film comprises at least one member of the group consisting of polyethylene, polypropylene and polystyrene and wherein said pigment comprises at least one member of the group consisting of iron chromate, iron oxide, titanium dioxide and iron ferrocyanide.

9. The method as claimed in claim 1 wherein said pigmented thermoplastic film is produced by forcing a liquid mixture of pigment and thermoplastic film through an extruder.

10. Apparatus for producing pigmented thermoplastic film at a specific predetermined pigment concentration comprising: a radiation thickness gauge including a circuit producing a signal responsive to a measured film thickness; means for weighing said pigmented thermoplastic film including a circuit producing a signal in response to a measured film weight first; logic circuit means for computing the film thickness from said measured film weight, second logic circuit means for comparing said radiation signal and said second logic circuit means signal; and means responsive to said second logic circuit for adjusting the amount of pigment mixed with said thermoplastic film.

11. The apparatus as claimed in claim 10 wherein said radiation gauge circuit and said weighing means circuit each include calibration means.

12. The apparatus as claimed in claim 10 wherein said radiation thickness gauge is a beta ray backscatter thickness gauge.

* * * * *